United States Patent
Furuta et al.

(10) Patent No.: US 7,965,326 B2
(45) Date of Patent: Jun. 21, 2011

(54) SEMICONDUCTOR ELEMENT, METHOD OF DRIVING SEMICONDUCTOR ELEMENT AND SOLID IMAGING APPARATUS

(75) Inventors: Yoshinori Furuta, Asaka (JP); Hiroyuki Oshima, Asaka (JP); Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 753 days.

(21) Appl. No.: 11/862,089

(22) Filed: Sep. 26, 2007

(65) Prior Publication Data
US 2008/0088723 A1     Apr. 17, 2008

(30) Foreign Application Priority Data

Sep. 27, 2006   (JP) ................ P2006-263383
Sep. 29, 2006   (JP) ................ P2006-268175

(51) Int. Cl.
*H04N 3/14*     (2006.01)
*H04N 5/335*    (2011.01)

(52) U.S. Cl. ............ 348/294; 348/299; 348/300

(58) Field of Classification Search .......... 348/294, 348/299–300
See application file for complete search history.

(56) References Cited

U.S. PATENT DOCUMENTS

| | | | |
|---|---|---|---|
| 7,079,183 B1 * | 7/2006 | Yamada | 348/294 |
| 7,079,184 B2 * | 7/2006 | Yanai | 348/319 |
| 7,759,752 B2 * | 7/2010 | Summa et al. | 257/432 |
| 2005/0057672 A1 * | 3/2005 | Summa et al. | 348/273 |
| 2008/0079831 A1 * | 4/2008 | Kobayashi et al. | 348/296 |
| 2008/0204585 A1 * | 8/2008 | Meisenzahl et al. | 348/303 |

FOREIGN PATENT DOCUMENTS

| | | |
|---|---|---|
| JP | 7-153988 A | 6/1995 |
| JP | 8-340099 A | 12/1996 |
| JP | 2003-347317 A | 12/2003 |

* cited by examiner

*Primary Examiner* — Jason Chan
*Assistant Examiner* — Cynthia Calderon
(74) *Attorney, Agent, or Firm* — Birch, Stewart, Kolasch & Birch, LLP

(57) ABSTRACT

A semiconductor element comprises: two-dimensionally aligned pixels with a plurality of photoelectric conversion portions that photoelectrically converts incident light into a signal charge; a plurality of vertical transfer paths to which the signal charges are transferred from said plurality of photoelectric conversion portions; and read gates that amplify the signal charges read from the photoelectric conversion portions to transfer to said plurality of vertical transfer paths; wherein two or more of the read gates are formed for each of said plurality of photoelectric conversion portions, and amplification factors of the two or more of the read gates differ from each other.

8 Claims, 47 Drawing Sheets

SEMICONDUCTOR ELEMENT, METHOD OF DRIVING SEMICONDUCTOR ELEMENT AND SOLID IMAGING APPARATUS

FIELD OF THE INVENTION

The present invention relates to a semiconductor element and a method of driving a semiconductor element, specifically relates to a semiconductor element capable of changing an amplification factor of a signal charge and capable of being driven by an amplification factor suitable for an imaging environment and a method of driving a semiconductor element.

The present invention relates to a solid imaging apparatus, particularly, the invention relates to an apparatus of taking an image signal provided in taking an image by a wide dynamic range, for example, a digital camera or the like.

DESCRIPTION OF THE RELATED ART

There is a physical phenomenon referred to as impact ion for accelerating an electron by applying an electric field to a signal charge, generating a secondary electron by impacting the electron to a lattice crystal and amplifying a signal charge. As shown by FIG. 39, in a semiconductor, an electron accelerated by an electric field in impacted to a lattice atom with a sufficient energy to thereby eject an electron in the lattice atom, the ejected electron becomes a secondary electron, and therefore, one signal charge can be amplified to two thereof. The signal charge can further by amplified by repeating the impact ion.

Although in a solid imaging element, a potential difference applied to an electron of a signal charge is about several tens volts at maximum, however, by accelerating the electron, the band gap energy of a silicon crystal (1.16 eV) can be exceeded. Meanwhile, as shown by FIG. 40, the electron in the semiconductor is impacted to a lattice atom or an impurity atom while not being applied with the sufficient energy, and it is difficult to eject the electron from the lattice atom.

Generally, when there is a potential gradient of $3 \times 10^5$ V/n in a semiconductor, the impact ion can sufficiently be brought about. In the solid imaging element, the impact ion of the electron can be brought about by realizing the potential gradient at a transfer gate of transferring an electric charge from a photodiode to a vertical transfer path. For example, when a thickness of the transfer gate is constituted by 0.3 μm, and the applied potential is constituted by 15 V, a potential gradient formed thereby becomes $5 \times 10^5$ V/m which constitutes a probability of bringing about the impact ion by 0.5 time in the transfer gate.

A signal charge provided at the solid imaging element converts light received by the photodiode into the signal charge, thereafter, passes from the photodiode to the vertical transfer path, a horizontal transfer path, amplified to be converted into a voltage by a CCD amplifier and is converted from analog to digital at an analog front end.

Further, there is known a semiconductor element for amplifying a signal charge by impact ion shown in, for example, JP-A-7-153988 and JP-A-2003-347317.

Meanwhile, a signal charge transferred from a photodiode to an analog front end is accompanied by a noise of a dark current or the like. Normally, a signal charge is amplified once by the CCD amplifier, however, the signal charge is amplified after passing the vertical transfer path, the horizontal transfer path, and therefore, it is unavoidable that also a noise generated at the vertical transfer path or the horizontal transfer path is amplified along with a signal charge at the CCD amplifier.

Further, when the signal charge generated at the photodiode is constituted by a small amount, an influence of the noise is liable to be effected.

Further, when an image is actually taken by using a semiconductor element of a solid imaging element or the like, a proper amount of amplifying a signal charge differs in accordance with an imaging environment. For example, in taking an image at a bright scene, a signal amount is increased, and therefore, there is a concern of exceeding a saturated amount of a transfer amount and it is not necessary to amplify the charge. On the other hand, in taking an image at a dark scene, in order to increase an S/N ratio, amplification of the signal charge constitutes effective means.

JP-A-08-340099 discloses a solid imaging apparatus having an object of preventing a luminous dot constituting a failure phenomenon on a screen from being generated by restraining an increase in a dark current by alleviating an electric field of a read path from a charge storing portion to a charge transferring portion in reading a charge. JP-A-08-340099 discloses a structure of restraining an impact ionization phenomenon generated by a strong electric field generated at a read gate.

Here, the impact ionization phenomenon is a phenomenon generated when a strong electric field is applied to a PN (Positive-Negative) junction. In a digital Camera, an interline transfer type CCD (Charge Coupled Device) is used. A portion of the CCD at which the strong electric field is liable to be generated the most is a read gate between a light receiving element or a storing portion for storing a charge and a vertical transfer path for transferring a signal charge in a vertical direction. The read gate reads the stored signal charge from the storing portion normally by applying a positive voltage pulse. Further, currently, the light receiving element tends to be miniaturized in accordance with multipixel formation. By the tendency, also the read gate is miniaturized. Even at the same potential difference a width indicating a distance in accordance with the miniaturization is narrowed. Therefore, the storing electric field is brought about by increasing the electric field from a relationship of potential difference/distance.

When the impact ionization phenomenon inherent to respective pixels is generated in CCD, an advantage of high image quality formation in a common amplifier provided on output side of CCD is deteriorated. JP-A-08-340099 discloses a technology of avoiding the phenomenon.

Further, JP-A-07-153988 discloses an "amplification type" photoelectric conversion apparatus and its driving method. JP-A-07-153988 provides a quite novel apparatus effectively utilizing the impact ionization phenomenon. The apparatus is provided with a large output by amplifying a number of electrons in accordance with an amount of a charge generated and stored by a photoelectric conversion portion and generating the impact ionization phenomenon in accordance with the amplified number of electrons. Further specifically, in a J-FET (Junction-Field-Effect Transistor) type imaging element, secondary electrons are generated by the impact ionization phenomenon before being amplified by an output amplifier, as a result, S/N is promoted.

However, when a signal charge to be dealt is a small, a noise generated by the output amplifier per se constitutes a major factor in an S/N ratio. Hence, it is preferable to amplify the charge before passing the output amplifier in order to acquire the high S/N ratio.

Meanwhile, there is a CCD of a wide dynamic range type, in which a light receiving element is provided with two kinds of pixels of a main sensitivity pixel and a sub sensitivity pixel. The main sensitivity pixel is a device having a pixel having a relatively high sensitivity in comparison with that of the sub sensitivity pixel, or a device formed to be able to receive relatively more light receiving amount. It is known that an S/N ratio of the sub sensitivity pixel is lower than that of the main sensitivity pixel. It is intended to promote the S/N ratio by generating secondary electrons by subjecting the signal charge provided from the sub sensitivity pixel to impact ionization before passing the output amplifier as disclosed in JP-A-07-153988.

However, since the S/N ratio of the signal charge provided from the main sensitivity pixel is high, when the impact ionization is generated similar to the sub sensitivity pixel, a variation among respective pixels is increased to deteriorate the S/N ratio of the image.

SUMMARY OF THE INVENTION

The invention has been carried out in view or the above-described situation and it is the first object thereof to provide a semiconductor element and a method of driving a semiconductor element capable of restraining a signal charge from being accompanied by a noise as less as possible and capable of driving the semiconductor element by an amplification factor suitable for an imaging environment.

It is the second object of the invention to provide a solid imaging apparatus capable of providing a high quality image without a variation among respective pixels even when an impact ionization is generated by resolving a drawback of the background art.

The above-described first object of the invention is achieved by the first invention below.

(1) A semiconductor element comprising: two-dimensionally aligned pixels with a plurality of photoelectric conversion portions that photoelectrically converts incident light into a signal charge; a plurality of vertical transfer paths to which the signal charges are transferred from said plurality of photoelectric conversion portions; and read gates that amplify the signal charges read from the photoelectric conversion portions to transfer to said plurality of vertical transfer paths; wherein two or more of the read gates are formed for each of said plurality of photoelectric conversion portions, and amplification factors of the two or more of the read gates differ from each other.

(2) The semiconductor element described in (1), wherein the two or more of the read gates are provided at positions of transferring signal charges to different ones of the vertical transfer paths relative to the corresponding one of the photoelectric conversion portions.

(3) The semiconductor element described in (2), wherein said plurality of vertical transfer paths differ from each other in saturated amounts of signal charges.

(4) The semiconductor element described in (2) or (3), wherein the two or more of the read gates are a pair of read gates provided in a horizontal direction of the corresponding one of the photoelectric conversion portion, the pair of read gates differing from each other in the amplification factors, and a large or small relationship of the amplification factors of the pair of read gates is reversed with respect to adjacent ones of the photoelectric conversion portions.

(5) The semiconductor element described in any one of (2) through (4), further comprising color filters that divides light into a plurality of color components, wherein pieces of the light divided by the color filters are respectively received by said plurality of photoelectric conversion portions, and positions of the read gates differ from each other in accordance with colors corresponding to the photoelectric conversion portions.

(6) The semiconductor element described in (1), wherein the two or more of the read gates are provided at positions of transferring the signal charges to the same vertical transfer path relative to the corresponding one of the photoelectric conversion portions.

(7) The semiconductor element described in (6), further comprising an imaging element drive portion that differs read time periods of the two or more of the read gates from each other.

(8) The semiconductor element described in any one of (1) through (7), wherein the semiconductor element is a solid imaging element.

(9) A method of driving a semiconductor element, the semiconductor element comprising two-dimensionally aligned pixels with a plurality of photoelectric conversion portions that photoelectrically converts incident light into a signal charge, the method comprising, when the signal charges are transferred from said plurality of photoelectric conversion portions to a plurality of vertical transfer paths, amplifying the signal charges by a plurality of read gates having different amplification factors to transfer to the vertical transfer paths.

(10) The method of driving a semiconductor element described in (9), wherein the two or more of the read gates are provided at positions of transferring signal charges to different ones of the vertical transfer paths relative to the corresponding one of the photoelectric conversion portions.

(11) The method of driving a semiconductor element described in (10), wherein said plurality of vertical transfer paths differ from each other in saturated amounts of signal charges.

(12) The method of driving a semiconductor element described in (10) or (11), wherein the two or more of the read gates are a pair of read gates provided in a horizontal direction of the corresponding one of the photoelectric conversion portion, the pair of read gates differing from each other in the amplification factors, and a large or small relationship of the amplification factors of the pair of read gates is reversed with respect to adjacent ones of the photoelectric conversion portions.

(13) The method of driving a semiconductor element described in any one of (10) through (12), wherein the semiconductor element further comprises color filters that divides light into a plurality of color components, pieces of the light divided by the color filters are respectively received by said plurality of photoelectric conversion portions, and positions of the read gates differ from each other in accordance with colors corresponding to the photoelectric conversion portions.

(14) The method of driving a semiconductor element described in (9), wherein the two or more of the read gates are provided at positions of transferring the signal charges to the same vertical transfer path relative to the corresponding one of the photoelectric conversion portions.

(15) The method of driving the semiconductor element described in (14), wherein read time periods of the two or more of the read gates differ from each other.

(16) The method of driving a semiconductor element described in any one of (9) through (15), wherein the semiconductor element is a solid imaging element.

According to the invention, the signal charges are amplified by the plurality of read gates provided between the photoelectric conversion portions and the vertical transfer paths. By amplifying the signal charge at a position proximate to the photoelectric conversion portion in this way, it can be avoided that the signal charge is amplified along with a noise generated at the vertical transfer path or the horizontal transfer path as in a constitution of amplifying the signal charge on a downstream side of the transfer path of a CCD amplifier of the background art or the like.

Further, by constructing a constitution of reading the signal charges by the plurality of read gates respectively having different amplification factors, the amplification factor can be changed to constitute an amount of the signal charge suitable for an imaging environment. For example, in taking an image at a bright scene, a necessary amount of the signal charge can sufficiently be ensured, and therefore, by transferring the signal charge from the read gates having a small amplification factor, a saturated amount of charge of the vertical transfer path can be prevented from being exceeded. Further, in taking an image at a dark scene, an amount of the signal charge generated by the photoelectric conversion portion is small, and therefore, a sufficient amount of the signal charge can be ensured by transferring the signal charge from the read gate having the large amplification factor, further, an S/N ratio can be promoted.

The above-described second object of the invention is achieved by the second inventions below.

That is, in order to resolve the above-described problem, there is provided a solid imaging apparatus comprising a solid imaging element, the solid imaging element comprising: high sensitivity elements and low sensitivity elements that are two-dimensionally arranged, in which the high sensitivity elements are light receiving elements having a higher photoelectric conversion efficiency and the low sensitivity elements are light receiving elements having a lower photoelectric conversion efficiency relative to the high sensitivity elements; a transferring section to which signal charges, generated by photoelectric conversion and stored to the high sensitivity and low sensitivity elements, are transferred to be read as an image signal; low sensitivity gates that read the signal charge stored in the low sensitivity elements; and high sensitivity gates that read the signal charge stored in the high sensitivity elements, wherein an electric field intensity relatively stronger than that generated at the high sensitivity gates is generated at the low sensitivity gates.

Further, in order to resolve the above-described problem, there is provided a solid imaging apparatus comprising a solid imaging element, the solid imaging element comprising: high sensitivity elements and low sensitivity elements that are two-dimensionally arranged, in which the high sensitivity elements are light receiving elements having a higher photoelectric conversion efficiency and the low sensitivity elements are light receiving elements having a lower photoelectric conversion efficiency relative to the high sensitivity elements; a transferring section to which signal charges, generated by photoelectric conversion and stored to the high sensitivity and low sensitivity elements, are transferred to be read as an image signal; and a gate electrode that read the signal charge stored in the high sensitivity and low sensitivity elements, the gate electrode being separated for the high sensitivity elements and the low sensitivity elements, wherein the solid imaging apparatus further comprises a driving section that generates a read pulse for reading the signal charge by being applied to the gate electrode, wherein the driving section outputs a first read pulse applied to the low sensitivity elements at a positive voltage relatively higher than that of a second read pulse applied to the high sensitivity elements, in accordance with whether a predetermined condition is satisfied.

DETAILED DESCRIPTION OF THE INVENTION

An embodiment of the first invention will be explained in details in reference to the drawings as follows.

Figure 1:
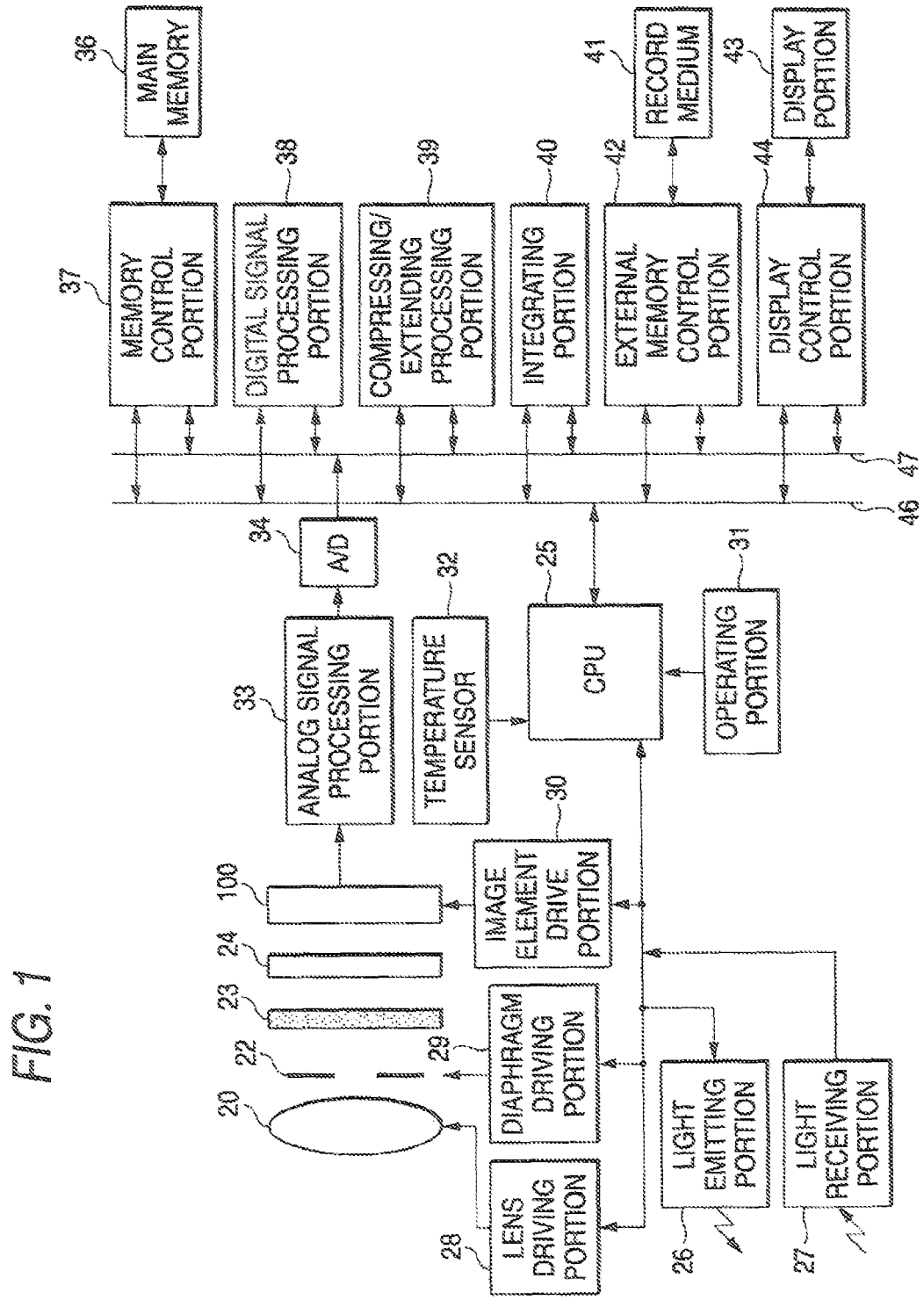
FIG. 1 is a function block diagram of a digital camera according to the invention.

FIG. 1 is a function block diagram of a digital camera according to an embodiment of the invention. An illustrated digital camera includes an imaging lens 20, a CCD type solid imaging element 100, and a diaphragm 22, an infrared ray cut filter 23, an optical low pass filter 24 therebetween.

CPU 25 for governing to control a total of an electric control system of the digital camera controls a flash light emitting portion 26 and a light receiving portion 27, adjusts a position of the imaging lens 20 to a focus position by controlling a lens driving portion 28 or adjusts zoom, and adjusts an exposure amount by controlling by an amount of opening the diaphragm 22 by way of a diaphragm driving portion 29.

Further, CPU 25 outputs an object image taken by way of the imaging lens 20 as a color signal by driving the solid imaging element 100 by way of an imaging element driving portion 30. CPU 25 is inputted with an instruction signal from a user by way of an operating portion 31, further, inputted with a detecting signal from a temperature sensor 32 for detecting a temperature of the solid imaging element 100 and CPU 25 carries out various controls in accordance with the signals.

The electric control system of the digital camera includes an analog signal processing portion 33 connected to an output of the solid imaging element 100, and an A/D conversion circuit 34 for converting a color signal of RGB outputted from the analog signal processing portion 33 into a digital signal, and these are controlled by CPU 25.

Further, the electric control system of the digital camera includes a memory control portion 37 connected to a main memory (frame memory) 36, a digital signal processing portion 38 for carrying out an interpolation operation and a gamma correction operation, an RGB/YC conversion processing and the like, a compressing and extending processing portion 39 for compressing a taken image to a JPEG image or extending a compressed image, an integrating portion 40 for calculating a gain of a white balance correction carried out by the digital signal processing portion 38 by integrating a measured optical data, an external memory control portion 42 connected with an attachable/detachable record medium 41, and a display control portion 44 connected with a liquid crystal display portion 43 mounted to a camera back face or the like, these are connected to each other by a control bus 46 and a data bus 47, and controlled by an instruction from CPU 25.

Next, a first embodiment of a semiconductor element according to the invention will be explained. Further, although in the following embodiment, an explanation will be given by taking an example of a solid imaging element as a semiconductor element, the invention is not limited thereto but an image sensor of a CMOS type may be used.

Figure 2:
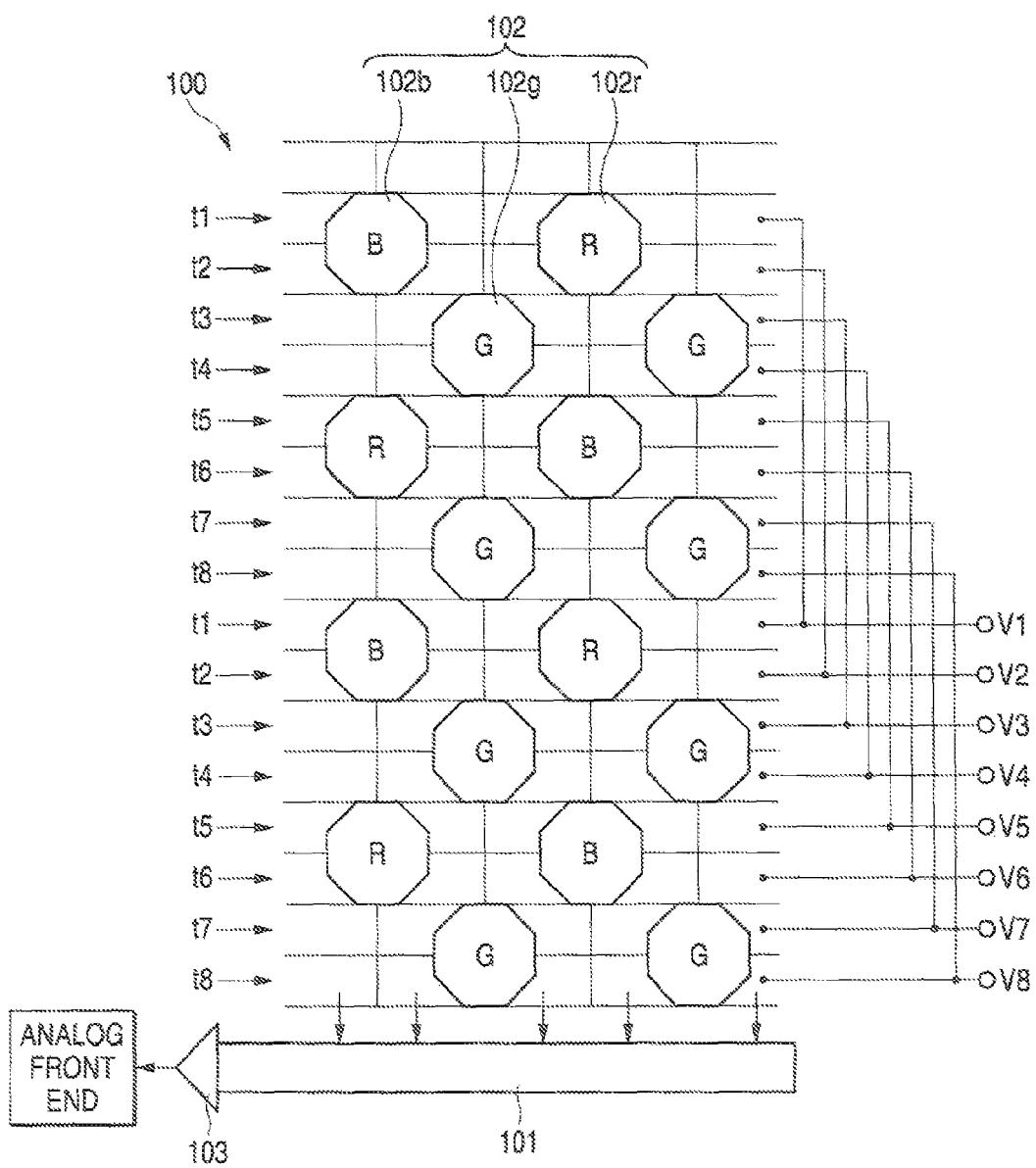
FIG. 2 is a view for explaining a semiconductor element according to a first embodiment and its driving method.
Figure 3:
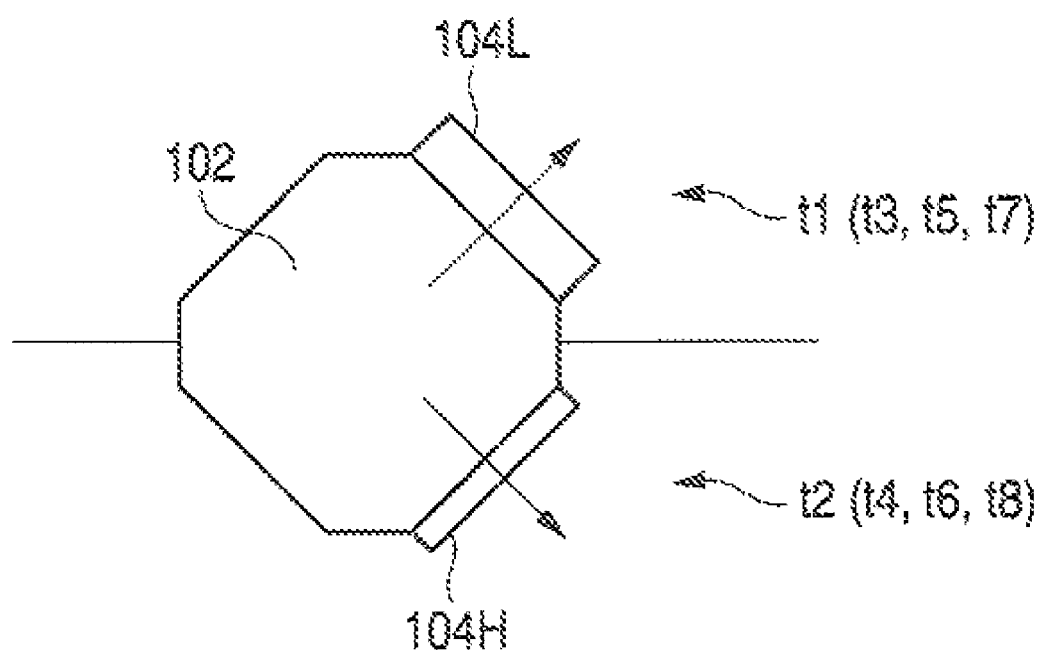
FIG. 3 is a view for explaining the semiconductor element according to the first embodiment and its driving method.

FIG. 2 and FIG. 3 are diagrams for explaining a semiconductor element of the embodiment and its driving method. The solid imaging element 100 is provided with a photodiode 102 functioning as a photoelectric conversion portion aligned with respective pixels in a honeycomb-like shape. The respective pixels are arranged above the photodiode 102 aligned with a color filter of G square R/B complete checker alignment in a honeycomb-like shape. Here, in the color filter, a red (R) component, a green (G) component, a blue (B) component are aligned at each pixel of an imaging face. According to the embodiment, a photodiode for electrically converting light of the red component is designated by notation 102r, a photodiode for electrically converting light of the green component is designated by notation 102g, a photodiode for electrically converting light of the blue component is designated by notation 102b. Further, in FIG. 2 the respective photodiodes are designated by notations R, G, B in accordance with a color component of received light.

As shown by FIG. 2, the solid imaging element 100 is provided with a vertical transfer path by shifting a position of the photodiode by a ½ horizontal pitch of the actual pixel at each horizontal line to align in a checker lattice shape and knitting the respective photodiodes 102 in a zigzag shape in a vertical direction.

A shape of the diode 102 constituting a pixel is not limited to a hexagonal shape as in the embodiment but may be a polygonal shape of a quadrangular shape or a shape having more angles or a circular shape.

Each vertical transfer path is provided with vertical transfer electrodes t1 through t8 forming 8 regions and the vertical transfer electrodes t1 through t8 are respectively provided with drive electrodes V1 through V8 according to the embodiment. The vertical transfer path is constituted by a structure of 8 electrodes per one photodiode by the drive electrodes V1 through V8. Further, in FIG. 2, the respective electrodes are respectively connected in a horizontal scanning direction for the respective regions of the vertical transfer electrodes t1 through t8 of the vertical transfer path although partially omitted to avoid complication of the drawing.

In driving, when the vertical transfer electrodes t1 through t8 are supplied with drive pulses having different timings of the respective photodiodes 102 from the drive electrodes V1 through V8, signal charges generated by the respective photodiodes 102 are read to the vertical transfer path by way of read gates, and are moved in the vertical direction in accordance with changes in potentials of the vertical transfer electrodes along the vertical transfer path. Further, when the signal charges are moved to a horizontal transfer path 101 from the vertical transfer path, the signal charges are transferred at high speed on the horizontal transfer path 101 by horizontal drive pulses. A signal charge moved to a terminal end portion of the horizontal transfer path 101 is detected by an output amplifier 103 and is outputted to an analog front end of the imaging apparatus.

The photodiode 102 according to the embodiment is formed with a first read gate 104H at a portion thereof on an upper side in the vertical direction and connected to the vertical transfer electrodes t2, t4, t6, t8, and is formed with a second read gate 104L at a portion thereof on a lower side in the vertical direction and connected with the vertical transfer electrodes t1, t3, t5, t7. The first read gate 104H and the second read gate 104L are formed such that thicknesses thereof in the transfer direction designated by arrow marks in FIG. 3 differ from each other. According to the second read gate 104L, the thickness in the transfer direction is larger than that of the first read gate 104H, and therefore, a potential gradient becomes gradual, generation of impact ion is restrained, and the amplification factor of the signal charge is small. On the other hand, according to the first read gate 104H, the thickness in the transfer direction is smaller than that of the second read gate 104L, and therefore, the potential gradient becomes steep, generation of impact ion is accelerated, and the amplification factor of the signal charge is large. In this way, pluralities of the read gates 104L, 104H are formed for the respective photodiodes 102, and formed such that the amplification factors of the respective pluralities of read gates 104L, 104H differ from each other. According to the embodiment, a ratio of the amplification factors between the read gates 104L and 104H is constituted to be 1:1.5.

Further, according to the embodiment, there is constructed a constitution in which the pluralities of read gates 104L, 104H are provided at positions of transferring the signal charges to the same vertical transfer paths relative to the photoelectric conversion portions 102. However, the solid imaging element according to the invention is not limited thereto but as shown by an embodiment shown below, the pluralities of read gates 104L, 104H may be provided at positions of transferring the signal charges to vertical transfer paths respectively different from each other relative to the photoelectric conversion portions 102.

FIG. 4 through FIG. 7 are views for explaining a state of driving the semiconductor element according to the embodiment.

Figure 4:
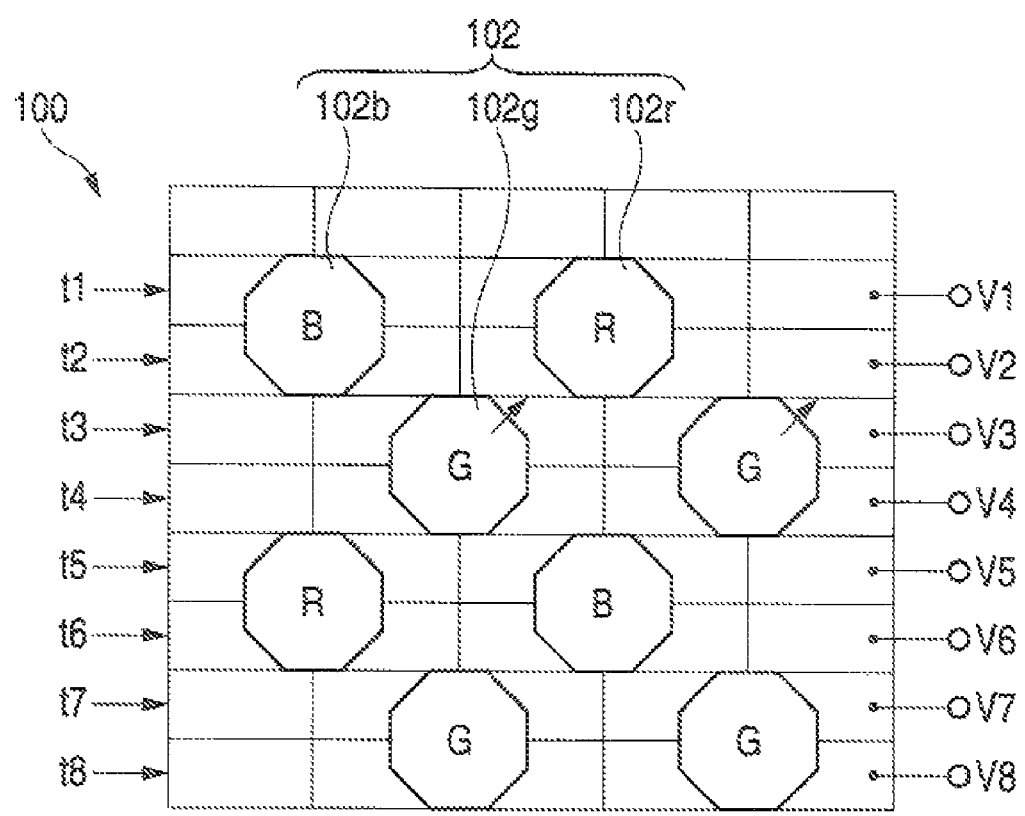
FIG. 4 is a view for explaining a state of driving the semiconductor element according to the first embodiment.
Figure 5:
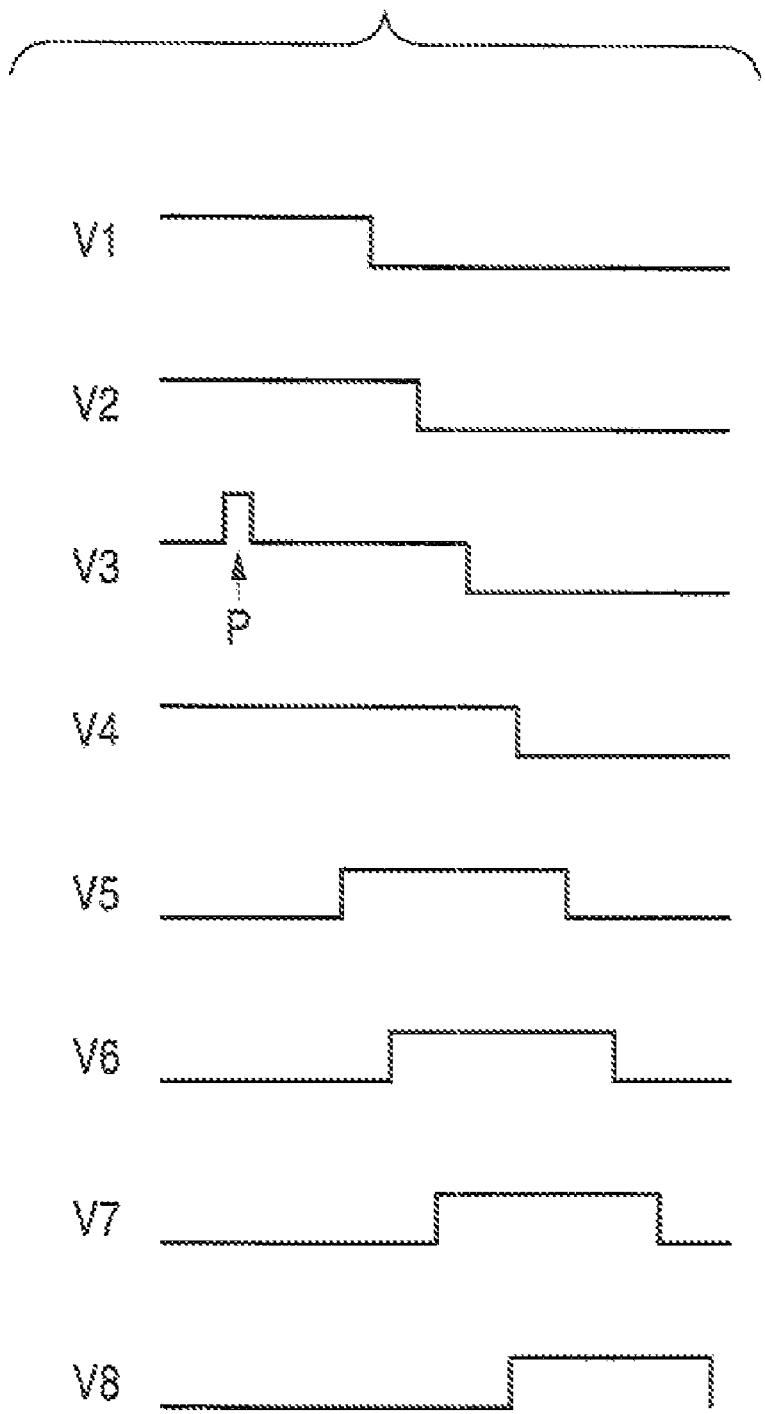
FIG. 5 is a view for explaining a state of driving the semiconductor element according to the first embodiment.

In FIG. 4 and FIG. 5, there is shown driving of the semiconductor element when the read gate of the photodiode 102g is present at a charge transfer electrode t3. By applying a read pulse P at the drive electrode V3 connected to the charge transfer electrode t3 by a predetermined timing, as shown by an arrow mark in FIG. 4, the signal charge of the photodiode 102g is amplified by the read gate 104L and read by the vertical transfer electrode t3.

Figure 6:
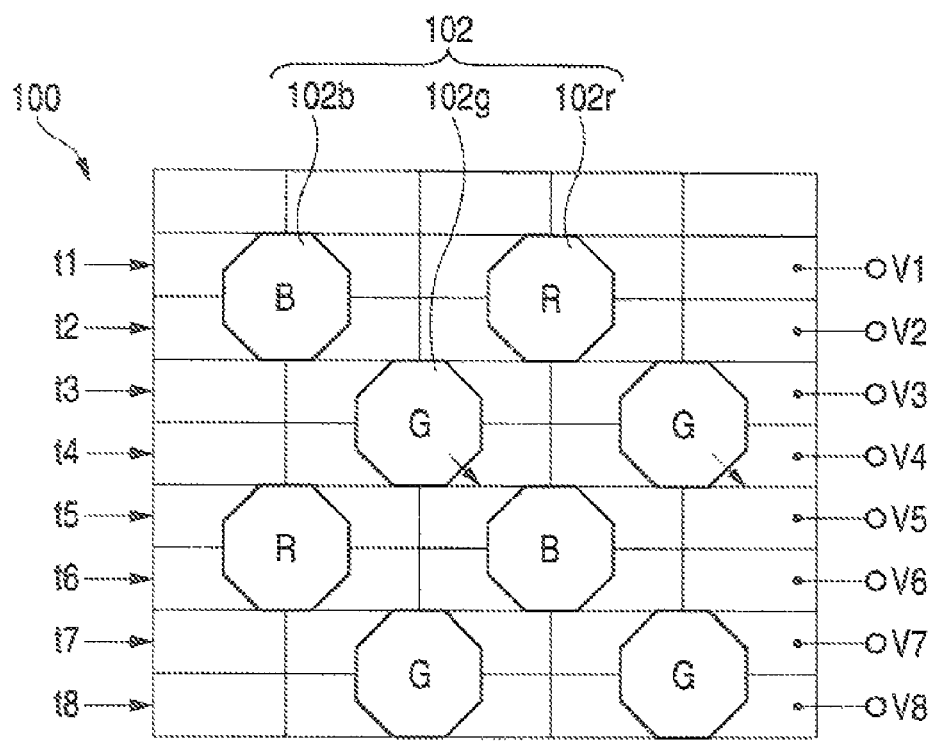
FIG. 6 is a view for explaining a state of driving the semiconductor element according to the first embodiment.
Figure 7:
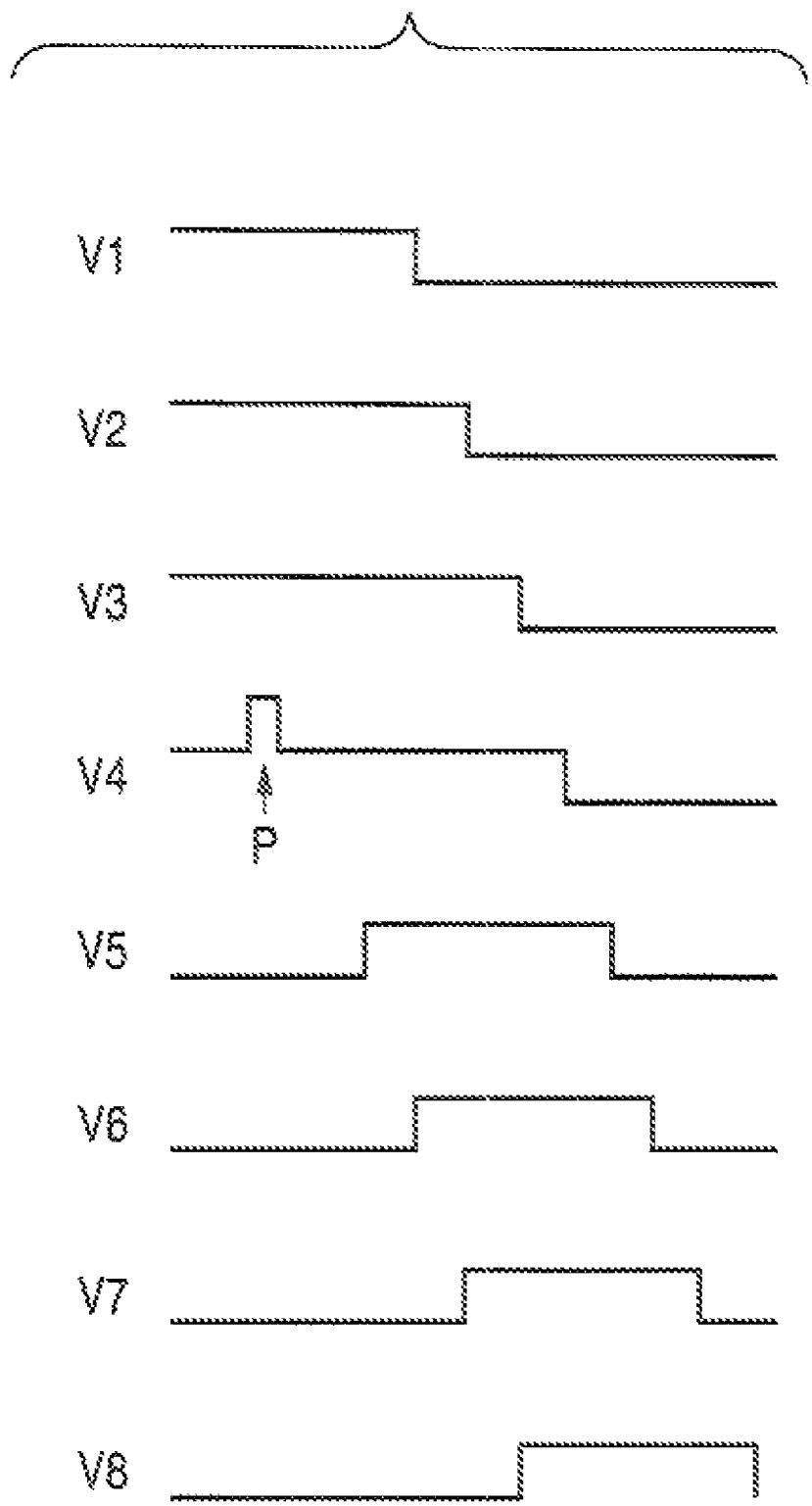
FIG. 7 is a view for explaining a state of driving the semiconductor element according to the first embodiment.

FIG. 6 and FIG. 7 show driving the semiconductor element when the read gate of the photodiode 102g is present at the charge transfer electrode t4. By applying the read pulse P at the drive electrode V4 connected to the charge transfer electrode t4 by a predetermined timing, as shown by an arrow mark in FIG. 6, the signal charge of the photodiode 102g is amplified by the read gate 104H and is read by the vertical transfer electrode t4.

The solid imaging element 100 according to the embodiment amplifies the signal charges by the pluralities of read gates 104L, 104H provided between the photoelectric conversion portion 102 and the vertical transfer path. By amplifying the signal charge at a position proximate to the photoelectric conversion portion 102 in this way, it can be avoided that the signal charge is amplified along with a noise generated at the vertical transfer path or the horizontal transfer path 101 as in the constitution of the background art in which the signal charge is amplified on a downstream side of a transfer path such as the CCD amplifier.

Further, by constructing a constitution of reading the signal charges by the pluralities or read gates 104L, 104H respectively having different amplification factors, the amplification factors can be changed to constitute an amount of the signal charge suitable for the imaging environment. For example, in taking an image in a bright scene, a necessary amount of a signal charge can sufficiently be ensured, and therefore, by transferring the signal charge from the read gate having a small amplification factor, a saturated amount of charge at the vertical transfer path can be prevented from being exceeded. Further, in taking an image in a dark scene, an amount of the signal charge generated by the photoelectric conversion portion 102 is small, and therefore, a sufficient amount of the signal charge can be ensured by transferring the signal charge from the read gate having a large amplification factor, further, the S/N ratio can be promoted.

Figure 8:
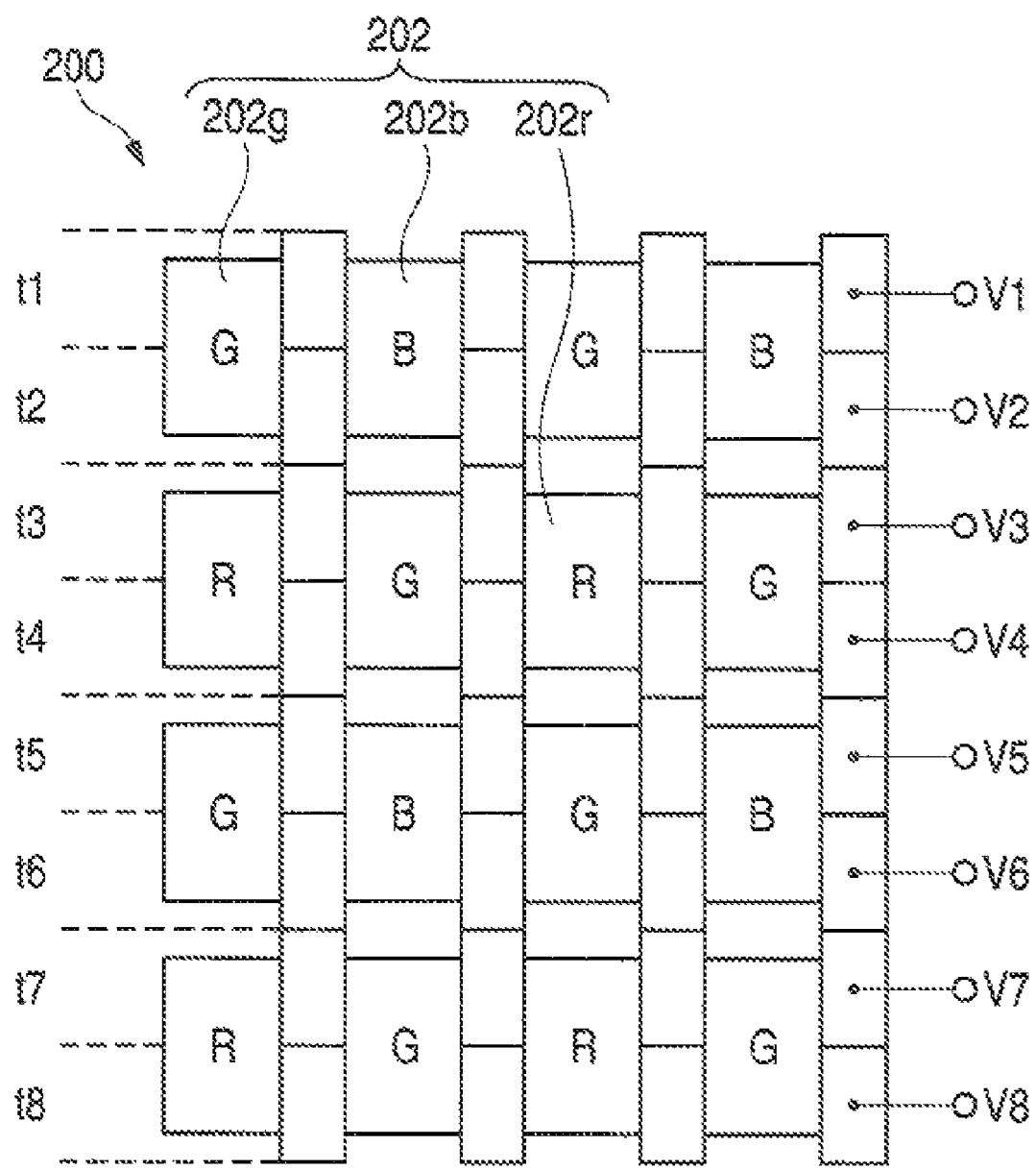
FIG. 8 is a view for explaining a constitution of a semiconductor element according to a second embodiment.
Figure 9:
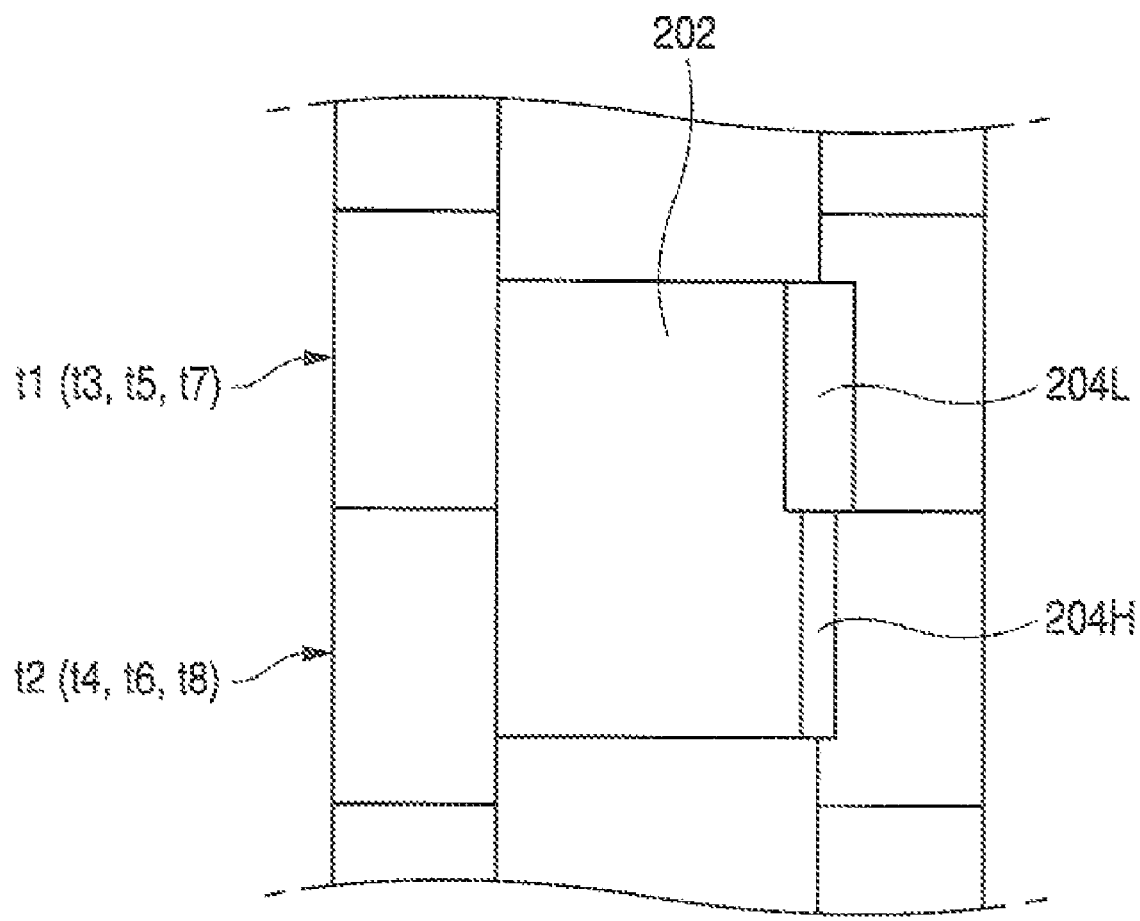
FIG. 9 is a view for explaining the constitution of the semiconductor element according to the second embodiment.

FIG. 8 and FIG. 9 show a second embodiment according to the invention. Further, in embodiments to be explained as follows, with regard to members or the like having constitution and operation equivalent to those of members or the like which have already been explained, by attaching the same notations or corresponding notations thereto in the drawings, an explanation thereof will be simplified or emitted.

The solid imaging element 200 according to the embodiment is provided with a structure of a so-to-speak Bayer alignment in which all of photoelectric conversion portions 202 are aligned in a shape of a square lattice. Specifically, there is constituted a structure in which columns alternately arranged with photoelectric conversion portions 202g for receiving G and photoelectric conversion portions 202r for receiving R in a row direction, and columns alternately arranged with photoelectric conversion portions 202b for receiving B and the photoelectric conversion portions 202g for receiving G in a row direction are arranged alternately in the column direction.

Vertical transfer paths extended linearly are formed in the vertical direction between the respective columns of the photoelectric conversion portions 202. The vertical transfer path is provided with the vertical transfer electrodes t1 through t8 forming 8 regions, and the vertical transfer electrodes t1 through t8 are respectively connected with the drive electrodes V1 through V8. Further, the respective electrodes are respectively connected in a horizontal scanning direction to respective regions of the vertical transfer electrodes t1 through t8 of the vertical transfer paths although partially omitted to avoid complication of the drawing.

Similar to the above-described embodiment, in driving, the vertical transfer electrodes t1 through t8 are supplied with drive pulses having different timings for the respective photodiodes 202 from the drive electrodes V1 through V8, and signal charges generated by the respective photodiodes 202 are read by the vertical transfer paths by way of the read gates. Further, the signal charges are moved in the vertical direction in accordance with changes in potentials of the vertical transfer electrodes t1 through t8 along the vertical transfer paths. Further, the signal charges are moved from the vertical transfer paths to a horizontal transfer path, not illustrated, and the signal charges moved to a terminal end portion of the horizontal transfer path are outputted to an analog front end of an imaging apparatus by way of an output amplifier.

The photodiodes 202 according to the embodiment are formed with first read gates 204H at portions thereof on an upper side in the vertical direction and connected to the vertical transfer electrodes t2, t4, t6, t8, and formed with second read gates 204L at portions thereof on a lower side in the vertical direction and connected with the vertical transfer electrodes t1, t3, t5, t7. The first read gate 204H and the second read gate 204L are formed such that thicknesses thereof in a transfer direction (horizontal direction in FIG. 9) differ from each other. The thickness in the transfer direction of the second read gate 204L is larger than that of the first read gate 204H, and therefore, a potential gradient becomes gradual, generation of impact ion is restrained, and an amplification factor of the signal charge is small. On the other hand, the thickness in the transfer direction of the first read gate 204H is smaller than that of the second read gate 204L, and therefore, the potential gradient becomes steep, generation of impact ion is accelerated, and the amplification factor of the signal charge is large. In this way, pluralities of the read gates 204L, 204H are formed and formed such that the amplification factors of the respective pluralities of read gates 204L, 204H differ from each other relative to the respective photodiodes 202.

According to the solid imaging element 200 of the embodiment, it can be avoided that the signal charge is amplified along with a noise generated at the vertical transfer path or the horizontal transfer path, and the amplification factor can be changed to constitute an amount of the signal charge suitable for the imaging environment.

Next, a third embodiment according to the invention will be explained.

Figure 10:
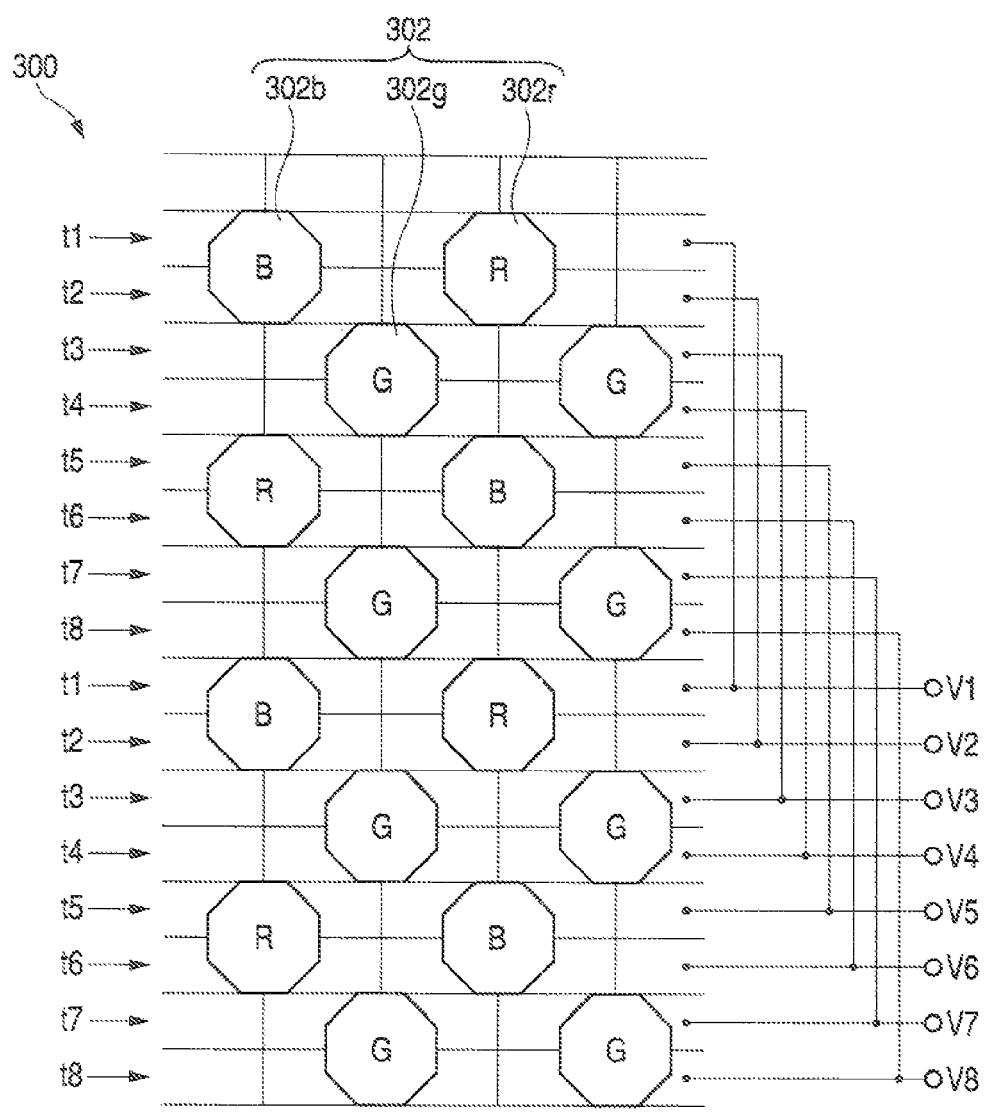
FIG. 10 is a view for explaining a constitution of a solid imaging element according to a third embodiment.
Figure 11:
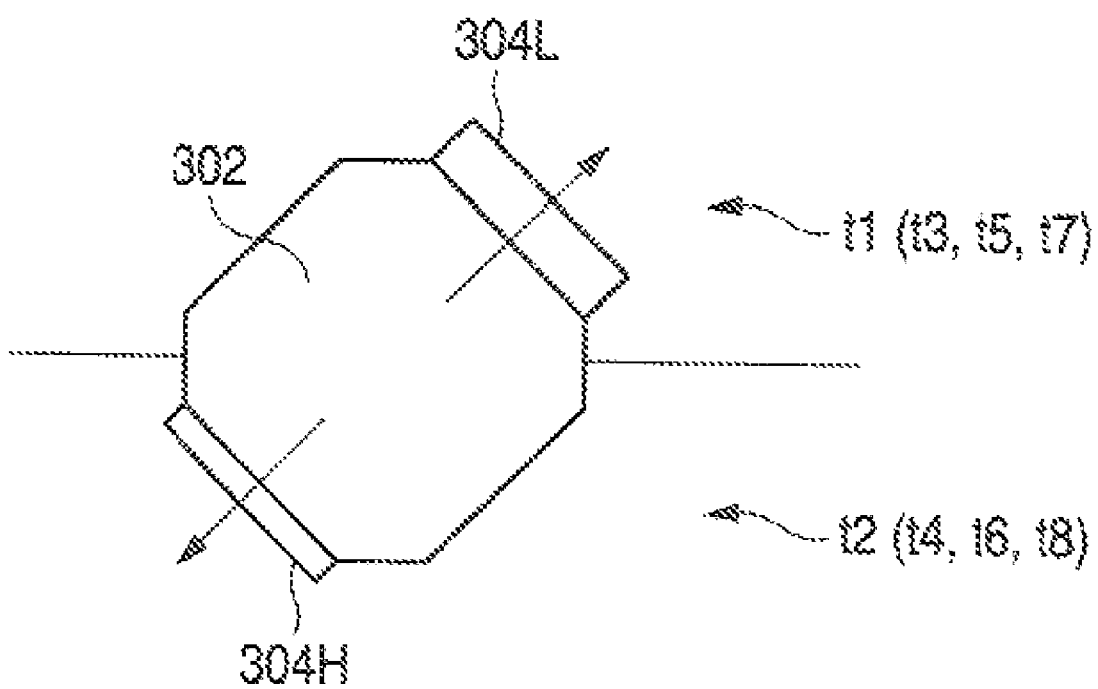
FIG. 11 is a view for explaining the constitution of the solid imaging element according to the third embodiment.
Figure 12:
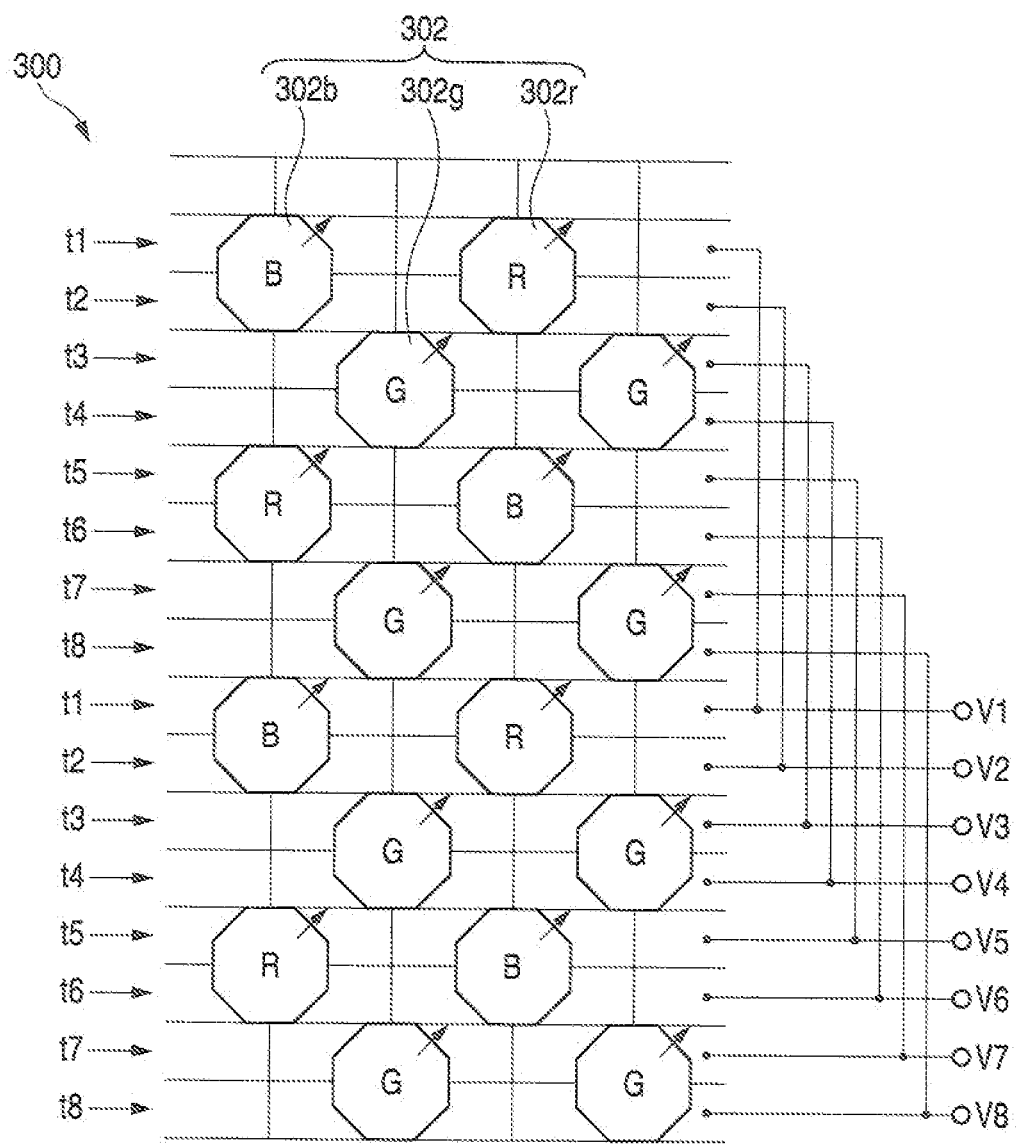
FIG. 12 is a view for explaining a state when the solid imaging element of the third embodiment is driven.
Figure 13:
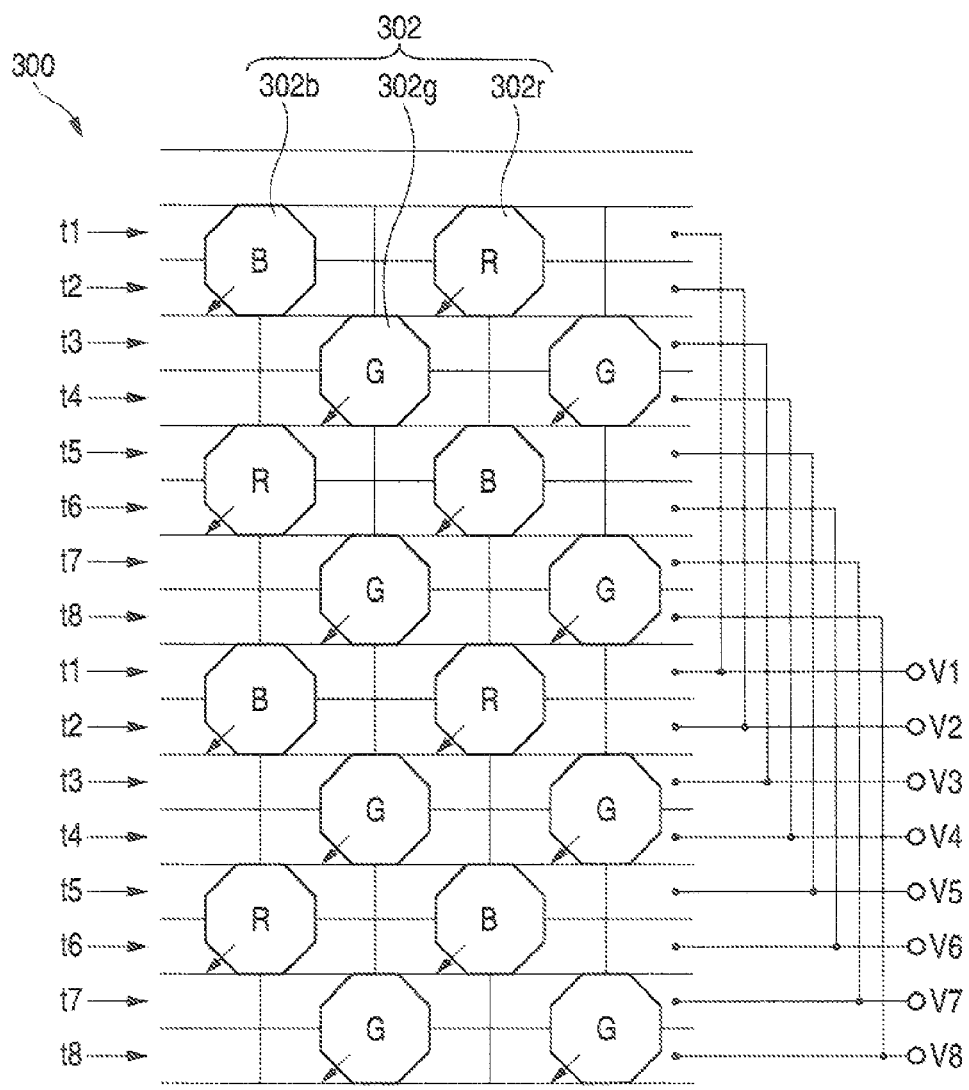
FIG. 13 is a view for explaining a state when the solid imaging element of the third embodiment is driven.

FIG. 10 and FIG. 11 are views for explaining a constitution of a solid imaging element according to the embodiment. FIG. 12 and FIG. 13 are views for explaining states when the solid imaging element of the embodiment is driven.

A solid imaging element 300 according to the embodiment is constructed by a constitution of arranging photoelectric conversion portions 302 in a honeycomb-like shape, and structures of the vertical transfer electrodes t1 through t8 and the drive electrodes V1 through V8 are the same as those in the constitution of the first embodiment.

The photoelectric conversion portion 302 is provided with a first read gate 304H and a second read gate 304L to constitute a pair on a diagonal line thereof. The second read gate 304L is formed at a portion connected to any of the electrodes t1, t3, t5, t7, and the first read gate 304H is formed at a position connected to any one of the electrodes t2, t4, t6, t8 of a vertical transfer path leftward contiguous to a vertical transfer path to which the second read gate 304L is connected. As shown by FIG. 11, according to the first read gate 304H and the second read gate 304L, directions of transferring the signal charges constitute directions reverse to each other.

In this way, according to the embodiment, the respective read gates 304L, 304H are provided at positions of transferring the signal charges to different vertical transfer paths relative to the photoelectric conversion portion 302.

According to the second read gate 304L, a thickness thereof in the transfer direction indicated by an arrow mark of FIG. 11 is larger than that of the first read gate 304H, and therefore, a potential gradient becomes gradual, generation of impact ion is restrained, and an amplification factor of the signal charge is small. On the other hand, according to the first read gate 304H, a thickness thereof in the transfer direction indicated by an arrow mark of FIG. 11 is smaller than that of the second read gate 304L, and therefore, a potential gradient becomes steep, generation of impact ion is accelerated, and the amplification factor of the signal charge is large.

FIG. 12 shows a case of reading the signal charges from the second read gates 304L of the respective photoelectric conversion portions 302. For example, when the signal charges of the photoelectric conversion portion 302g of G are read from the second read gates 304H, by applying read pulses to the drive electrodes V3, V7, the signal charge can be transferred to the vertical transfer electrode on a right side of a column of the photoelectric conversion portion 302g of G.

FIG. 13 shows a case of reading the signal charges from the first read gates 304H of the respective photoelectric conversion portions 302. For example, when the signal charges of the photoelectric conversion portions 302b, 302r of B, R are read from the first read gates 304H, by applying read pulses to the drive electrodes V2, V6, the signal charge can be transferred to the vertical transfer electrode on a left side of a column of the photoelectric conversion portion 302b, r of B, R.

Figure 14:
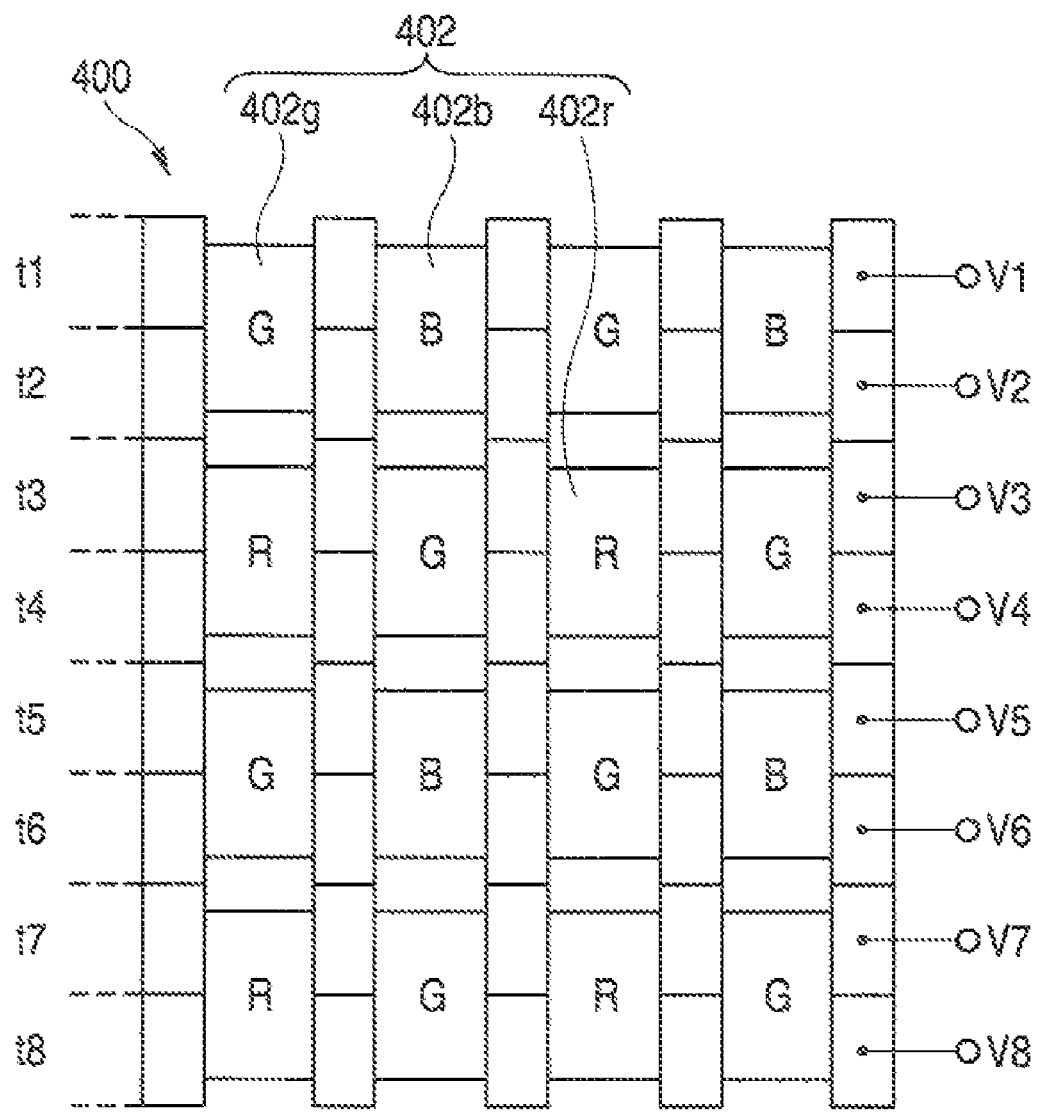
FIG. 14 is a view for explaining a constitution or a solid imaging element according to a fourth embodiment.
Figure 15:
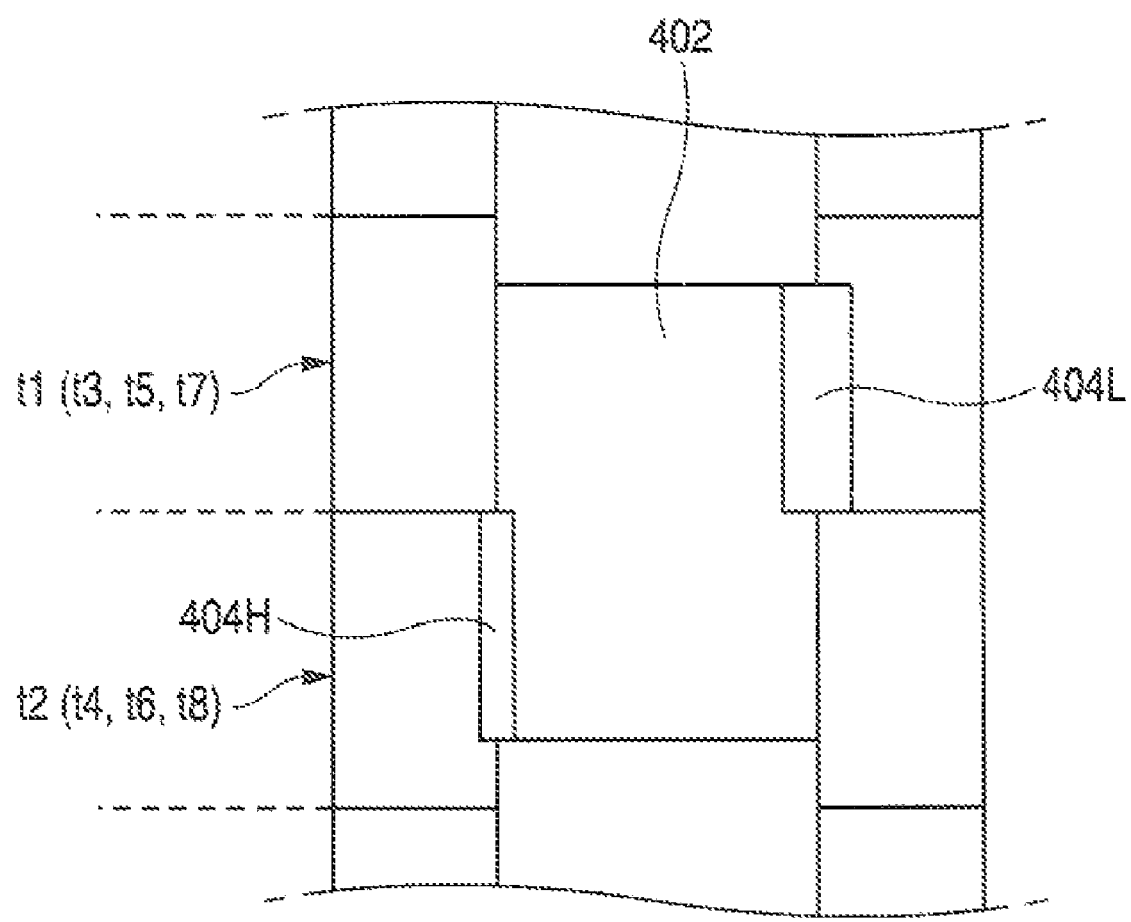
FIG. 15 is a view for explaining the constitution of the solid imaging element according to the fourth embodiment.
Figure 16:
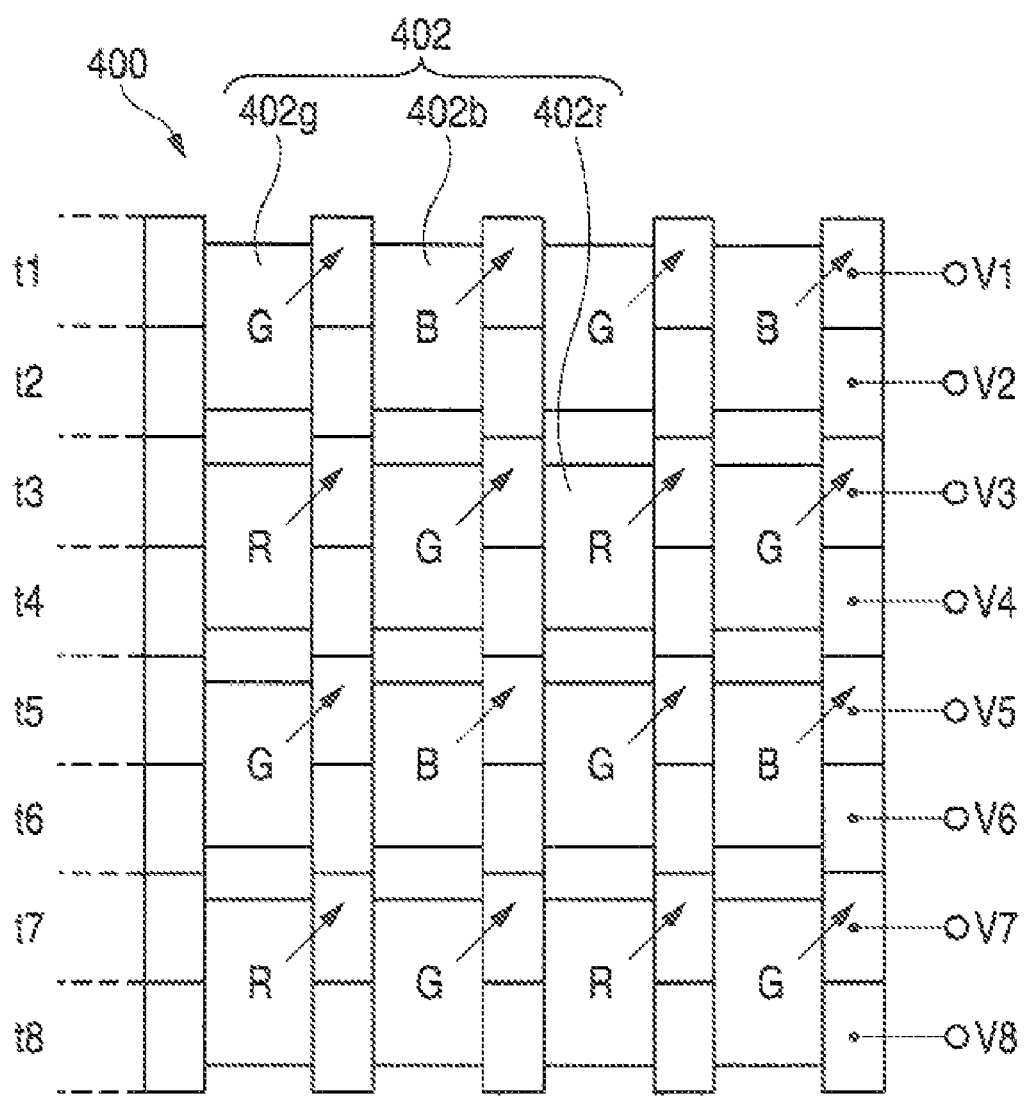
FIG. 16 is a view for explaining a state when the solid imaging element of the fourth embodiment is driven.
Figure 17:
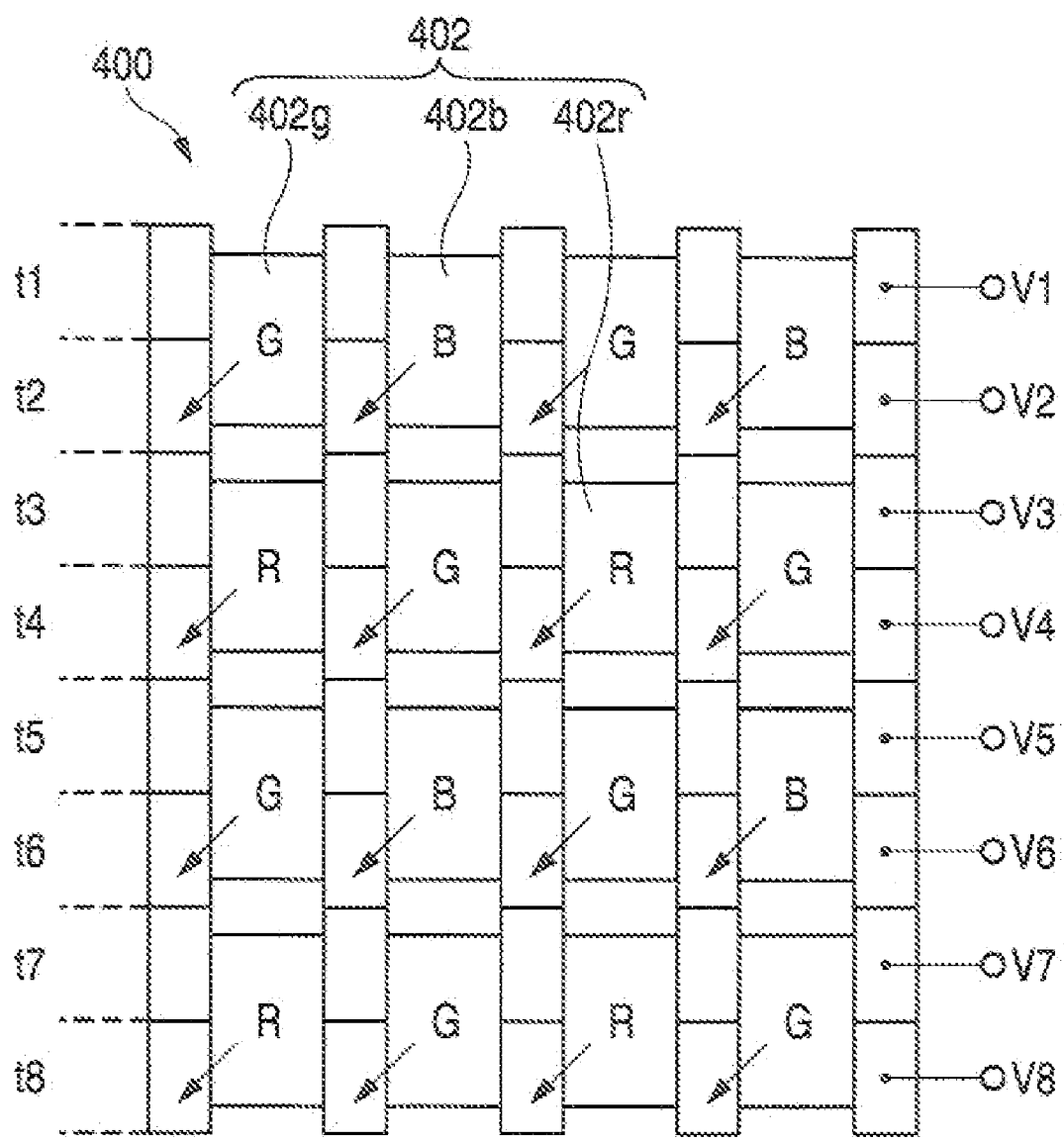
FIG. 17 is a view for explaining a state when the solid imaging element of the fourth embodiment is driven.

Next, a fourth embodiment according to the invention will be explained FIG. 14 and FIG. 15 are views for explaining a constitution of a solid imaging element of the embodiment FIG. 16 and FIG. 17 are views for explaining states when the solid imaging element of the embodiment is driven.

A solid image element 400 is provided with a structure of Bayer alignment in which all of photoelectric conversion portions 402 are aligned in a shape of a square lattice similar to the second embodiment. Other constitutions of the vertical transfer electrodes t1 through t8 and the drive electrodes V1 through V8 are the same as those of the second embodiment.

The photoelectric conversion portion 402 is formed with a first read gate 401H and a second read gate 404L to constitute a pair in the horizontal direction (left and right direction in FIG. 15). The second read gate 404L is formed at a position connected to any of the electrodes t1, t3, t5, t7 and the vertical transfer path on aright side in the horizontal direction of the photoelectric conversion portion 402. Further, the first read gate 404H is formed at a position connected to any of the electrodes t2, t4, t6, t8 of the vertical transfer path on the left side in the horizontal direction of the photoelectric conversion portion 402. According to the first read gate 404H and the second read gate 404L, as shown by FIG. 15, directions of transferring signal charges are constituted by directions reverse to each other. In this way, according to the embodiment, the respective lead gates 404L, 404R are provided at the positions of transferring the signal charges to the vertical transfer paths different from each other relative to the photoelectric conversion portion 402.

According to the second read gate 404L, a thickness thereof in the transfer direction is larger than that of the first read gate 404H, and therefore, a potential gradient becomes gradual, generation of impact ion is restrained, and the amplification factor of the signal charge is small. On the other hand, according to the first read gate 404H, a thickness thereof in the transfer direction is smaller than that of the second read gate 404L, and therefore, the potential gradient becomes steep, generation of impact ion is accelerated, and the amplification factor of the signal charge is large.

FIG. 16 shows a case of reading the signal charges from the second read gates 404L of the respective photoelectric conversion portions 402. For example, when the signal charge of the photoelectric conversion portion 402g of G is read from the second read gate 404L, by applying the read pulse to any of the drive electrodes V1, V3, V5, V7, the signal charge can be transferred to the vertical transfer path on a right side of a column of the photoelectric conversion portion 402g of G.

FIG. 17 shows a case of reading the signal charges from the first read gates 404H of the respective photoelectric conversion portions 402. For example, when the signal charges of the photoelectric conversion portions 402b, 402r of B, R are read from the first read gate 404H, by applying a read pulse to any of the drive electrodes V2, V4, V6, V8, the signal charges can be transferred to the vertical transfer paths on a left side of a column of the photoelectric conversion portions 402b, 402r of B, R.

Next, a fifth embodiment according to the invention will be explained in reference to FIG. 18 and FIG. 19.

A solid imaging element 500 of the embodiment is aligned with photoelectric conversion portions 502 in a honeycomb-like shape. Further, a pattern of aligning color filters of R, G, B of the embodiment is the same as that of the first embodiment.

Further, a first read gate and a second read gate are provided to constitute a pair on a diagonal line similar to the third embodiment. The second read gate is formed at a position of connecting to any of the electrodes t1, t3, t5, t7, the first gate is formed at a position of connecting to any of the electrodes t2, t4, t6, t8 of the vertical transfer path leftward contiguous to the vertical transfer path connected with the second read gate. According to the first read gate and the second read gate, directions of transferring the signal charges are constituted by directions reverse to each other. In this way, according to the embodiment, the respective read gates are provided at the positions of transferring the signal charges to the vertical transfer paths different from each other relative to the respective photoelectric conversion portions 502.

The solid imaging element 500 is constituted such that a width w1 of the vertical transfer path between a column comprising the photoelectric conversion portions 502b, 502r of B, R and a column of photoelectric conversion portions 502g of G on one column right side of the column is larger than a width w2 of the vertical transfer path between a column of the photoelectric conversion portions 502g of G and a column comprising the photoelectric conversion portions 502b, 502r of B, R on one column right side of the column in a horizontal direction. Thereby; the vertical transfer path having the width w1 is larger than the vertical transfer path having the width w2, and therefore, the vertical transfer path having the width w1 is provided with a larger area, and therefore, a saturated amount of the signal charge can be enlarged.

According to the solid imaging element 500, the saturated amount of the signal charge at an odd number column can be made to be small in the column direction of the vertical transfer path, and the saturated amount of the signal charge of an even number column can be made to be large in the column direction of the vertical transfer path. Thereby, in a case in which the amount of the signal charge is increased when the photographing environment is bright, a signal charge of light of a corresponding color component can be transferred to the vertical transfer path having the large saturated amount.

Figure 18:
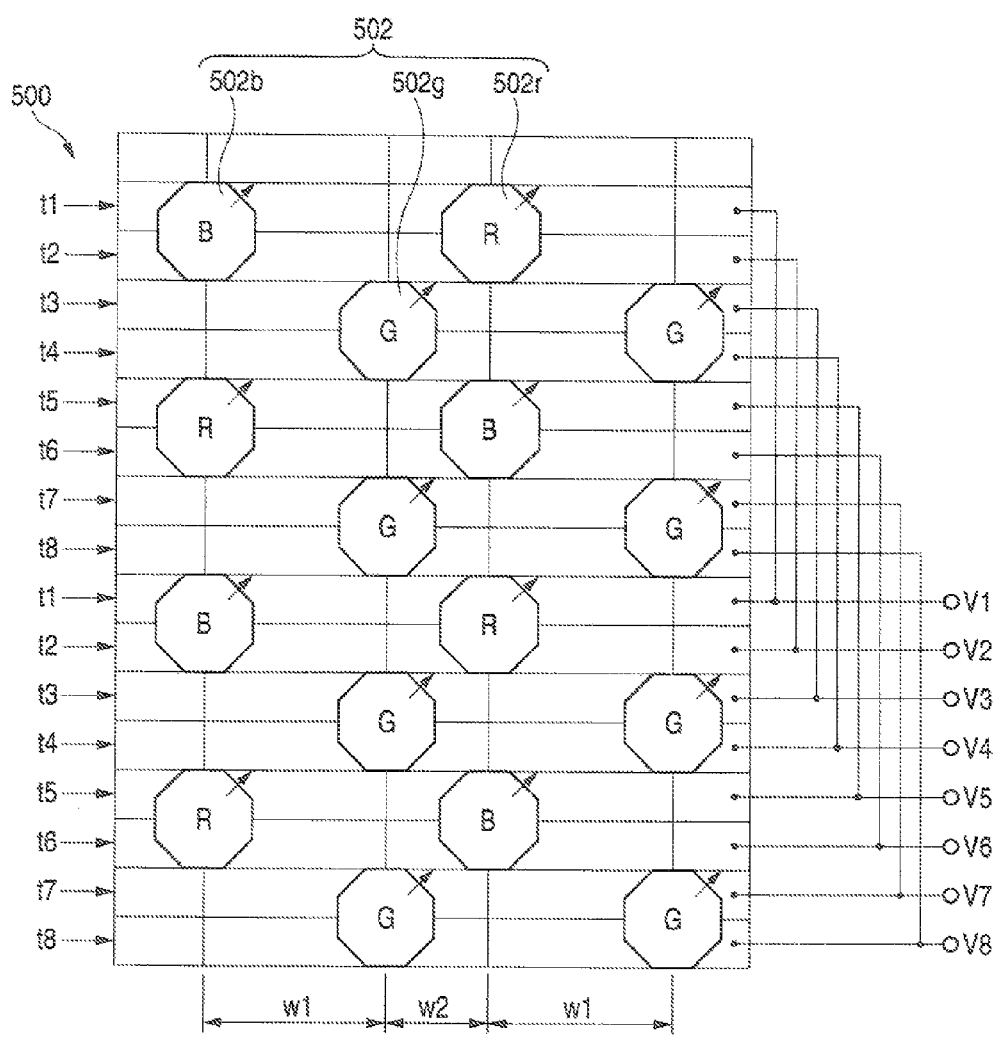
FIG. 18 is a view for explaining a constitution and a state of driving a solid imaging element according to a fifth embodiment.
Figure 19:
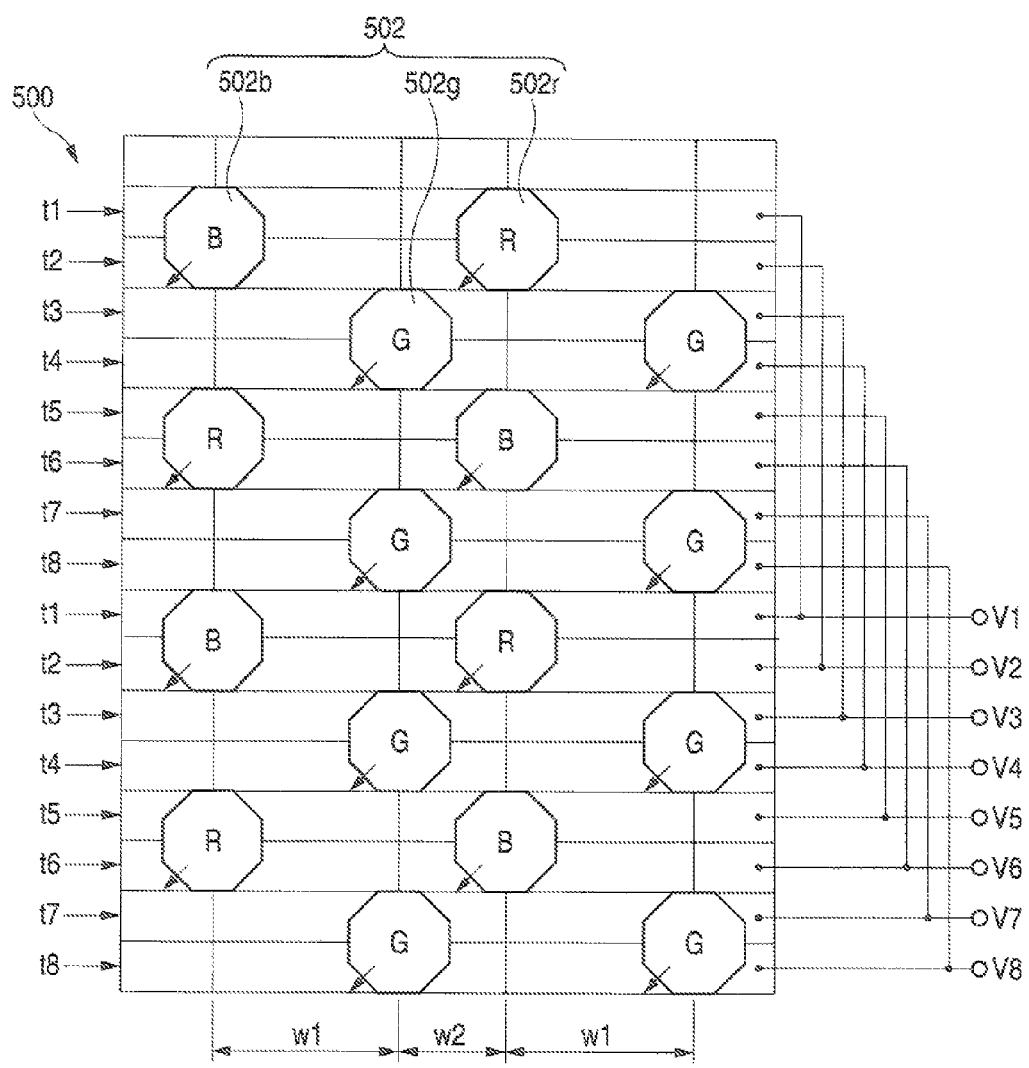
FIG. 19 is a view for explaining the constitution and the state of driving the solid imaging element according to the fifth embodiment.

FIG. 18 and FIG. 19 are views for explaining an example of a state of driving the solid imaging element 500 according to the embodiment.

Although according to a color filter pattern of the embodiment, a region of receiving G is large, and therefore, an explanation will be given by constituting a reference by the photoelectric conversion portion 502g of G, the invention is not limited thereto but the width of the vertical transfer path and the position of the read gate can be constituted by constituting references by the photoelectric conversion portions 502b, 502r of R and B in accordance with an arrangement of the color filters and an imaging situation.

As shown by FIG. 18, when the signal charge of the photoelectric conversion portion 502g of G is read from the second read gate having the small amplification factor of the photoelectric conversion portion 502g, the amount of the signal charge is not so large, and therefore, the signal charge is transferred to the vertical transfer path having the small photoelectric amount of the width w2.

On the other hand, as shown by FIG. 19, when the signal charge of the photoelectric conversion portion 502g of G is read from the first read gate having the large amplification factor of the photoelectric conversion portion 502g, the signal charge amount becomes large, and therefore, the signal charge is transferred to the vertical transfer path having the large saturated amount of the width w1.

Next, a sixth embodiment according to the invention will be explained in reference to FIGS. 20A and 20B and FIG. 21.

A solid imaging element 600 according to the embodiment is aligned with photoelectric conversion portions 602 in a Bayer shape. Further, a pattern of arranging color filters of R, G, B of the embodiment is the same as that of the second embodiment.

Figure 20A:
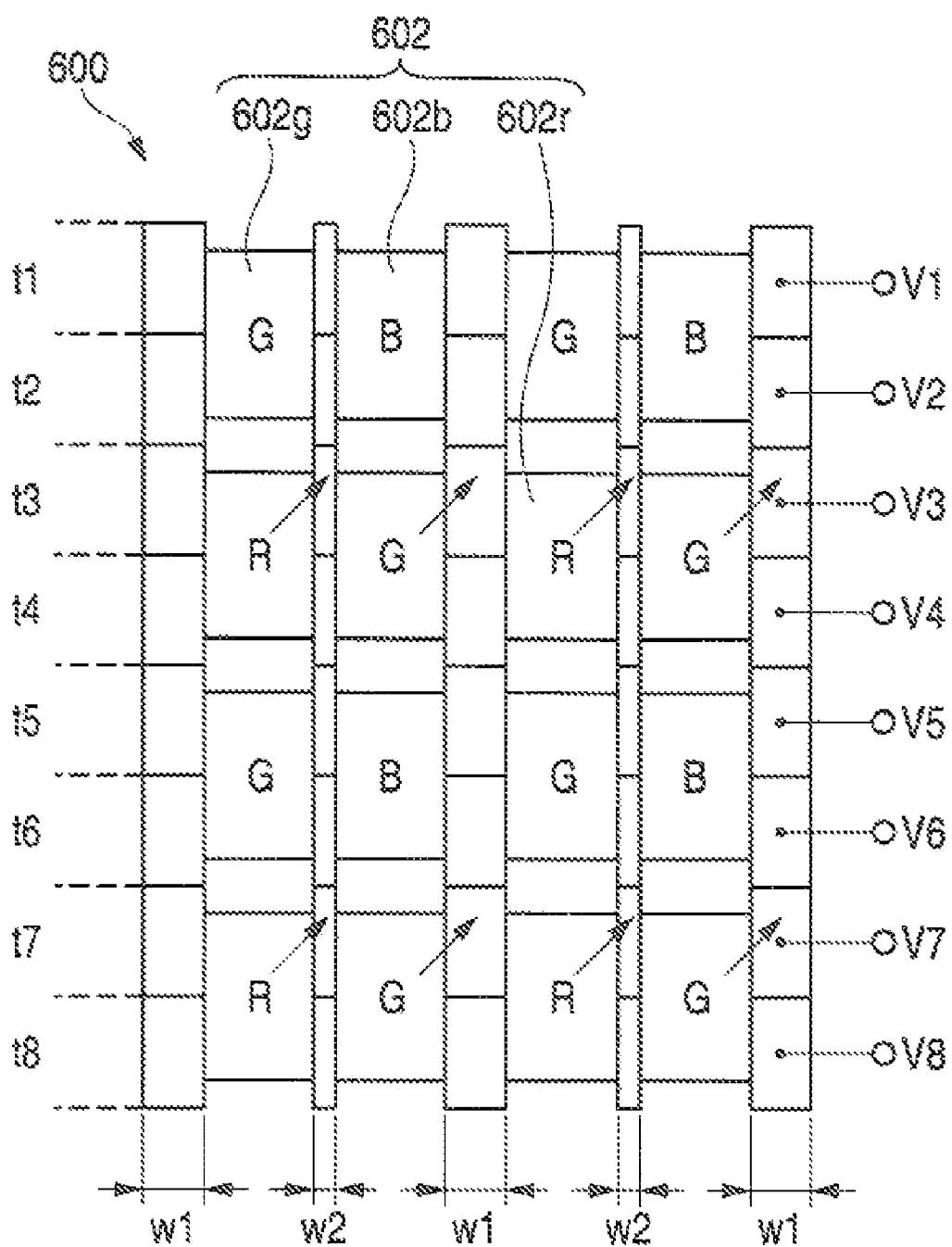
FIGS. 20A and 20B illustrate views for explaining a constitution and a state of driving a solid imaging element according to a sixth embodiment.
Figure 20B:
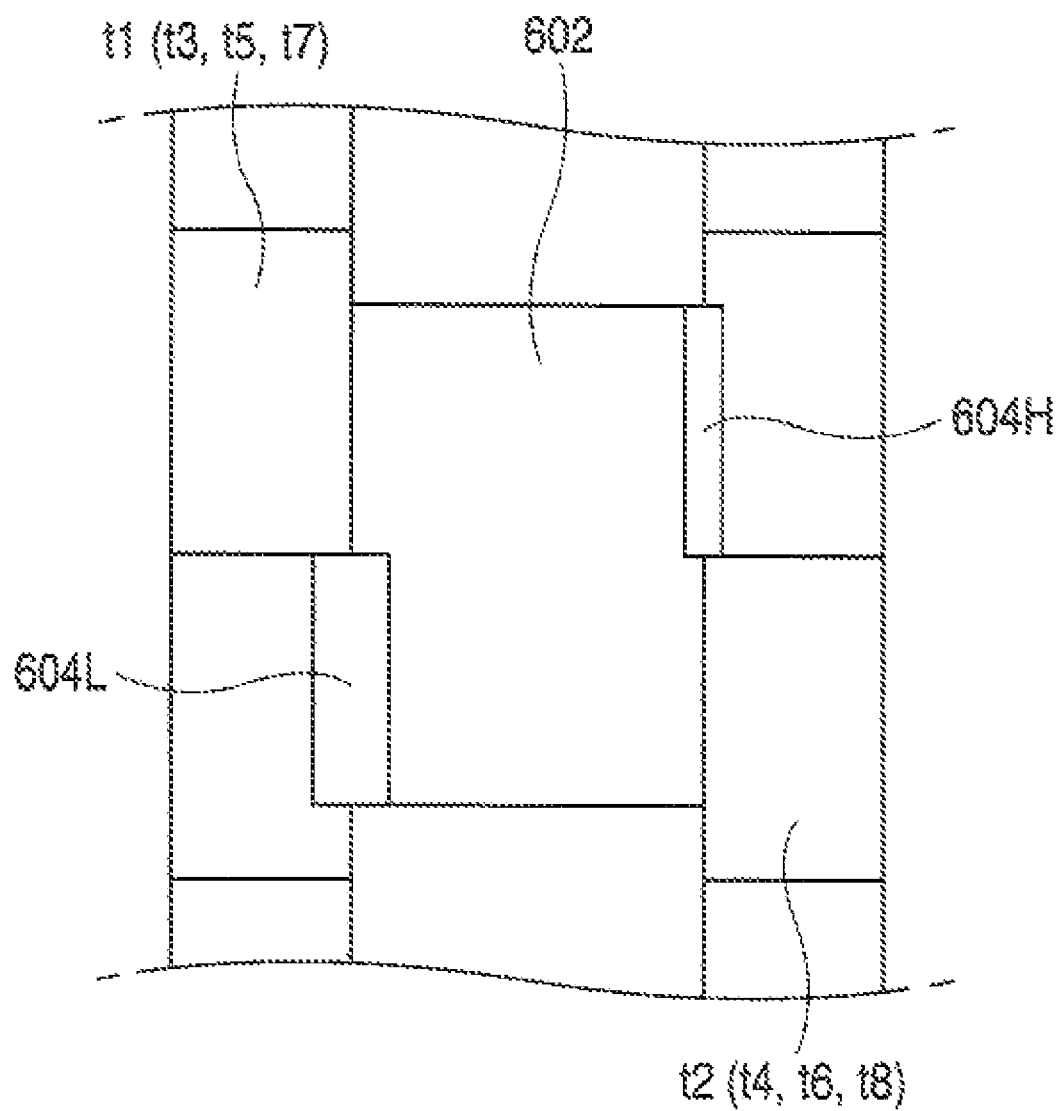

Further, a first read gate and a second read gate are provided to constitute a pair on a diagonal line thereof as shown by FIG. 20B. The first read gate 604H is formed at a position connected to any of the electrodes t1, t3, t5, t7 and a second read gate 604L is formed at a position connected to any of the electrodes t2, t4, t6, t8 of the first vertical transfer path on a left side of the vertical transfer path connected with the first read gate 604H. According to the first read gate 604H and the second read gate 604L, directions of transferring the signal charges are constituted by directions reverse to each other. In this way, according to the embodiment, the respective read gates 604H, 604L are provided at the positions of transferring the signal charges to the vertical transfer paths different from each other relative to the respective photoelectric conversion portions 602.

The solid imaging element 600 is constituted such that a width w1 of the vertical transfer path between a column comprising photoelectric conversion portions 602b, 602g of B, G and a column comprising photoelectric conversion portions 602g, 602r of G, R on one column right side of the column is larger than a width w2 of the vertical transfer path between the column comprising the photoelectric conversion portions 602g, 602r of C, R and a column comprising photoelectric conversion portions 602b, 602g on one column right side of the column in the horizontal direction. Thereby, the vertical transfer path having the width w1 becomes larger than the vertical transfer path of the width w2, and therefore, the vertical transfer path having the width w1 is provided with a larger area, and therefore, the saturated amount of the signal charge can be enlarged.

According to the solid imaging element 600, similar to the solid imaging element 500 of the fifth embodiment, a saturated amount of a signal charge of an odd number column can be made to be small in the column direction of the vertical transfer path, and a saturated amount of a signal charge at an even number column can be made to be large in the column direction of the vertical transfer path. Thereby, in a case in which an amount of the signal charge becomes large when the photographing environment is bright, a signal charge of light of a corresponding color component can be transferred to the vertical transfer path having the large saturated amount.

Figure 21:
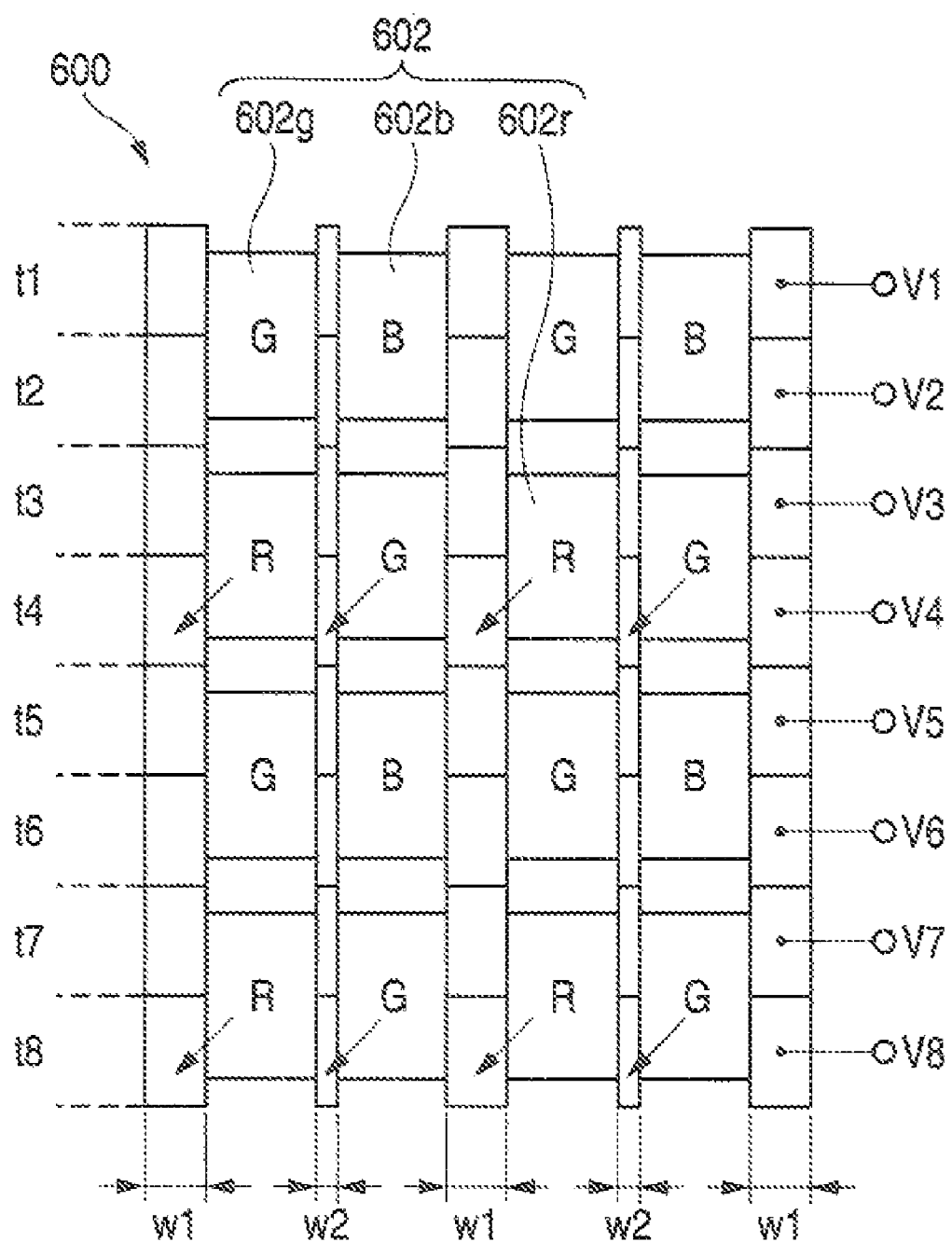
FIG. 21 is a view for explaining the constitution and the state of driving the solid imaging element according to the sixth embodiment.

FIGS. 20A and 20B and FIG. 21 are views for explaining an example of a state of driving the solid imaging element 600 according to the embodiment.

Although according to a color filter pattern of the embodiment, a region of receiving G is large, and therefore, an explanation will be given by constituting a reference by the photoelectric conversion portion 602g of G, the invention is not limited thereto but the width of the vertical transfer path and the position of the read gate can be constituted by constituting references by the photoelectric: conversion portions 602b, 602r of R and B in accordance with an arrangement of the color filters and an photographing situation.

As shown by FIGS. 20A and 20B, when the signal charge of the photoelectric conversion portion 602g of G is read front the first read gate 604H having the large amplification factor of the photoelectric conversion portion 602g, the amount of the signal charge is enlarged, and therefore, the signal charge is transferred to the vertical transfer path having the large saturated amount of the width w1.

On the other hand, as shown by FIG. 21, when the signal charge of the photoelectric conversion portion 602g of G is read from the second read gate 604L having the small amplification factor of the photoelectric conversion portion 602g, the amount of the signal charge is not so larger and therefore, the signal charge is transferred to the vertical transfer path having the small saturated amount of the width w2.

Next, a seventh embodiment according to the invention will be explained in reference to FIGS. 22A and 22B through FIG. 25.

A solid imaging element 700 of the embodiment is aligned with photoelectric conversion portions 702 in a honeycomb-like shape. Further a pattern of aligning color filters of R, G, B of the embodiment is the same as that of the first embodiment.

Figure 22A:
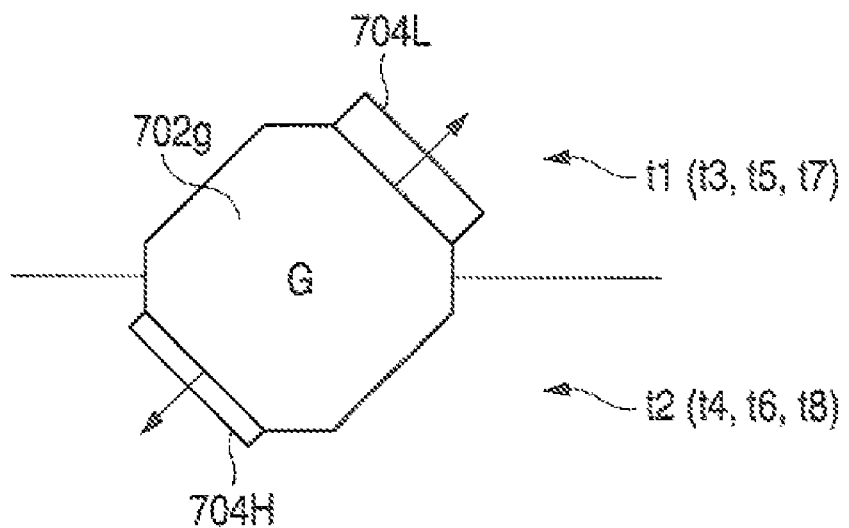
FIGS. 22A and 22B illustrate views for explaining a constitution and a state of driving a solid imaging element according to a seventh embodiment.
Figure 22B:
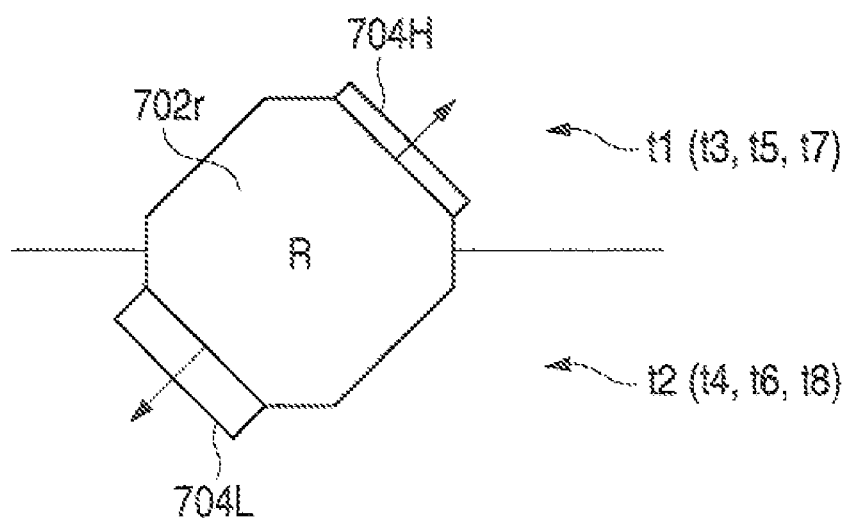
Figure 23:
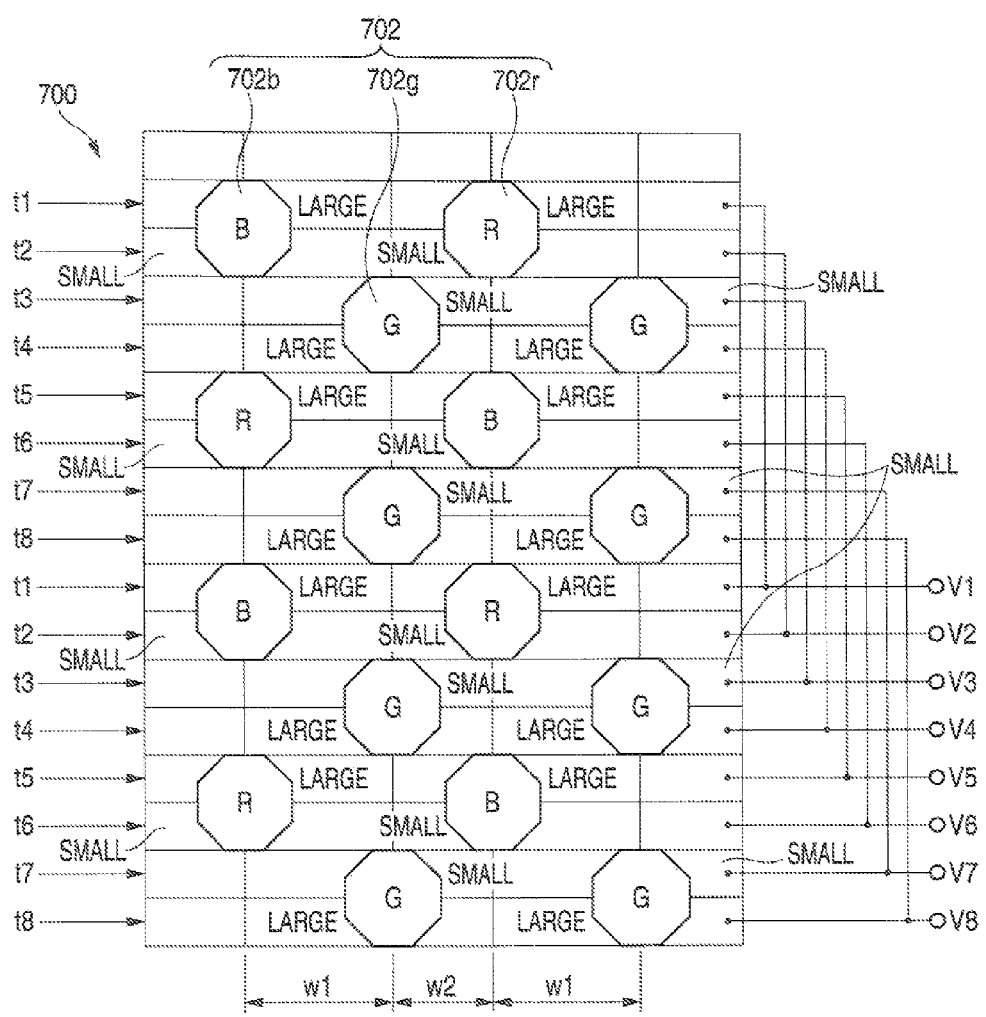
FIG. 23 is a view for explaining the constitution and the state of driving the solid imaging element according to the seventh embodiment.

According to the solid imaging element 700 shown in FIGS. 22A and 22B and FIG. 23, a first read gate 704H and a second read gate 704L of a photoelectric conversion portion 702g of G are arranged to constitute a pair on a diagonal line respectively relative to the photoelectric conversion portion 702g. The first read gate 704H is formed at a position connected to any or the electrodes t2, t4, t6, t8 and the second read gate 704L is formed at a position of connecting to any of the electrodes t1, t3, t5, t7 of the vertical transfer path on aright side of the vertical transfer path connected with the first read gate 704H. According to the first read gate 704H and the second read gate 704L, directions of transferring a signal charge are constituted by directions reverse to each other.

Further, the first read gate 704H and the second read gate 704L of a photoelectric conversion portion 702r of R are arranged to constitute a pair on a diagonal line respectively relative to the photoelectric conversion portion 702r. The first read gate 704H is arranged at a position of connecting to any of the electrodes t1, t3, t5, t7 and the second read gate 704L is formed at a position connecting to any of the electrodes t2, t4, t6, t8 of the vertical transfer path on a left side of the vertical transfer path connected with the first read gate 704H. According to the first read gate 704H and the second read gate 704L, directions of transferring the signal charge are constituted by directions reverse to each other. Further, a photoelectric conversion portion 702b of B is formed with the first read gate 704H and the second read gate 704L at positions similar to those of the photoelectric conversion portion 702r although not illustrated.

The solid imaging element 700 is constituted such that a width w1 of the vertical transfer path between a column comprising the photoelectric conversion portions 702b, 702r of B, R and a column of the photoelectric conversion portion 702g of G on one column right side of the column is larger than a width w2 of the vertical transfer path between a column of the photoelectric conversion portion 702g of G and a column comprising the photoelectric conversion portions 702b, 702r on one column right side of the column. Thereby, the vertical transfer path having the width w1 is larger than the vertical transfer path having the width w2, and therefore, the vertical transfer path having the width w1 is provided with a larger area, and therefore, the saturated amount of the signal charge can be enlarged. Further, constitutions of the vertical transfer electrodes t1 through t8 and the drive electrodes V1 through V8 are the same as those of the first embodiment or the third embodiment.

According to the solid imaging element 700 of the embodiment, positions of large and small magnitudes of the amplification factors of the read gates are reversed between an odd number column and an even number column in the column direction of the photoelectric conversion portion 702. Specifically, the first read gate 704H having the large amplification factor is arranged on the left side in the horizontal direction relative to the photoelectric conversion portion 702g of G, and the first read gate 704H is connected to the vertical transfer electrodes t1, t3, t5, t7 on the side of the vertical transfer path having the width w1. Further, the second read gate 704L having the small amplification factor is arranged on the left side in the horizontal direction of the photoelectric conversion portion 702g of G, and the second read gate 704L is connected to the vertical transfer electrodes t2, t4, t6, t8 on the side of the vertical transfer path having the width w2.

On the other hand, the first read gates 704H having the large amplification factor are arranged respectively on the right side in the horizontal direction of the photoelectric conversion portions 702b, 702r of B, R, and the first read gate 704H is formed on the side of the vertical transfer path having the width w1. Further, the second read gates 704L respectively having the small amplification factor are arranged on the left side in the horizontal direction of the photoelectric conversion portions 702b, 702r of B, R, and the second read gate 704L is formed on the side of the vertical transfer path of the width w2. In driving, when the amplification factor of the read gates 704H of the drive electrodes V2, V4, V6, V8 is made to be small, and the amplification factor of the read gates 704H of the drive electrodes V1, V3, V5, V7 is made to be large, the signal charge can be transferred from the first read gate 704H having the large amplification factor to the vertical transfer path having the large saturated amount.

Figure 24A:
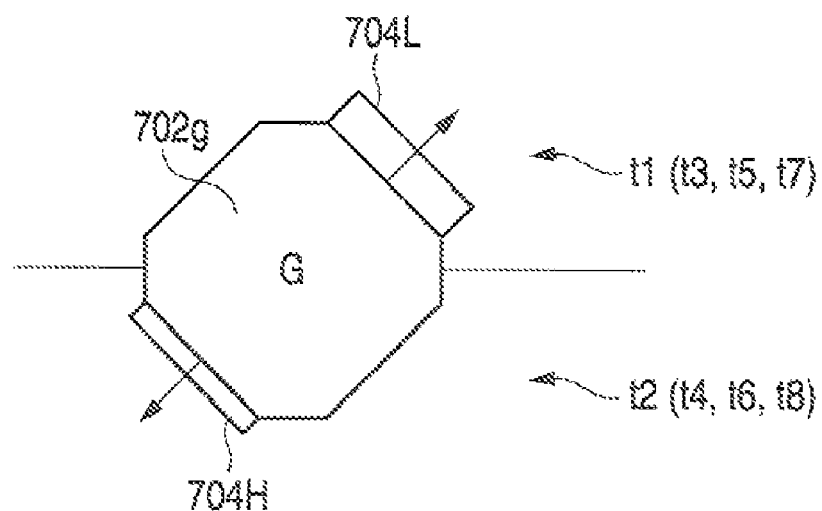
FIGS. 24A and 24B are views for explaining the constitution and the state of driving the solid imaging element according to the seventh embodiment.
Figure 24B:
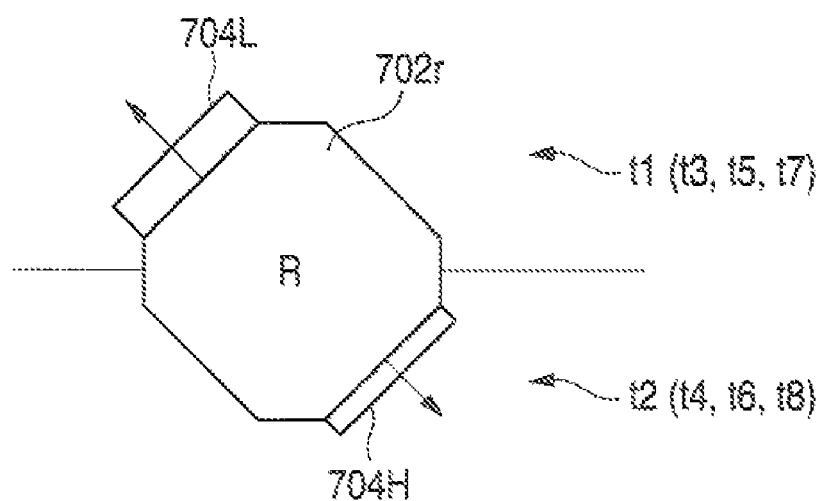
Figure 25:
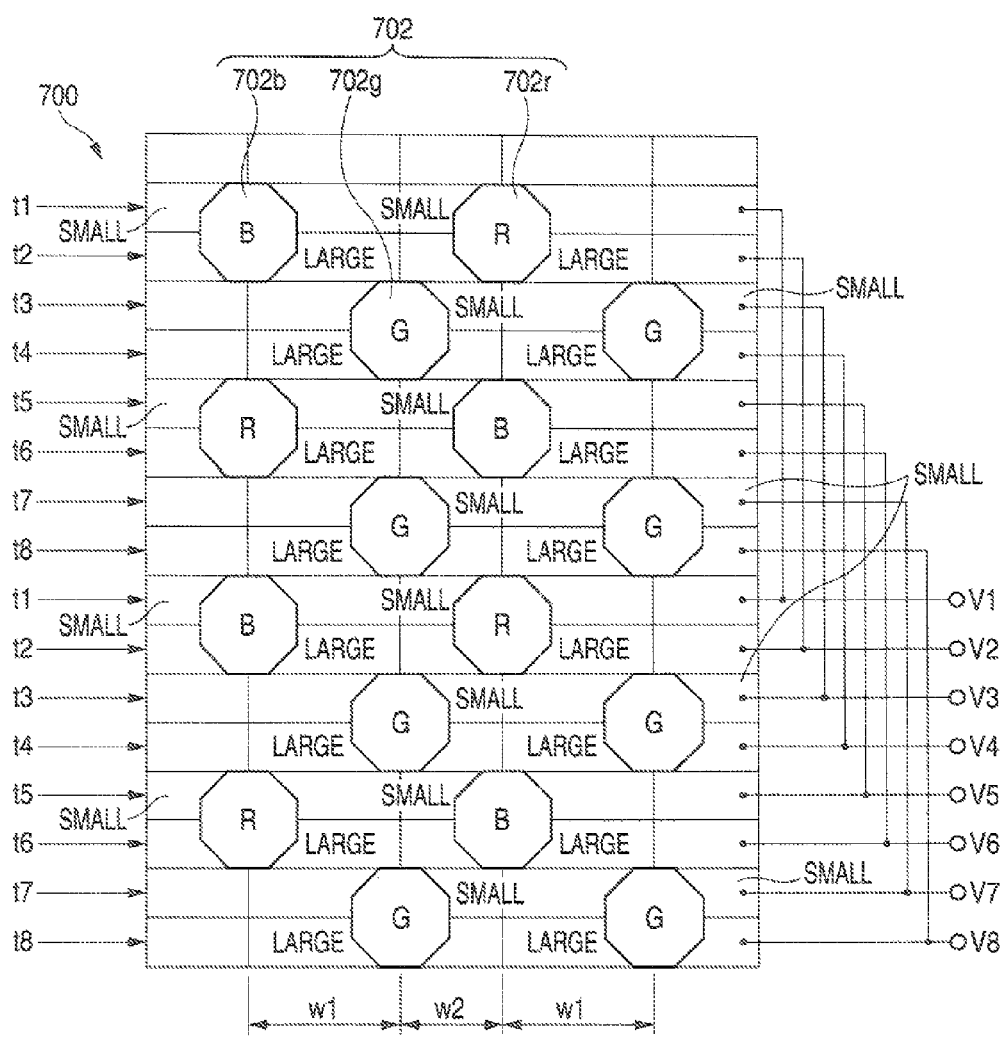
FIG. 25 is a view for explaining the constitution and the state of driving the solid imaging element according to the seventh embodiment.

Further, the solid imaging element 700 of the embodiment may be constructed by a constitution shown in FIGS. 24A and 24B and FIG. 25. An arrangement of the first read gate 704H and the second read gate 704L of the photoelectric conversion portion 702g of G are the same as that of FIGS. 22A and 22B and FIG. 23.

The first read gates 704H having the large amplification factor are respectively arranged on the right side in the horizontal direction of the photoelectric conversion portions 702b, 702r of B, R, and the first read gates 704H are connected to the vertical transfer electrodes t2, t4, t6, t8 on the side of the vertical transfer path having the width w1. Further, the second read gates 704L having the small amplification factor are respectively arranged on the left side in the horizontal direction of the photoelectric conversion portions 702b, 702r of B, R, and the second read gates 704L are connected to the vertical transfer electrodes t1, t3, t5, t7 on the side of the vertical transfer path having the width w2.

Next, an eighth embodiment according to the invention will be explained.

Figure 26:
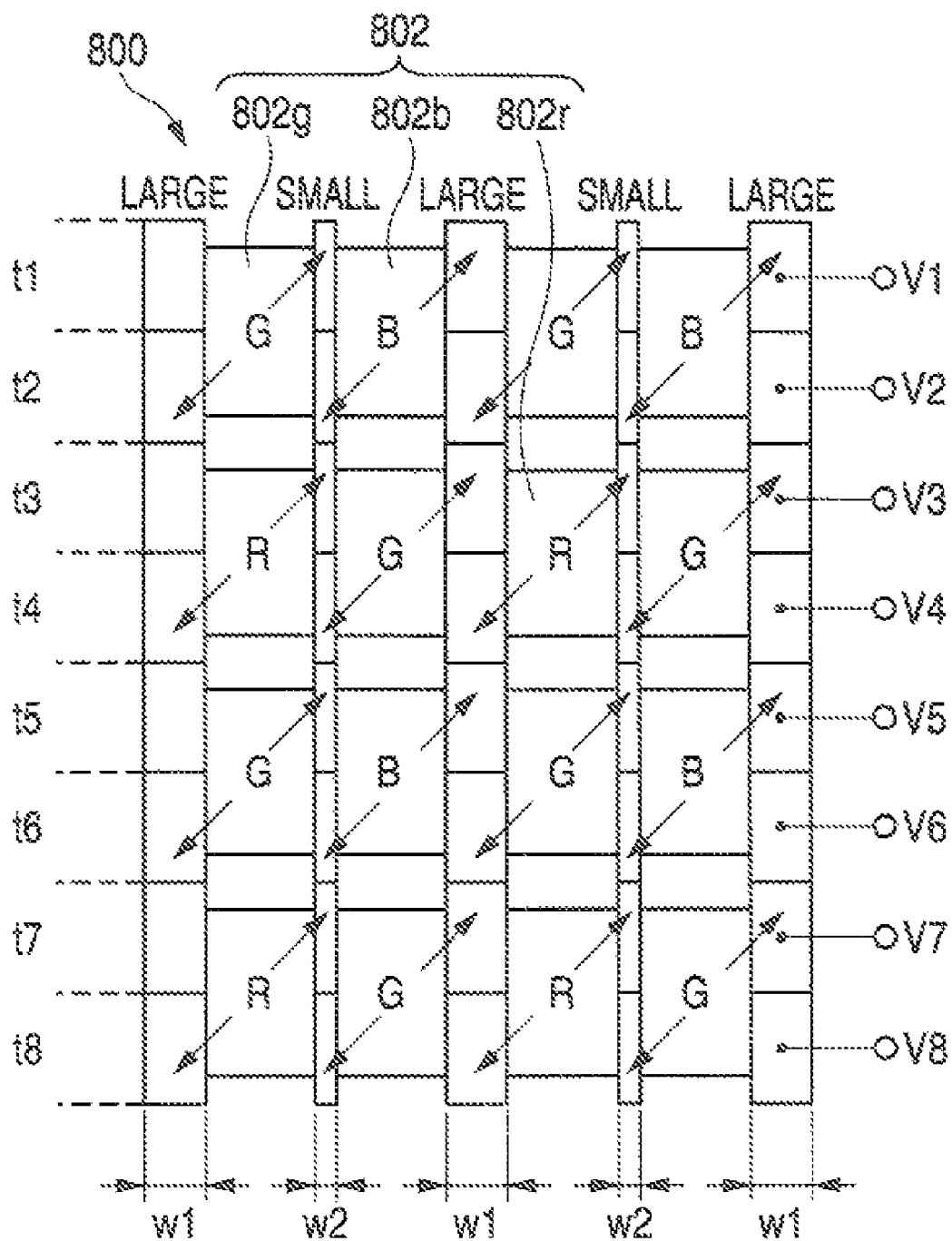
FIG. 26 is a view for explaining a constitution and a state of driving a solid imaging element according to an eighth embodiment.

FIG. 26 is a view for explaining a constitution and a state of driving a solid imaging element 800 according to the embodiment. The solid imaging element 800 is aligned with photoelectric conversion portions 802 in a Bayer shape. Further, a pattern of aligning color filters or R, G, B according to the embodiment is the same as that of the sixth embodiment.

A first read gate and a second read gate of a column comprising a photoelectric conversion portion 802g of G and a photoelectric conversion portion 802r of R are the same as those shown in FIG. 15 and provided to constitute a pair on a diagonal line. The first read gate having a large amplification factor is formed at a position connecting to any of the electrodes t2, t4, t6, t8, and the second read gate having a small amplification factor is formed at a position connecting to any of the electrodes t1, t3, t5, t7 of the vertical transfer path on the right side of the vertical transfer path connected with the first read gate. On the other hand, a first read gate and a second read gate of a column comprising a photoelectric conversion portion 802b of B and the photoelectric conversion portion 802g of G are the same as those shown in FIG. 20B and provided to constitute a pair on a diagonal line. The first read gate having the large amplification factor is formed at a position connecting to any of the electrode t1, t3, t5, t7, and the second read gate having the small amplification factor is formed at a position connecting to any of the electrodes t2, t4, t6, t8 of the vertical transfer path on the left side of the vertical transfer path connected with the first read gate. Positions of the first read gate and the second read gate relative to the photoelectric conversion portion are formed to be reverse to each other in the horizontal direction between an odd number column and an even number column relative to the column direction of the photoelectric conversion portion.

Similar to the sixth embodiment, the solid imaging element 800 is constituted such that a width w1 of the vertical transfer path between a column comprising the photoelectric conversion portions 802b, 802g of B, G and a column comprising the photoelectric conversion portions 802g, 802r on one column right side of the column is larger than a width w2 of the vertical transfer path between the column comprising the photoelectric conversion portion 802g, 802r of G, R and a column comprising the photoelectric conversion portions 802b, 802g of B, G on one column right side of the column in the horizontal direction. Thereby, the vertical transfer path having the width w1 is larger than the vertical transfer path having the width w2, and therefore, the vertical transfer path having the width w1 is provided with the larger area, and therefore, the saturated amount of the signal charge can be enlarged.

Thereby, the signal charge read from the respective photoelectric conversion portions 802g to the first read gate having the large amplification factor can be transferred to the vertical transfer path having the large saturated amount.

Next, a ninth embodiment according to the invention will be explained in reference to FIGS. 27A to 27C and FIG. 28.

Figure 27A:
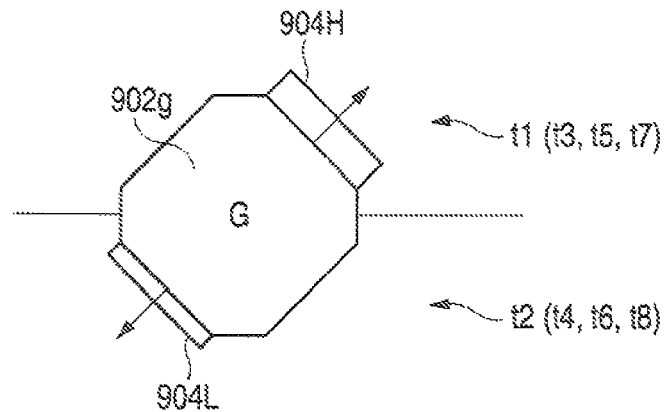
FIGS. 27A to 27C illustrate views for explaining a constitution and a state of driving a solid imaging element according to a ninth embodiment.
Figure 27B:
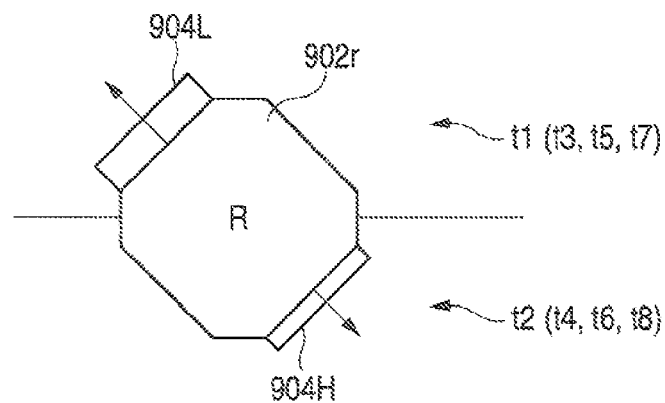
Figure 27C:
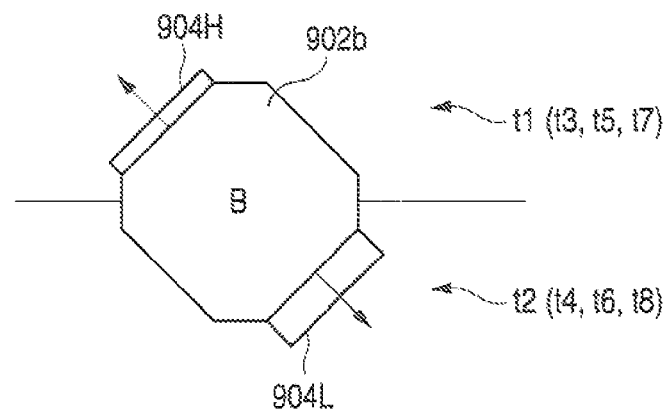
Figure 28:
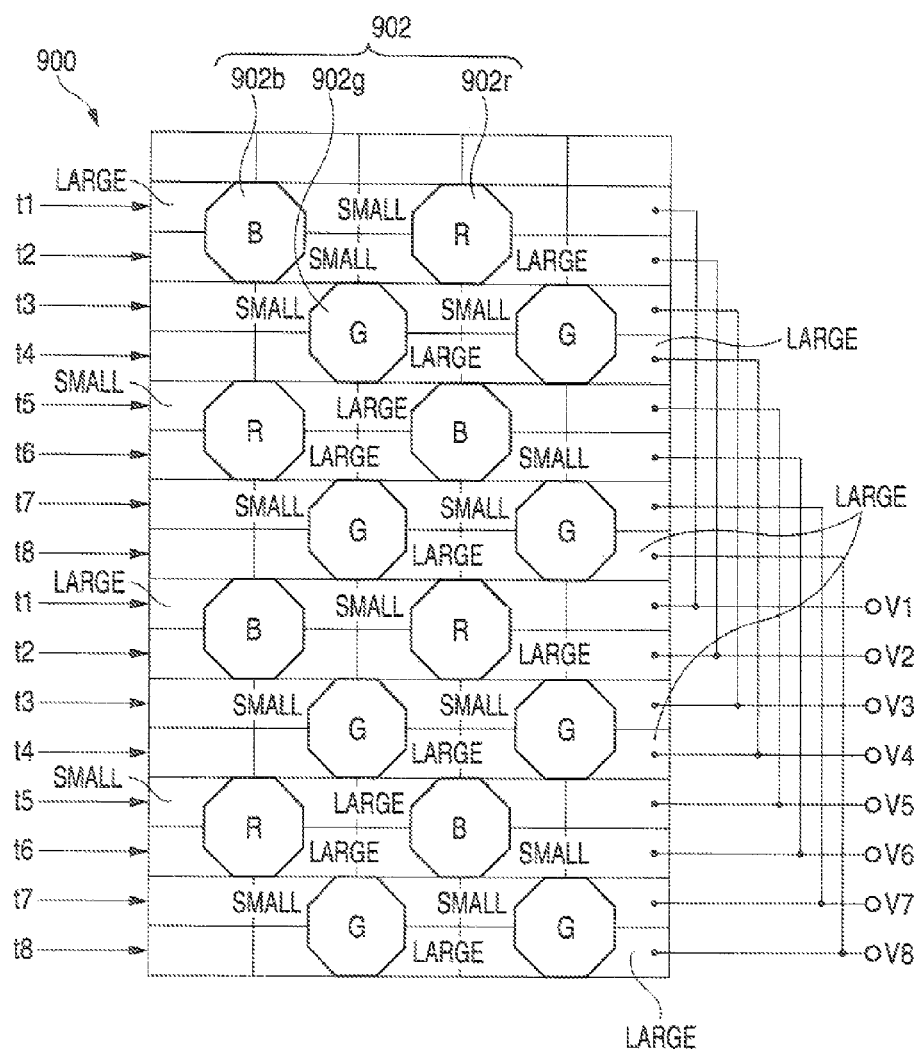
FIG. 28 is a view for explaining the constitution and the state of driving the solid imaging element according to the ninth embodiment.

As shown by FIGS. 27A to 27C, according to a solid imaging element 900, a first read gate 904H having a large amplification factor of a photoelectric conversion portion 902g of G and a second read gate 904L having a small amplification factor are arranged to constitute a pair on a diagonal line respectively relative to the photoelectric conversion portion 902g. The first read gate 904H is formed at a position connecting to any of the vertical transfer electrodes t1, t3, t5, t7, and the second read gate 904L is formed at a position of connecting to any of the electrodes t2, t4, t6, t8 of the vertical transfer path on a left side of the vertical transfer path connected with the first read gate 904H. According to the first read gate 904H and the second read gate 904L, directions of transferring the signal charge are constituted by directions reverse to each other.

The first read gate 904H having the large amplification factor of a photoelectric conversion portion 902r of R and the second read gate 904L having the small amplification factor are arranged to constitute a pair on a diagonal line respectively relative to the photoelectric conversion portion 904r. The first read gate 904H is formed at a position connecting to any of the vertical transfer electrodes t2, t4, t6, t8, and the second read gate 904L is formed at a position connecting to any one of the electrodes t1, t3, t5, t7 of the vertical transfer path on the left side of the vertical transfer path connected with the first read gate 904H. According to the first read gate 904H and the second read gate 904L, directions of transferring the signal charge are constituted by directions reverse to each other.

The first read gate 904H having the large amplification factor of a photoelectric conversion portion 902b of B and the second read gate 904L having the small amplification factor are arranged to constitute a pair on a diagonal line respectively relative to the photoelectric conversion portion 904b. The first read gate 904H is formed at a position connecting to any one of the vertical transfer electrodes t1, t3, t5, t7, and the second read gate 904L is formed at a position connecting to any one of the electrodes t2, t4, t6, t8 of the vertical transfer path on the right side of the vertical transfer path connected with the first read gate 904H. According to the first read gate 904H and the second read gate 904L, directions of transferring the signal charge are constituted by directions reverse to each other.

According to the solid imaging element 900 of the embodiment, structures of the vertical transfer paths, the vertical transfer electrodes t1 through t8, and the drive electrodes V1 through V8 are made to be the same as those of FIG. 2 However, the solid imaging element 900 may be constituted such that a width of the vertical transfer path between a column comprising the photoelectric conversion portions 902b, 902r of B, R and a column of the photoelectric conversion portion 902g of G on one column right side of the column is larger than a width of the vertical transfer path between a column of the photoelectric conversion portion 902g of G and a column comprising the photoelectric conversion portions 902b, 902r of B, R on one column right side of the column in the horizontal direction similar to the solid imaging element 700 of the embodiment.

Generally, when a color temperature is low, there is a possibility that a light amount of R is increased, the signal charge generated at the photoelectric conversion portion 902r of R is increased, and amplified at the read gate to thereby saturate the signal charge at the vertical transfer path. Hence, according to the solid imaging element 900 of the embodiment, when the color temperature is low, in amplifying the signal charge by the photoelectric conversion portion 902r of R, the signal charge is read by the second read gate having the small amplification factor. At this occasion, a light amount of the photoelectric conversion portion 902b of B is increased, and therefore, the signal charge of the photoelectric conversion portion 902b of B is read by the read gate having the large amplification factor. When the color temperature is high, a light amount of B is increased, and therefore, a signal charge of the photoelectric conversion portion 902b of B is read by the second read gate having the small amplification factor, and the signal charge of the photoelectric conversion portion 902r of R the light amount of which is reduced is read by the second read gate having the large amplification factor. By making positions of the first read gates and the second read gates of the photoelectric conversion portions 902r, 902b of R and B disposed on the same column position reverse to each other in the horizontal direction, directions of reading the signal charge in the horizontal direction can be controlled in accordance with the color temperature.

Next, an explanation will be given of a constitution and a state of driving the solid imaging element of the embodiment when the solid imaging element is constituted by the Bayer alignment in reference to FIG. 29 through FIG. 36.

Figure 29:
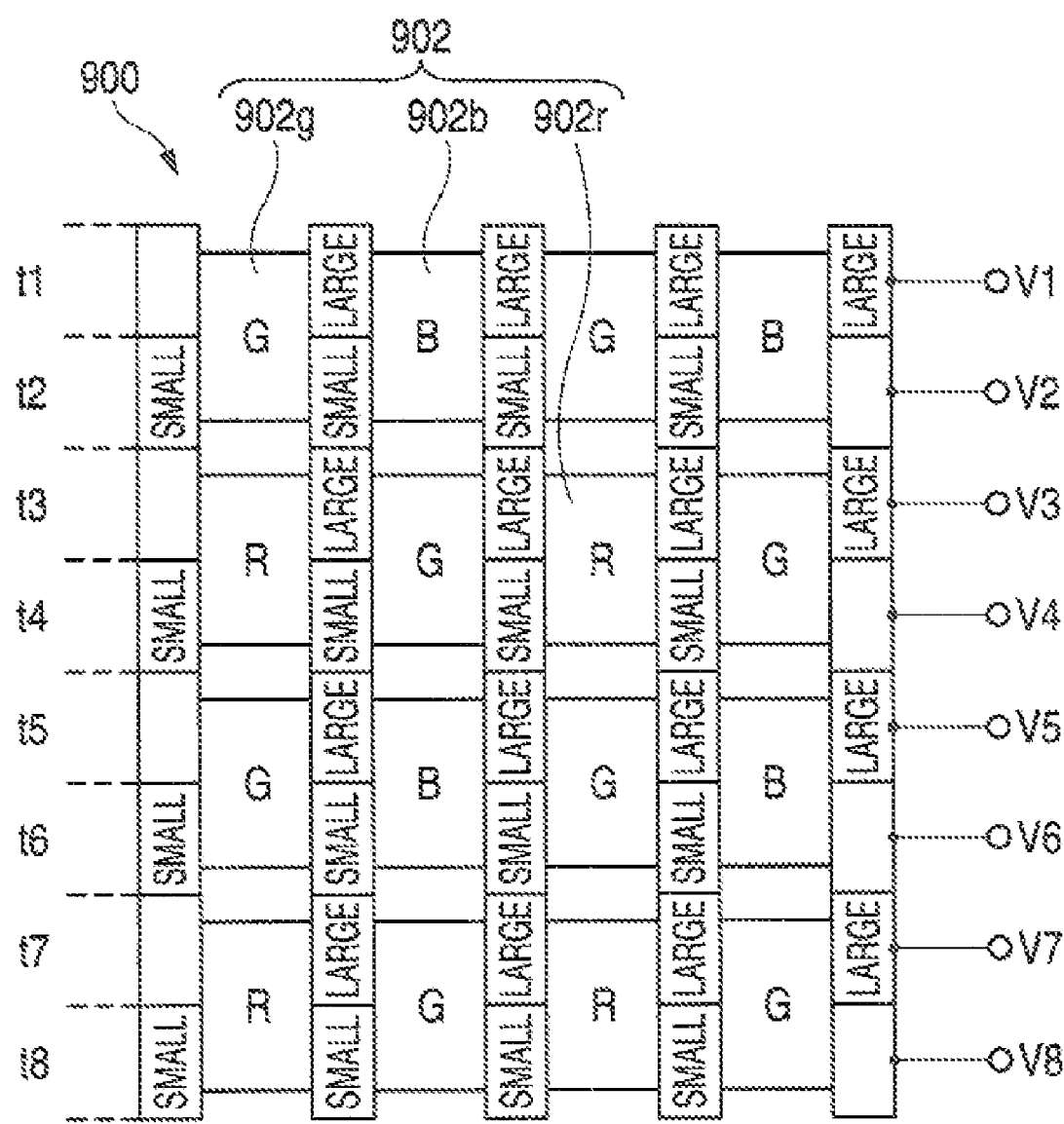
FIG. 29 is a view for explaining the constitution and the state of driving the solid imaging element according to the ninth embodiment in a case of a Bayer alignment.

In a case of a color filter alignment shown in FIG. 29, by changing the arrangement of the read gate by a region of reading the signal charge of RG and a region of reading the signal charge of the GB, the signal charge can be amplified in accordance with the color temperature.

Figure 30:
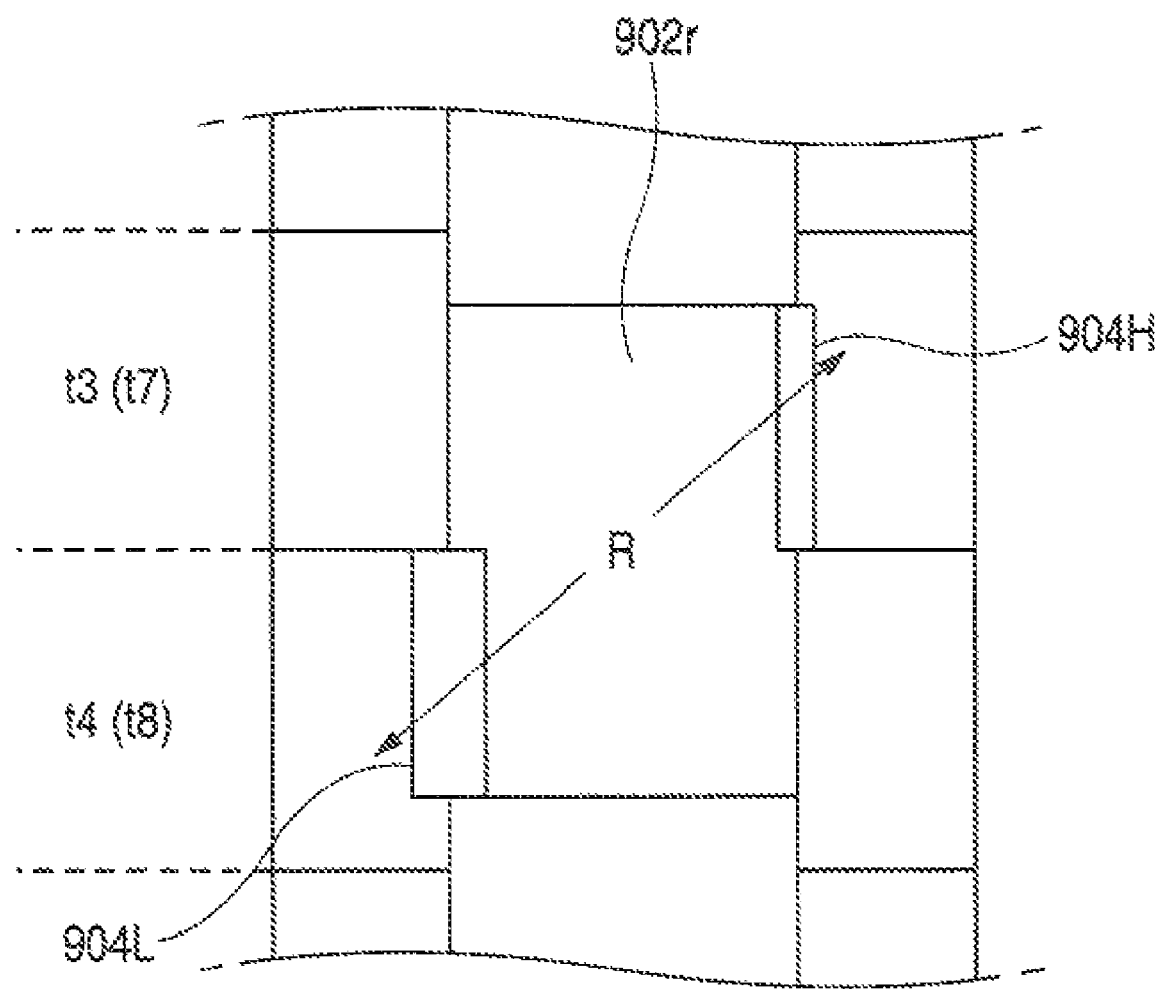
FIG. 30 is a view for explaining the constitution and the state of driving the solid imaging element according to the ninth embodiment in the case of the Bayer alignment.
Figure 31:
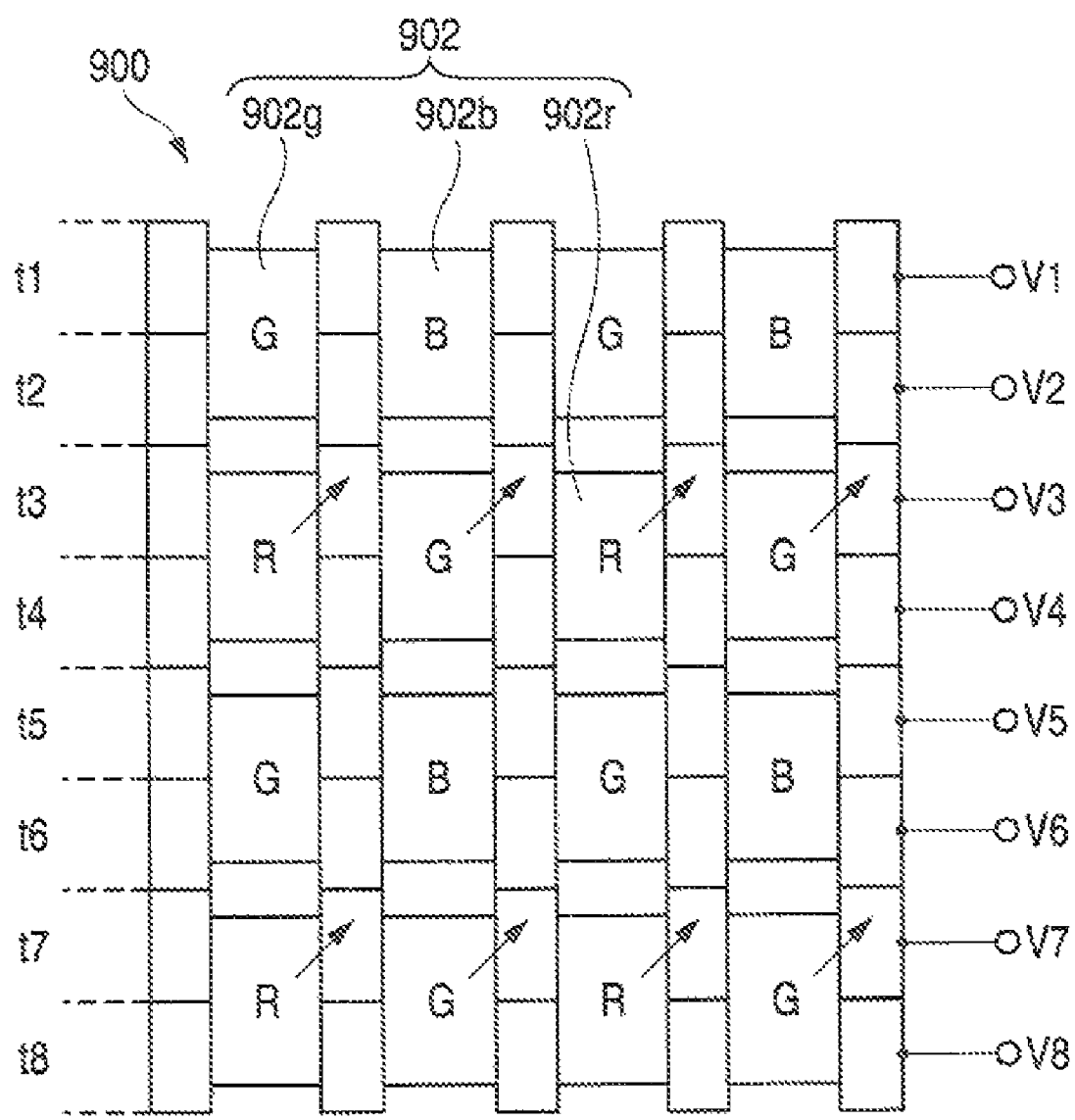
FIG. 31 is a view for explaining the constitution and the state of driving the solid imaging element according to the ninth embodiment in the case of the Bayer alignment.
Figure 32:
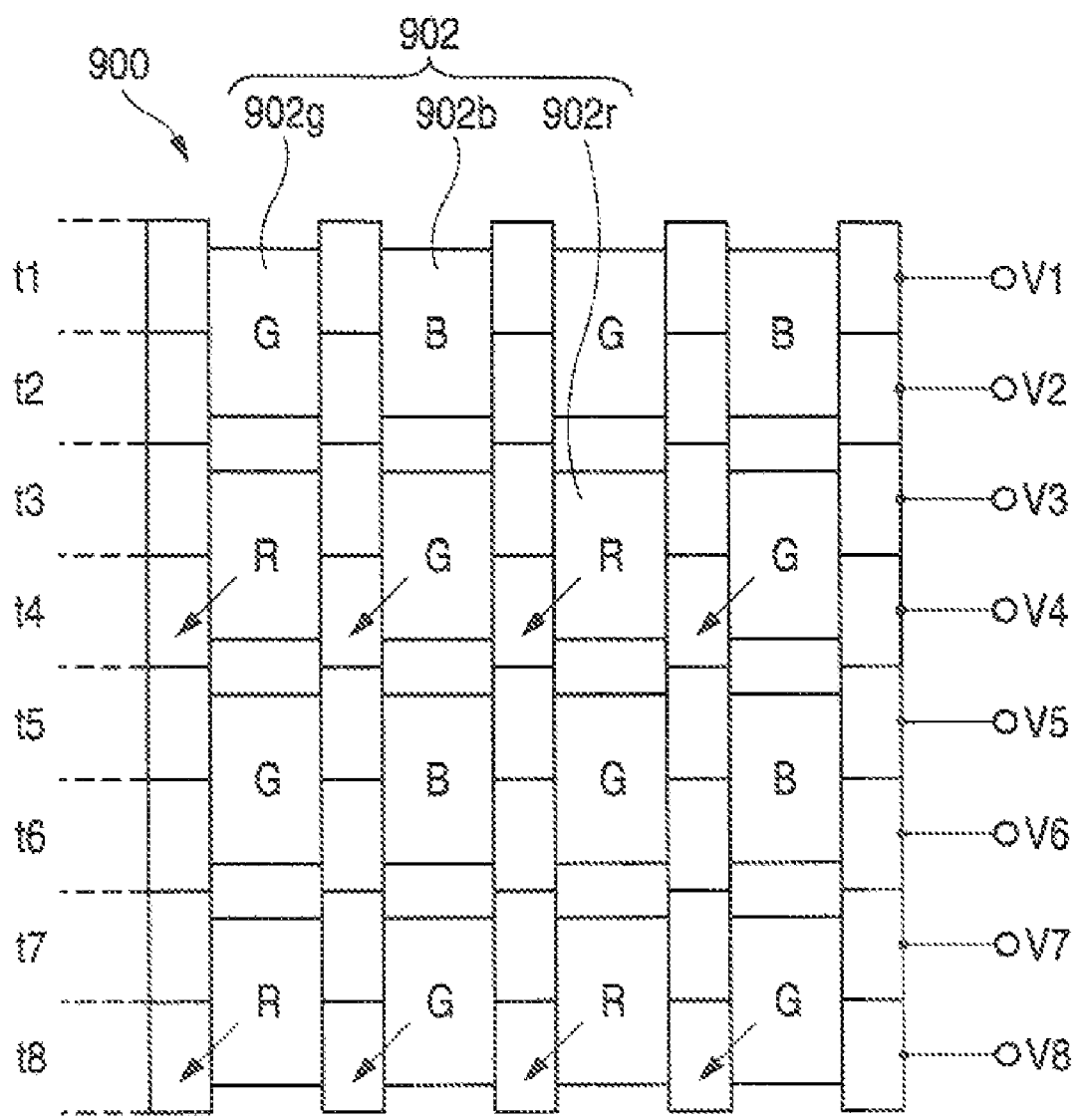
FIG. 32 is a view for explaining the constitution and the state of driving the solid imaging element according to the ninth embodiment in the case of the Bayer alignment.
Figure 33:
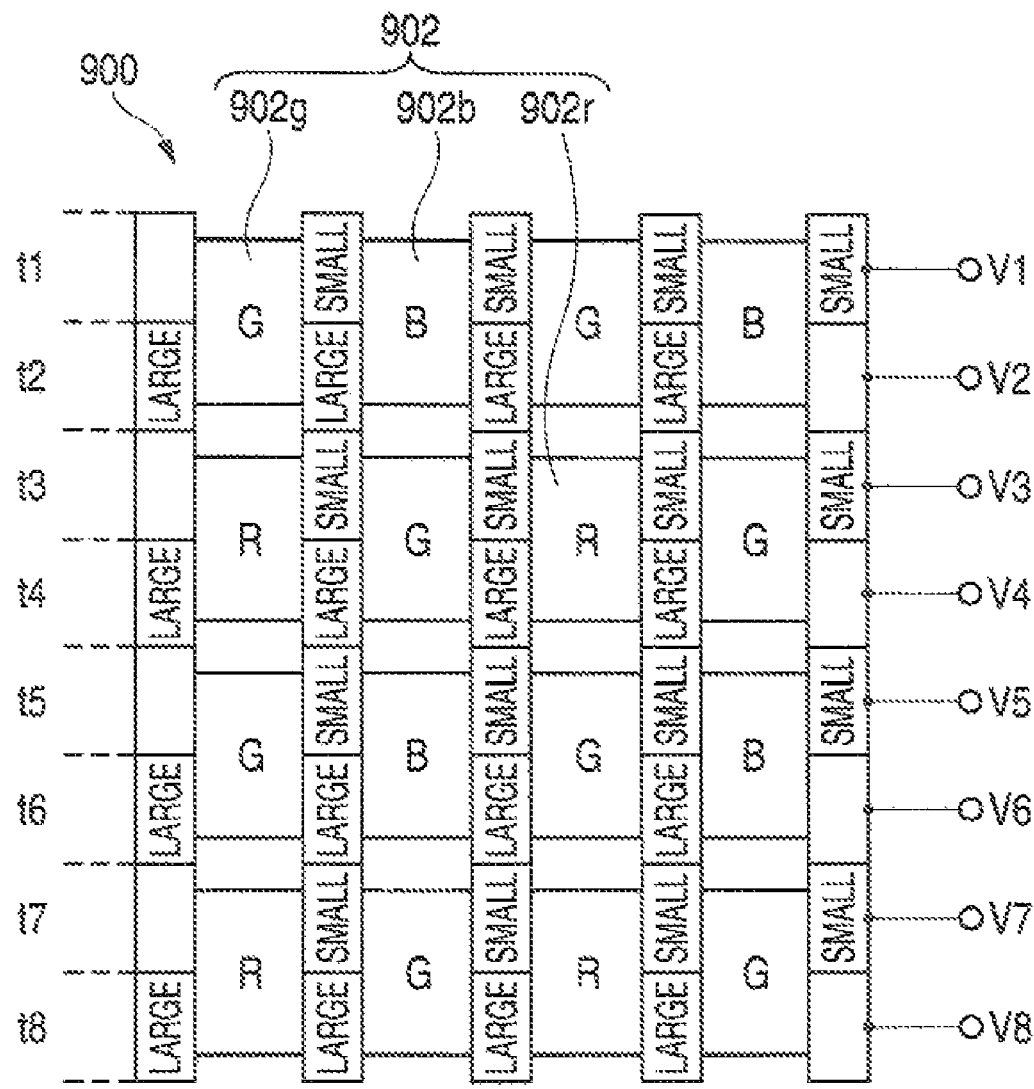
FIG. 33 is a view for explaining the constitution and the state of driving the solid imaging element according to the ninth embodiment in the case of the Bayer alignment.

FIG. 29 through FIG. 32 explain a case of reading the signal charge from the photoelectric conversion portion 902r of R in accordance with the color temperature. When the color temperature is high, as shown by FIG. 30 and FIG. 31, the signal charge of the photoelectric conversion portion 902r is read from the first read gate 904H having the large amplification factor. When the color temperature is low, as shown by FIG. 30 and FIG. 32, the signal charge of the photoelectric conversion portion 902r is read from the second read gate 904L having the small amplification factor.

Figure 34:
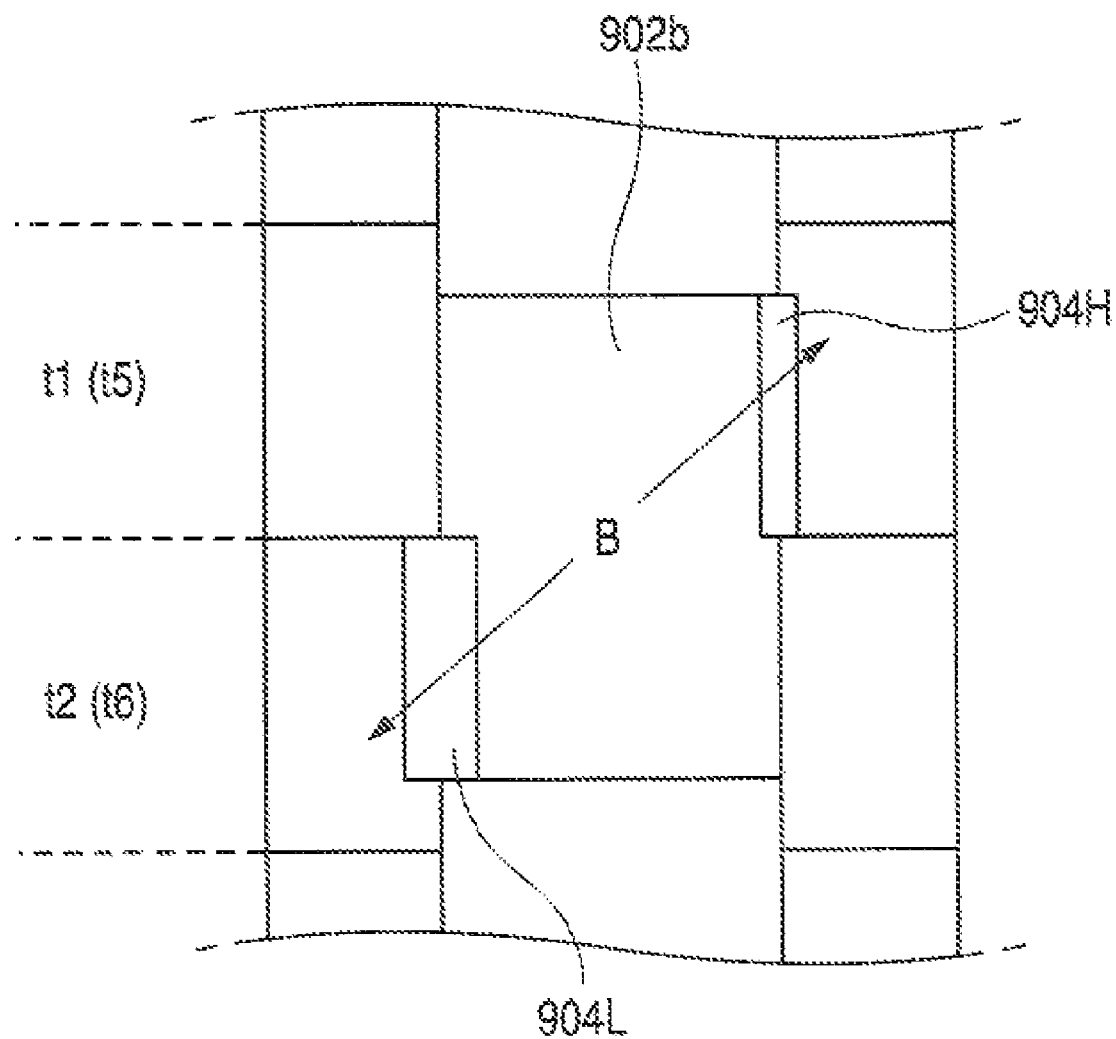
FIG. 34 is a view for explaining the constitution and the state of driving the solid imaging element according to the ninth embodiment in the case of the Bayer alignment.
Figure 35:
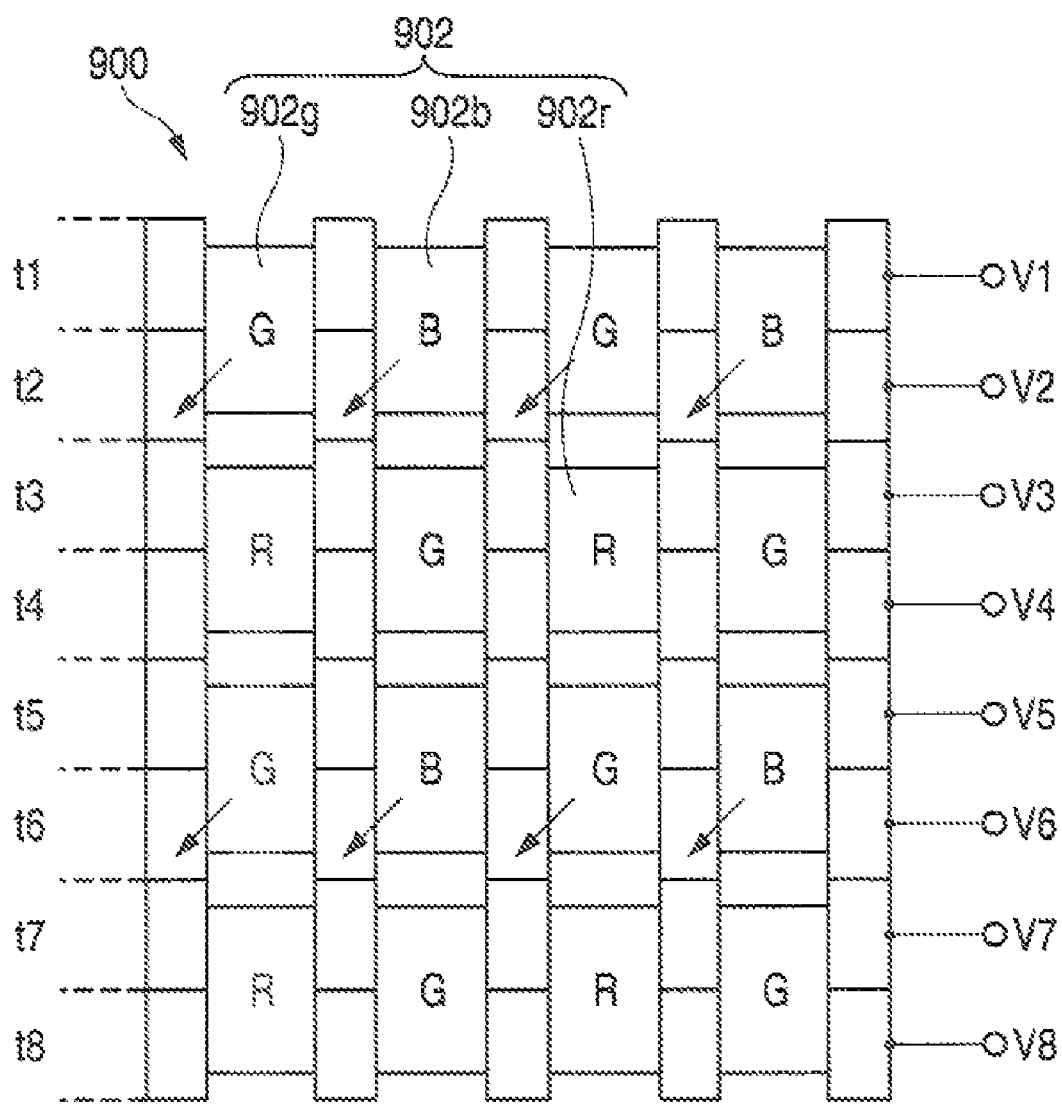
FIG. 35 is a view for explaining the constitution and the state of driving the solid imaging element according to the ninth embodiment in the case of the Bayer alignment.
Figure 36:
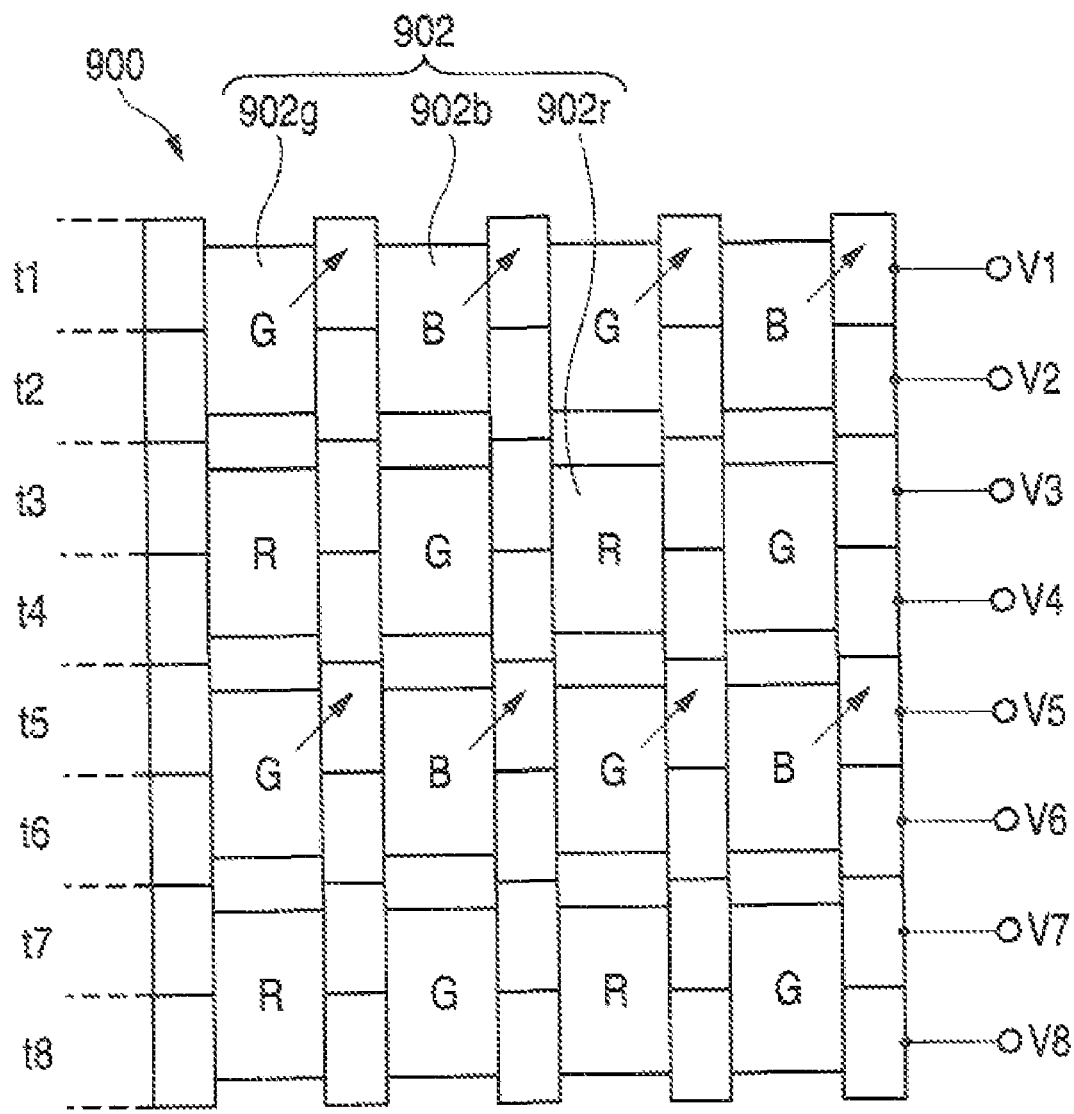
FIG. 36 is a view for explaining the constitution and the state of driving the solid imaging element according to the ninth embodiment in the case of the Bayer alignment.

Similarly, FIG. 33 through FIG. 36 explain a case of reading a signal charge from the photoelectric conversion portion 902b of B in accordance with the color temperature. When the color temperature is high, as shown by FIG. 34 and FIG. 35, the signal charge of the photoelectric conversion portion 902b is read from the second read gate 904L having the small amplification factor. When the color temperature is low, as shown by FIG. 34 and FIG. 36, the signal charge of the photoelectric conversion portion 902b is read from the first read gate 904H having the large amplification factor.

Figure 37:
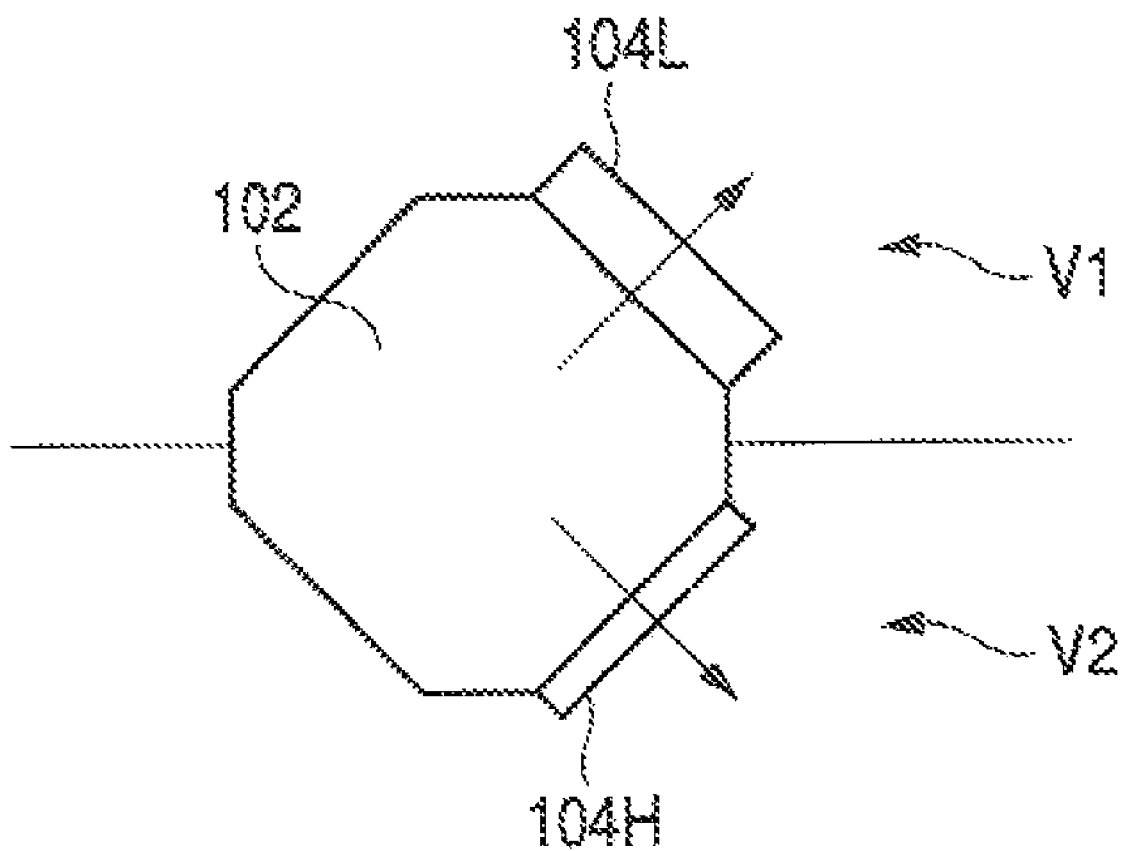
FIG. 37 is a view for explaining a constitution and a state of driving a solid imaging element according to a tenth embodiment.
Figure 38A:
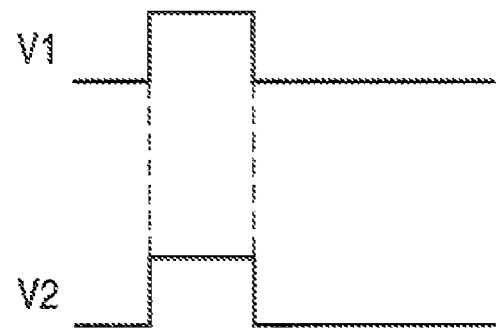
FIGS. 38A to 38C illustrate views for explaining the constitution and the state of driving the solid imaging element according to the tenth embodiment.
Figure 38B:
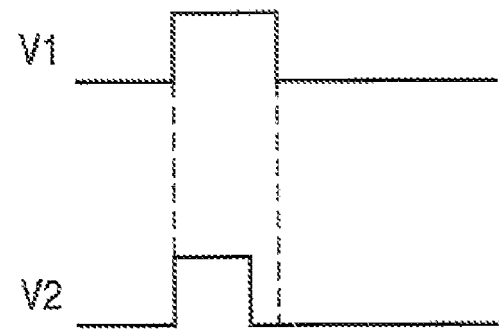
Figure 38C:
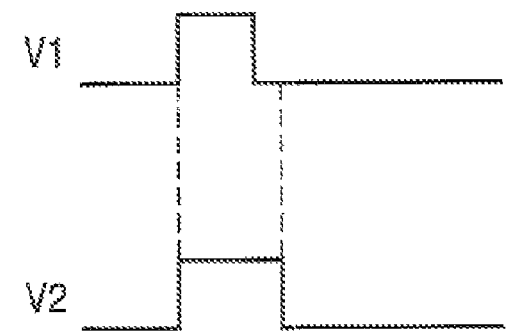
Figure 39:
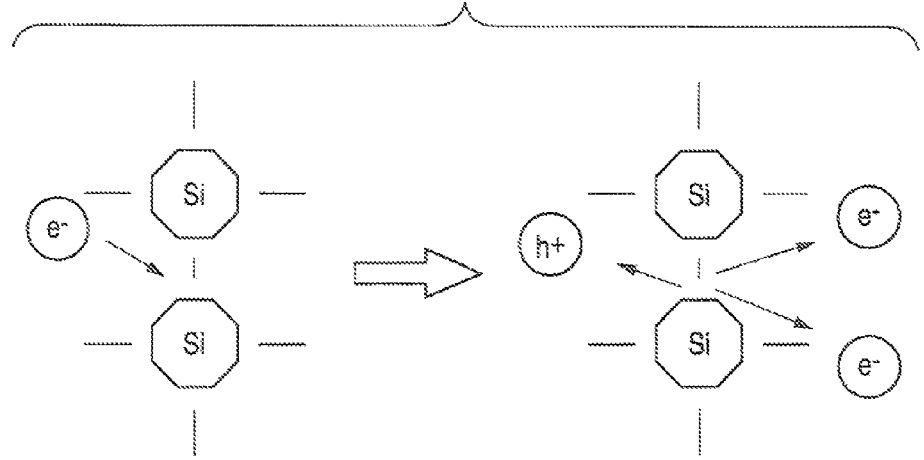
FIG. 39 is an explanatory view of impact ion.
Figure 40:
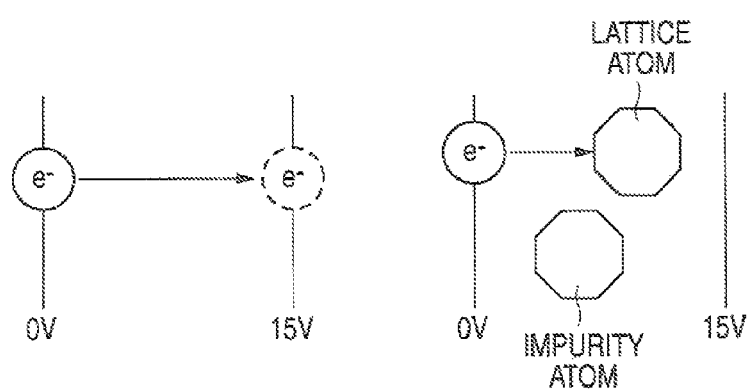
FIG. 40 is an explanatory view of impact ion.

Next, a tenth embodiment according to the invention will be explained in reference to FIG. 7 and FIGS. 38A to 38C. A read gate 104L having a small amplification factor and a read gate 104H having a large amplification factor are provided at positions of transferring the signal charge to the sane vertical transfer path (right side in a horizontal direction in FIG. 37). The read gates 104L, 104H are respectively applied with drive electrodes V1 through V2. At this occasion, as shown by FIGS. 38A to 38C, the respective amplification factors of the read gates 104L, 104H can further be changed by changing read time periods by controlling timings of applying the drive electrodes V1, V2 by an imaging element drive portion. Thereby, 2 kinds or more of amplification factors can be realized in accordance with the drive electrodes in addition to two previously set amplification factors of the read gates 104L, 104H.

An embodiment of a solid imaging apparatus according to the second invention will be explained in details in reference to the attached drawings as follows. In reference to FIG. 41, according to an embodiment of a solid imaging element 136 in the solid imaging apparatus according to the invention, at a low sensitivity gate 148 for storing a signal charge of a low sensitivity element 140 and reading the signal charge, an electric field intensity is generated relatively stronger than an electric field intensity generated at a gate 146 formed at a high sensitivity element 138.

The embodiment is a case of applying the solid imaging apparatus of the invention to a digital camera 110. Illustration and explanation of a portion which is not directly related to the invention will be omitted. In the following explanation, a signal is indicated by a reference numeral of a connecting line at which the signal appears.

Figure 42:
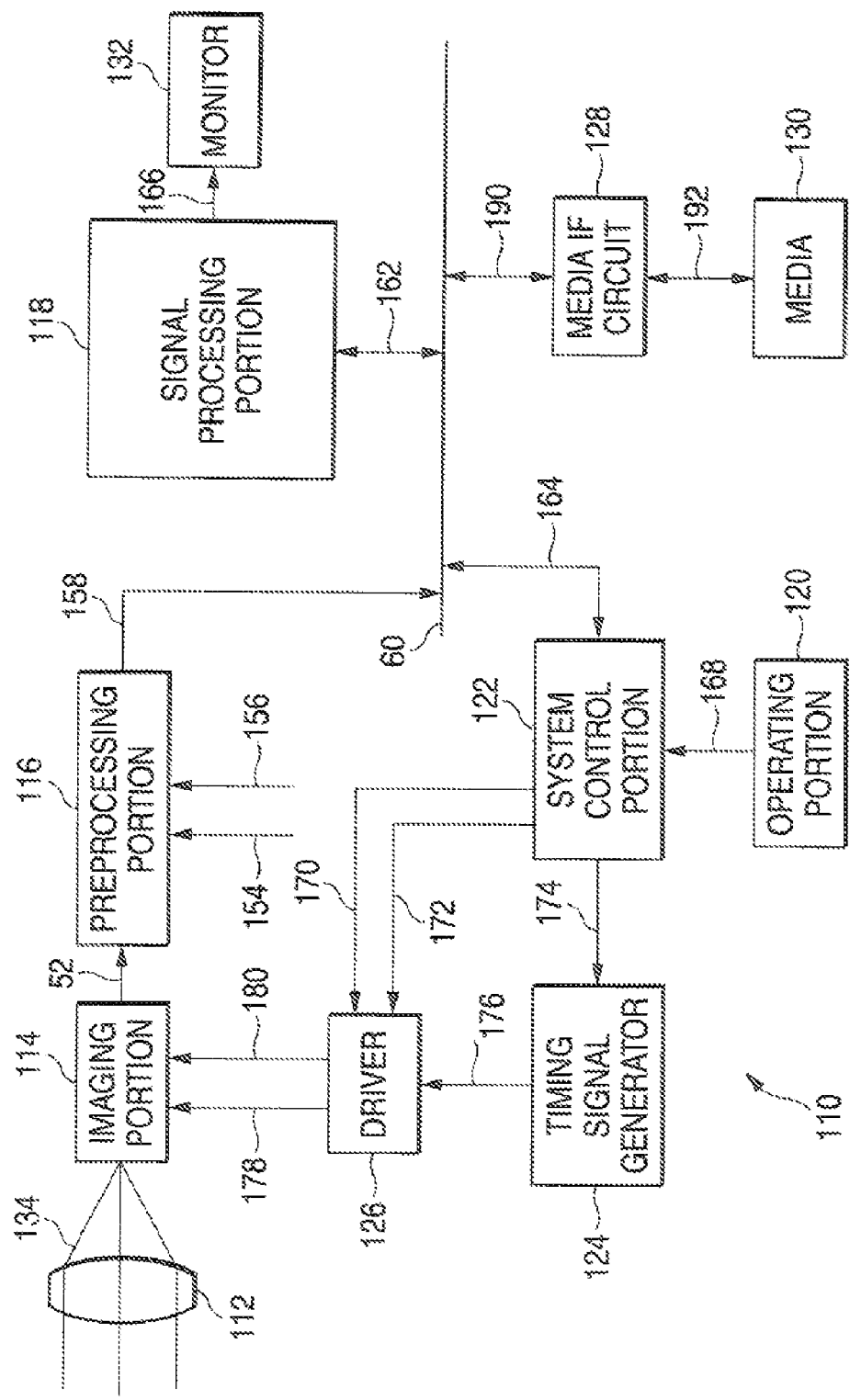
FIG. 42 is a block diagram showing an outline constitution of the digital camera to which the solid imaging element of FIG. 41 is applied.

As shown by FIG. 42, the digital camera 110 includes an optical system 112, an imaging portion 114, a preprocessing portion 116, a signal processing portion 118, an operating portion 120, a system control portion 122, a timing signal generating portion 124, a driver 12G, a media interface (I/F) circuit 128, media 130 and a monitor 132. A simple description will be given of functions or the like in constituent elements of respective portions.

The optical system 112 is provided with a function of focusing incident light 134 from an object to an image in accordance with an operation of the operating portion 120 by the imaging portion 114. The optical system 112 adjusts a field angle or a focal length in accordance with a zoom operation or a half depressing operation of the operating portion 120. It is preferable to provide the optical system 112 with a mechanical shutter for opening the system for the incident light by a predetermined diaphragm over a predetermined period of time, that is, shutting off the incident light after having being exposed. The mechanical shutter is not illustrated in the embodiment.

Figure 41:
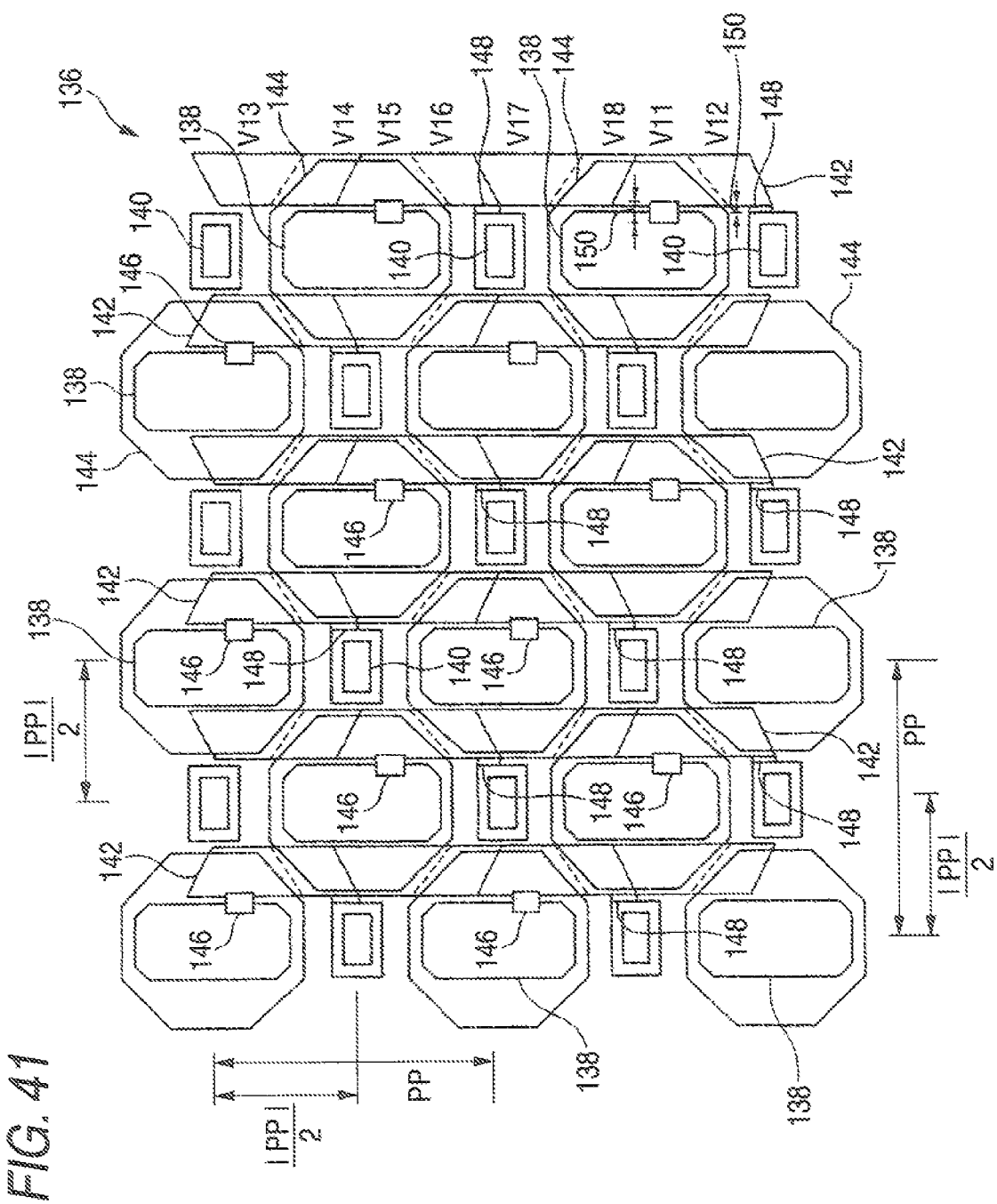
FIG. 41 is a plane view showing an outline constitution of an embodiment of a solid imaging element of a digital camera to which a solid imaging apparatus according to the invention is applied.

The imaging portion 114 is arranged with a microlens in correspondence with a position of arranging the light receiving element in a direction of arrival of the incident light, and arranged with color filter segments for the respective light receiving elements although not illustrated in the embodiment. The imaging portion 114 according to the embodiment includes the solid imaging element 136 as shown by FIG. 41. The solid imaging element 136 is two-dimensionally arranged with the light receiving elements 138 and 140 for converting the incident light into an electric signal. According to the light receiving element 138 of FIG. 41, when an interval of arranging the light receiving elements 138 in a horizontal direction or a vertical direction respectively from pixel centers is designated by notation PP, the solid imaging element 136 is arranged with the light receiving elements densely by shifting the light receiving elements 138 contiguous to the light receiving elements 138 by an interval of |PP|/2. Similarly, also the light receiving elements 140 are arranged densely by shifting the light receiving elements 140 contiguous to the light receiving elements 140 by an interval of |PP|/2.

The light receiving element 138 is formed with a light sensitive region of a shape of an octagonal shape prolonged in a transfer direction of a vertical transfer path 142. The light receiving element 140 is formed with a rectangular light sensitive region shortened in the transfer direction of the vertical transfer path 142. The light element 138 includes the light sensitive region relatively wider than that of the light receiving element 140. The light receiving element 138 is formed with a microlens 144 for completely covering the light sensitive region. However, the light receiving element 140 is not formed with a microlens. As a result, the light receiving element 138 can be formed by the sensitivity relatively higher than that of the light receiving element 140. The light receiving element 138 may be referred to as high sensitivity pixel or main light sensitive pixel. In contrast thereto, the light receiving element 140 is referred to as low sensitivity pixel or sub light sensitive element.

By forming the light receiving elements 138 and 140 in this way, the solid imaging apparatus 136 promotes a resolution of the image and makes light amounts incident on respectives of the light receiving elements 138 and 140 differ from each other.

The solid imaging element 136 of the embodiment is characterized in that dimensions of the read gates 146 and 148 of the light receiving elements 138 and 140 differ from each other. That is, a length or a distance 150 of the read gate 148 of the light receiving element 140 is relatively made to be shorter than that of the read gate 146 of the light receiving element 138. At the read gate 148 of the light receiving element 140, an electric field E can be made to be higher than that of the light receiving element 138 from a relationship of voltage V/distance D, and the signal charge can be increased by the impact ionization phenomenon. Further, as described later, generation of the impact ionization phenomenon can be increased in accordance with conditions.

The signal charge provided by each of the pixels in this way is converted into an analog voltage signal 152 by supplying the signal charge to the output amplifier, not illustrated. The imaging portion 114 supplies the provided analog voltage signal 152 to the preprocessing portion 116.

The preprocessing portion 116 includes a correlated double sampling circuit (CDS), a gain-controlled amplifier (GCA), and an A/D converter (Analog-Digital Converter) for removing a noise. The CDS circuit is supplied with a CDS pulse 154 as a sample signal from the timing signal generator 124 and the A/D converter is supplied with a converted clock signal 156. The preprocessing portion 116 outputs all of imaging data provided by subjecting the supplied analog signal 152 to noise removal, waveform shaping, digitalization to the signal processing portion 18 as digital data, that is, as data 158 by way of a bus 160, a signal line 162. The signal line 162 is a line including data and a control signal.

The signal processing portion 118 is provided with a signal processing function described below for the supplied digital data. The signal processing portion 118 includes an evaluated value calculating portion including an AWB (Automatic White Balance) processing and an image memory although not illustrated. The signal processing portion 118 further executes a gamma conversion, a synchronizing processing, an image converting processing, a compressing/extending processing and an image reducing processing or the like. The evaluated value calculating portion calculates a diaphragm value/shutter speed, a white balance adjusting value and a gray scale correcting value based on the image data after a gamma correction supplied in, for example, a preliminary light measurement or the like, and calculates an integrated value to provide respective parameters pertinent for the supplied image data in accordance with the calculation. The signal processing portion 118 supplies the calculated integrated value to the system control portion 122.

Further, according to the embodiment, the signal processing portion 118 is provided with a function of irradiating a predetermined light amount, comparing image data provided from the low sensitivity pixel with a predetermined threshold, and selecting a voltage applied in reading the signal charge from the low sensitivity pixel in delivery from a factory. The signal processing portion 118 selects a normal voltage and a voltage higher than the normal voltage although described in an operation thereof at a later stage. When the normal voltage is constituted by 15V, the voltage higher than the normal voltage is, for example, 18V. The signal processing portion 118 supplies a signal 162 indicating a result of the selection to the system control portion 122 by way of the bus 160 and a signal line 164.

Further, the evaluated value calculating portion is not limited to be arranged to the signal processing portion 118 but may be arranged to the system control portion 122. In this case, the signal processing portion 118 may supply the image data subjected to the gamma correction to the system control portion 122.

According to the signal processing portion 118, generally, the digital data 158 as the image signal is supplied to the image memory by way of the bus 160. A control at the signal processing portion 118 is controlled in accordance with the control signal 164 supplied from the system control portion 122 by way of a control bus. The signal processing portion 118 is supplied with a timing signal, not illustrated, from the timing signal generator 124. The timing signal includes a horizontal synchronization signal HD, a vertical synchronization signal VD and operation clocks of the respective portions, mentioned later.

Simply explaining respectives of the above-descried processings, the gamma conversion subjects the image data supplied from the image memory to the gamma correction by using data of a look up table. With regard to the synchronization processing, since in the data after the gamma conversion, color filters of primary colors of a single plate type are used at the imaging portion 114 as in the embodiment, even when the light receiving element (actual pixel) is actually arranged, pixel data in correspondence with a color other than that of the color filter segment is not present. Further, according to the embodiment, when only the high sensitivity pixel may be read, as pixel data from the light receiving element 138, a pixel of so-to-speak honeycomb alignment is supplied. In this case, a position of the light receiving element 40 constitutes a virtual pixel in the honeycomb alignment. According to the embodiment, in this case, position (space) information of an accuracy higher than that of the simple honeycomb alignment is provided in view of a point that the actual pixel data is provided as information while constituting the virtual element.

The synchronizing processing is a processing of calculating all of the three primary colors at the respective pixels by interpolation while taking a color which is not present respectively at the actual pixel and the virtual pixel into consideration. In the interpolation processing, the respective pixel data are multiplied by weight coefficients based on, for example, a correlation among the respective pixel data and calculated by a weighted average of a result of the multiplication. In this way, the three primary colors for the pixel of the object can be provided simultaneously in this way. The processing is referred to as synchronization. According to the synchronization processing, the interpolation processing may be carried out by using the pixel data of color G or the brightness data Y to subject the generated pixel data to wide band formation. The synchronized image data is supplied to the image memory.

The image conversion processing executes a chrominance matrix processing by multiplying the synchronized image data of three primary colors by a predetermined coefficient. Further, the image conversion processing further includes a function of subjecting the generated brightness data Y to a contour processing and subjecting generated color data $C_b$, $C_r$ to a color emphasizing processing. The image conversion processing supplies the image data of the brightness data Y, the color data (chrominance data) $C_b$, $C_r$ to the image memory. Further, when an RAW data is recorded, the image conversion processing and the compressing/extending processing are not carried out.

The compressing/extending processing subjects the image data (Y/C) or the chrominance data or the like supplied in a static picture or a dynamic picture (movie) mode to a compressing processing respectively by a standard of JPEG (Joint Photographic coding Experts Group) or MPEG (Moving Picture coding Experts Group)-1, MPEG-2 or the like. The extending processing for the image data is a processing inverse to the compressing processing.

The image reducing processing is provided with a function of subjecting the generated image data or the image data extended in accordance with reproduction (Y/C or chrominance data) to an RGB conversion and constituting the image data subjected to the RGB conversion by a pixel number capable of being displayed by the monitor 132. The pixel number or a display size in displaying the image generates an image which is not deteriorated by a thinning processing. The image reducing processing supplies the generated image data 166 to the monitor 132.

The image memory is inputted with the digital data, that is, the image data 162 and is temporarily stored therewith. Further, in the above-described respective processings, the temporarily stored image data is read from the image memory and is written thereto after the processings. It is preferable to use an involatile memory for the image memory when reading is carried out repeatedly.

The operating portion 120 includes a mode selecting portion and a release shutter button, although not illustrated. The mode selecting portion selects to constitute any mode of a number of modes of a static picture imaging mode and a dynamic picture imaging mode, as well as a low sensitivity mode and a high sensitivity mode and the like. Selection of the low sensitivity mode and the high sensitivity mode are correspondingly set in consideration of an ISO sensitivity. Further, in selecting mode, for example, ISO sensitivity 100 through 3200 can be set. The mode selecting portion outputs the selected mode to the system control portion 122 as an instruction signal 168.

The release shutter button is a button having two stages of strokes and outputs a trigger timing of constituting a stage (S1) of preliminary imaging of the digital camera 110 at the first stage of stroke and constituting the stage (S2) of the regular imaging by the second stage of stroke to the system control portion 122 as the instruction signal 168.

At the system control portion 122, a microcomputer or CPU (Central Processing Unit) for controlling a general purpose portion or a portion of carrying out the digital processing of a total of the camera is used. The system control portion 122 includes a scene determining portion EEPROM (Electrically Erasable Programmable Read Only Memory) for storing a coefficient, and ROM (Read Only Memory) for storing a program for instructing an operation procedure and the like although not illustrated. The system control portion 112 is supplied with a result capable of being processed by a software and selected by the signal processing portion 118 as the selection signal 164 and sets a voltage applied to the low sensitivity pixel in accordance with the supplied selected signal 164. The setting is preserved fixedly as information in delivery from a factory. The system control portion generates a drive control signal 170 for rectifying a voltage of a read gate pulse supplied to the low sensitivity pixel and outputs the generated drive control signal 170 to the driver 126. Further, the system control portion 122 not only generates the drive control signal but also generates a drive control signal 172 for rectifying a voltage of a read gate pulse supplied to the high sensitivity pixel. The drive control signal 172 is compared to be determined in accordance with set ISO sensitivity to control a voltage of the read gate pulse outputted by the driver 126.

The system control portion 122 generates a control signal 174 in accordance with the instruction signal 168 indicating the trigger timing supplied from the operating portion 120. The system control portion 122 outputs the generated control signal 174 to the timing signal generator 124. Further, the system control portion 122 generates the control signal 164 in consideration also of a control in executing the line interpolation at inside of the signal processing portion 118 and a control and a signal processing for the signal generating circuit, and also executes read/write control to and from the media 130. Further, the system control portion 122 executes an operation timing control in the preprocessing portion 16 although not illustrated.

The timing signal generator 124 is provided with a function of generating various timing signals based on a clock signal constituting a reference although not illustrated. In the timing signals, other than a horizontal transfer signal, there are a vertical synchronization signal, a horizontal synchronization signal, a field pulse shift pulse, a vertical transfer signal, and an electronic shutter pulse or the like. Further, the timing signal generator 124 also generates the CDS pulse 154 and the conversion clock signal 156 to supply to the preprocessing portion 116. The timing signal generator 124 supplies a timing signal 176 including a generated vertical synchronization signal, a horizontal synchronization signal, a field pulse signal, a vertical transfer signal, a horizontal transfer signal and an electronic shutter pulse to the driver 126.

Figure 43:
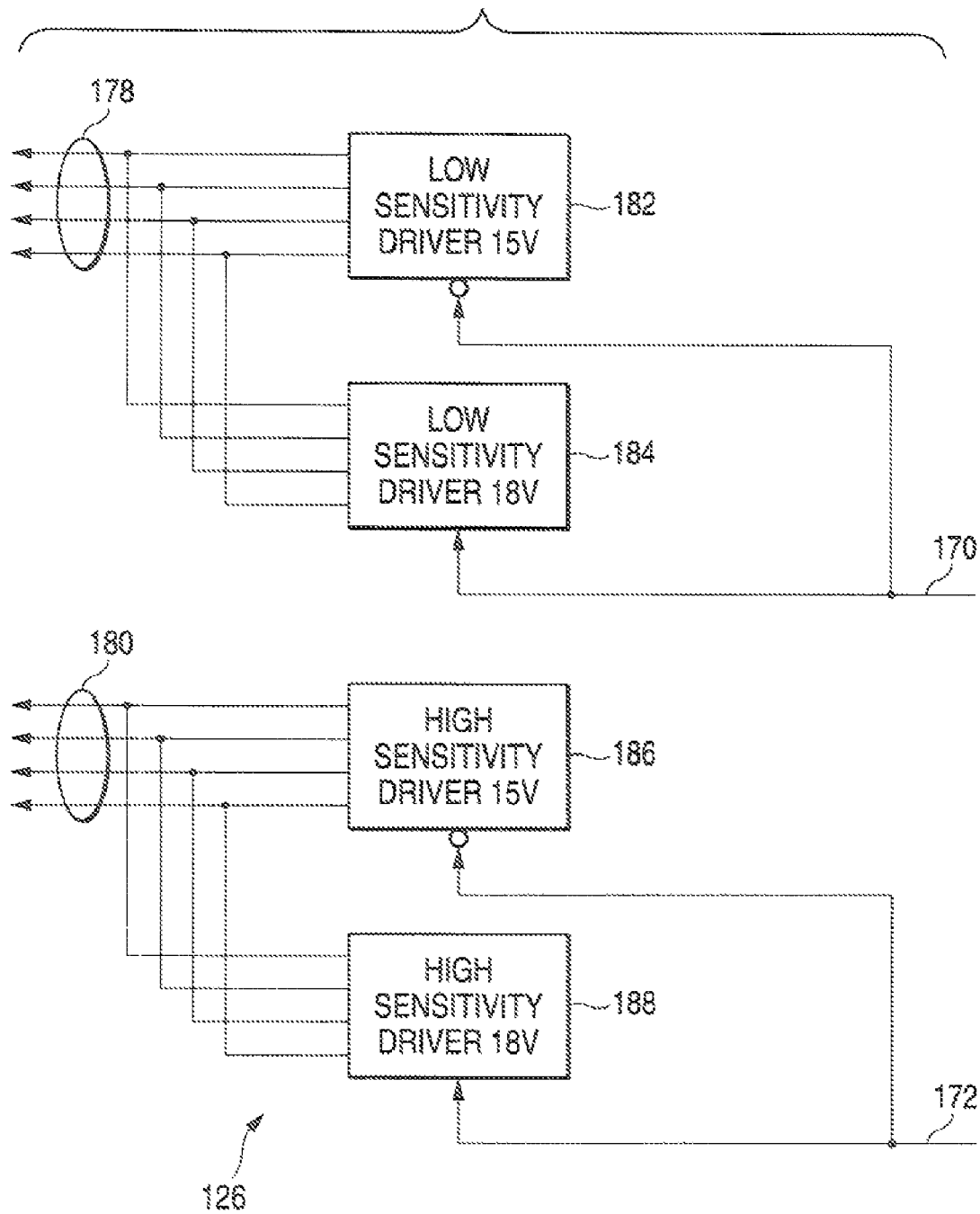
FIG. 43 is a block diagram showing an outline constitution of a driver of FIG. 42.

As shown by FIG. 43, the driver 126 includes drive circuits 182 through 188 for generating drive signals 178 and 180 based on the supplied timing signal 176 and the supplied control signals 170 and 172. The drive circuits 182 and 184 output a normal drive voltage 15V and the drive voltage 18V higher than normal to output the drive signal 178 in accordance with the control signal respectively. Further, also the drive circuits 186 and 188 output the normal drive voltage 15V and the drive voltage 18V higher than normal to output the drive signal 180 in accordance with the control signal 172 respectively.

In this way, the driver 126 supplies the drive signals 178 and 180 generated by predetermined voltages based on the timing signal 176 to the solid imaging element 136 to store the signal charges at photosensitive regions of the respective light receiving elements during a time period of exposure. Further, the driver 126 outputs also a drive signal, not illustrated, opening/closing the mechanical shutter in accordance with the timing of the regular imaging supplied from the release shutter button of the operating portion 122 to the mechanical shutter.

Figure 44:
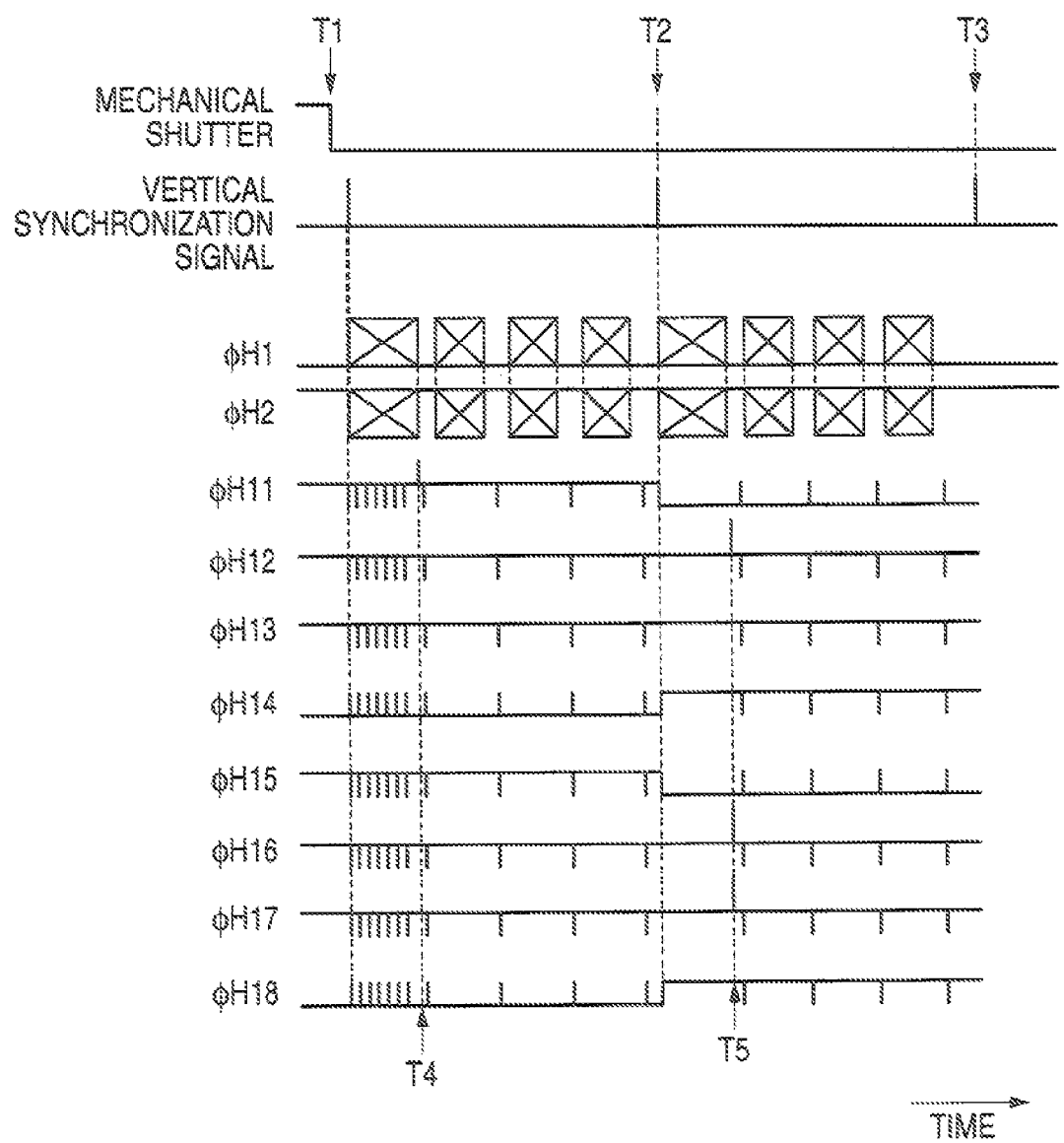
FIG. 44 is a timing chart showing a voltage and a timing of a drive signal outputted by the driver of FIG. 42.

As shown by FIG. 44, the mechanical shutter is shifted from an open state to a close state at time T1 to finish exposure. After a predetermined time period has elapsed, the vertical synchronization signal V-Sync is outputted. A horizontal drive signal φH1 outputs a signal of a positive potential as a smear sweep signal. Further, a horizontal drive signal φH2 outputs a signal of a negative potential by a timing the same as that of the horizontal drive signal φH1. After time T1, a time interval between the first vertical synchronization signal and a next vertical synchronization signal supplied at time T2 is a first field, and a time period between a vertical synchronization signal at time T2 and a vertical synchronization signal supplied at time T3 is a second field.

In the first field, at time T4, signal charges are read from light receiving elements in correspondence with main pixels connected with electrodes applied with vertical drive signals ϕV11, ϕV13, ϕV15 and ϕV17 at time T4. In a read gate shift pulse in this case, normal voltage 15V is applied. Further, in the second field, signal charges are read from light receiving elements in correspondence with sub pixels connected with electrodes applied with vertical drive signals ϕV12, ϕV14, ϕV16 and ϕV18 at time T5. In a read gate shift pulse in this case, a voltage 18V higher than the normal voltage 15V is applied. In this way, the voltage of the read gate pulse is set in accordance with whether the voltage coincides with a predetermined condition. The predetermined condition will be described later.

Referring back to FIG. 42, thereafter, the driver 126 reads the stored signal charge to the vertical transfer path 142 to be transferred to a horizontal transfer path, not illustrated. The solid imaging element 136 transmits the read signal charge further to the horizontal transfer path, and an output amplifier to output as the analog voltage signal 152.

The media interface circuit 128 is provided with an input/output interface function of adjusting an electric property in writing/reading to and from a card record medium of the media 130 and adjusting timings thereof, inputs a processed image data 190 to output to the media 130 as an output signal 192. Further, the media interface circuit 128 writes the image data thereto by way of the compressed image data 190 and 192 and reads the recorded image data 192 and 190 from the media 130.

The storage 130 records the image data 192 supplied from the signal processing portion 118 by using a semiconductor memory or the like as a record medium. Writing/reading data is controlled in accordance with a control signal from the system control portion 122 although not illustrated. The monitor 132 displays an image by operating the image data 166 supplied by a display controller, not illustrated, by a display device.

Meanwhile, the impact ionization inherent to each pixel or light receiving element appears as a variation inherent to the pixel in accordance with a variation in a gain property. The inherent pixel variation can be observed also in, for example, an averaged image. In this way, the inherent impact ionization amounts to an increase in a pixel pattern noise.

Meanwhile, a major component of a dark time noise is an amplifier noise as in a noise in blocking light. Therefore, when a charge is amplified by using the impact ionization before the electric charge passes an amplifier, only a signal component is amplified. When the charge passes the amplifier after the amplification, a signal quality corresponds to a reduction in the dark time noise equivalently. On the other hand, a light shot noise coincides with a root of a generated amount of the charge. Therefore, the amplification by the amplifier and the amplification before passing the amplifier effect the same influence.

An evaluation will be given of respective components of a noise generated in accordance with a normal voltage and a noise when subjected to the impact ionization.

Here, the respective components of noise are shot noise $N_{shot}$, dark time noise $N_{dark}$, fixed pattern noise $N_{FPN}$, and a total noise is designated by notation $N_{Total}$. Notation [LSB] designates a noise amount of a digitalized lowest bit. Further, a variable AD designates a gain in digitalization, a variable FDA designates a gain in charge/voltage conversion, a variable S designates a signal amount, a variable $AD_{II}$ designates a gain in digitalization in consideration of a rate of impact ionization, a coefficient $C_{II}$ designates a coefficient in consideration of the rate of impact ionization, a variable D designates a millivolt, a variable FPN designates a rate of the fixed pattern noise and a variable $FPN_{II}$ designates a rate of the fixed pattern noise in consideration of the rate of impact ionization.

The noises generated in accordance with the normal voltage are expressed as described below.

$$N_{shot}[LSB] = AD \times FDA \times \sqrt{\frac{S}{AD \times FDA}} = \sqrt{AD \times FDA \times S} \quad (1)$$

$$N_{dark}[LSB] = AD \times D \quad (2)$$

$$N_{FPN}[LSB] = \frac{FPN}{100} \times S \quad (3)$$

$$N_{Total}[LSB] = \sqrt{N_{shot}^2 + N_{dark}^2 + N_{FPN}^2} \quad (4)$$

$$N_{Total}[LSB] = \sqrt{(AD \times FDA \times S) + (AD \times D)^2 + \left(\frac{FPN}{100} \times S\right)^2} \quad (5)$$

Further, noises in being subjected to impact ionization are expressed as described below.

$$N_{shot}[LSB] = AD_{II} \times FDA \times C_{II} \sqrt{\frac{S}{AD_{II} \times FDA \times C_{II}}} \quad (6)$$
$$= \sqrt{AD_{II} \times FDA \times C_{II} \times S}$$

$$N_{dark}[LSB] = AD_{II} \times D \quad (7)$$

$$N_{FPN}[LSB] = \frac{FPN_{II}}{100} \times S \quad (8)$$

$$N_{Total}[LSB] = \sqrt{N_{shot}^2 + N_{dark}^2 + N_{FPN}^2} \quad (9)$$

$$N_{Total}[LSB] = \sqrt{(AD_{II} \times FDA \times C_{II} \times S) + (AD_{II} \times D)^2 + \left(\frac{FPN_{II}}{100} \times S\right)^2} \quad (10)$$

The respective noise components will be compared. Here, variable $AD_{II} \times$coefficient $C_{II}$ designates the variable AD. Therefore, it is known that the light shot noise $N_{shot}$ stays the same both in the noise generated in accordance with the normal voltage and the noise when subjected to impact ionization. Further, the coefficient $C_{II}$ is a value larger than 1.0 and therefore, a value of the variable AD is larger than the value of the variable $AD_{II}$. With regard to the dark time noise $N_{dark}$, the noise when subjected to impact ionization, that is, a value of equation (7) is smaller. Further, since the impact ionization is a phenomenon inherent to the pixel, with regard to the fixed pattern noise $N_{FPN}$, the noise when subjected to impact ionization is larger than the noise generated in accordance with the normal voltage.

Meanwhile, the fixed pattern noise $N_{FPN}$ is proportional to the signal amount S, and therefore, in the three noise components, the influence of the noise is maximized when the signal S is large, that is, when light is bright. In contrast thereto, the dark noise $N_{dark}$ is expressed by a constant, and therefore, in the three noise components, the influence of the noise is maximized when the signal S is small, that is, when light is dark. From these relationships, it is not preferable that the influence of the noise is effected when light is bright. Therefore, when the signal charge is read from the high sensitivity pixel, the impact ionization is not generated. Further, when the signal charge is read from the low sensitivity pixel, it is preferable to generate impact ionization. Thereby, quality of signals read from the high sensitivity pixel and the low sensitivity pixel can be constituted by high S/N.

Further, in accordance with a principle of generating the impact ionization, when the sensitivity of the low sensitivity pixel is high, there is a case in which it is not necessary to generate the impact ionization.

Figure 45:
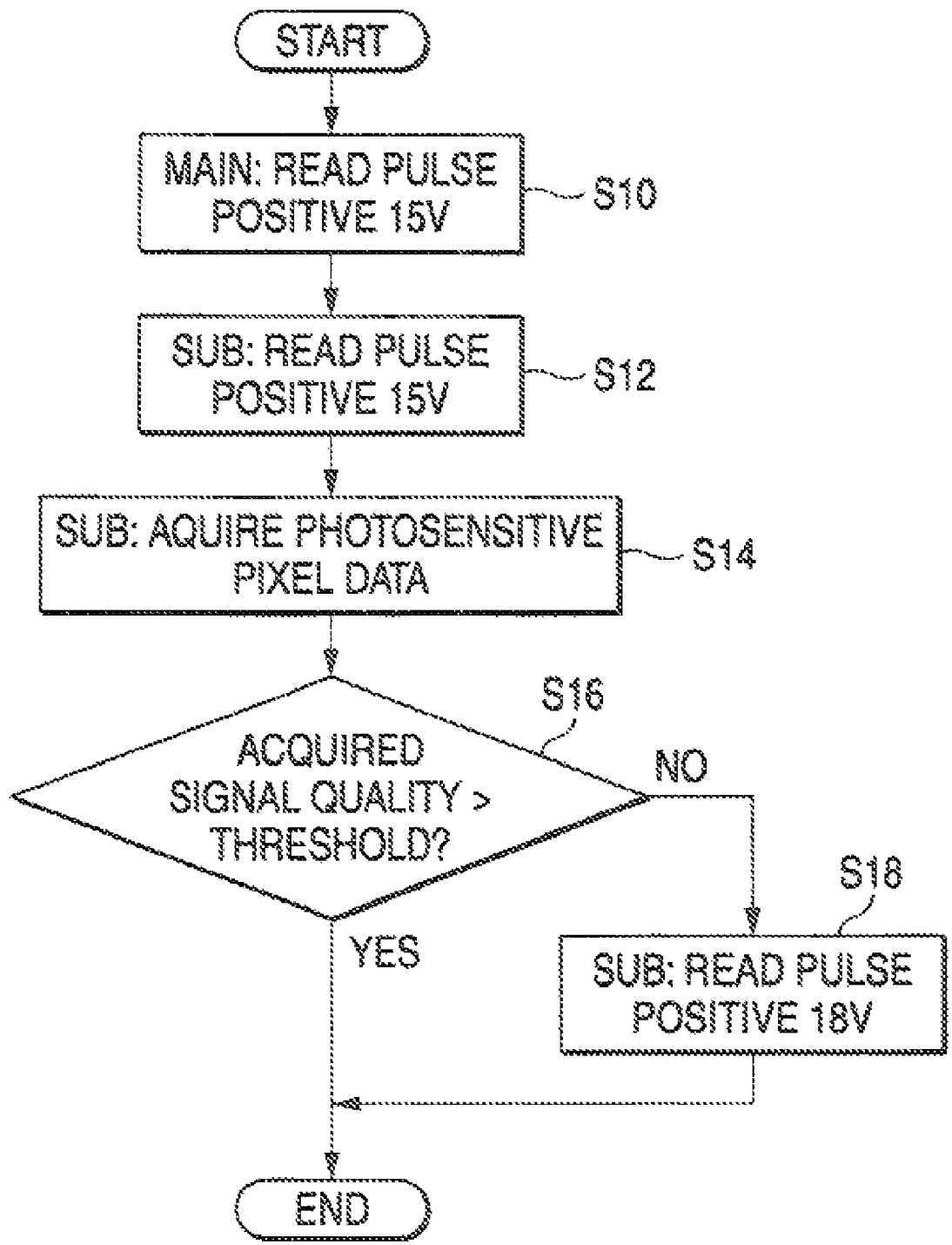
FIG. 45 is a flowchart describing a procedure of setting a voltage of a read pulse for a low sensitivity pixel of the solid imaging element of FIG. 41.

Next, a description will be given of reading the signal charge reading with regard to the solid imaging element 136. FIG. 45 describes a processing procedure in delivery from a factory when incident light is irradiated from a predetermined light source to the solid imaging element 16. Incident light is irradiated thereto and exposure is carried out by the solid imaging element 136. A read pulse of the high sensitivity pixel or the main light sensitivity pixel is set to a positive voltage 15V (step S10). The system control portion 122 generates the control signal 172 at level "L" to output to the driver 126. The driver 126 makes the high sensitivity driver 116 operable.

Next, a read pulse of the low sensitivity pixel or low sensitivity pixel is set to the positive voltage of 15V (step S12). The system control portion 122 generates the control signal 170 at level "L" to output the driver 126. The driver 126 makes the low sensitivity driver 182 operable.

The read pulses in accordance with the settings are respectively outputted at the first field and the second field. In the procedure, the low sensitivity pixel or the signal charge read from the low sensitivity pixel is converted at the second field to acquire as pixel data of the low sensitivity pixel (step S14). The pixel data of the low sensitivity pixel is supplied to the signal processing portion 118 and the signal quality is evaluated at an evaluating portion although not illustrated. The numeralized polarization value is supplied to the system control portion 122.

The system control portion 122 determines the signal quality, that is, whether the evaluated value is larger a previously set threshold (step S16). When the evaluated value is larger than the threshold (YES), the processing procedure is finished without changing the setting. Thereby, it is evaluated that unnecessary impact ionization is not generated. Further, when the evaluated value is equal to or smaller than the threshold (NO), the procedure proceeds to setting change (to step S18).

The setting change signifies that the read pulse from the low sensitivity pixel of the solid imaging element 136 constituting an object of inspection is set to positive voltage 18V higher than normal (step S18). This is the setting of generating impact ionization when the signal charge is read from the low sensitivity pixel. The system control portion 122 generates the control signal 170 of level "H" to output the driver 126 by constituting reading the low sensitivity pixel by the setting. Thereby, when the setting is changed, the low sensitivity driver 184 is operated. After changing the setting, the processing procedure is finished.

Thereby, the impact ionization can pertinently be carried out and wasteful power consumption can be prevented by avoiding the impact ionization which cannot achieve an effect.

Figure 46:
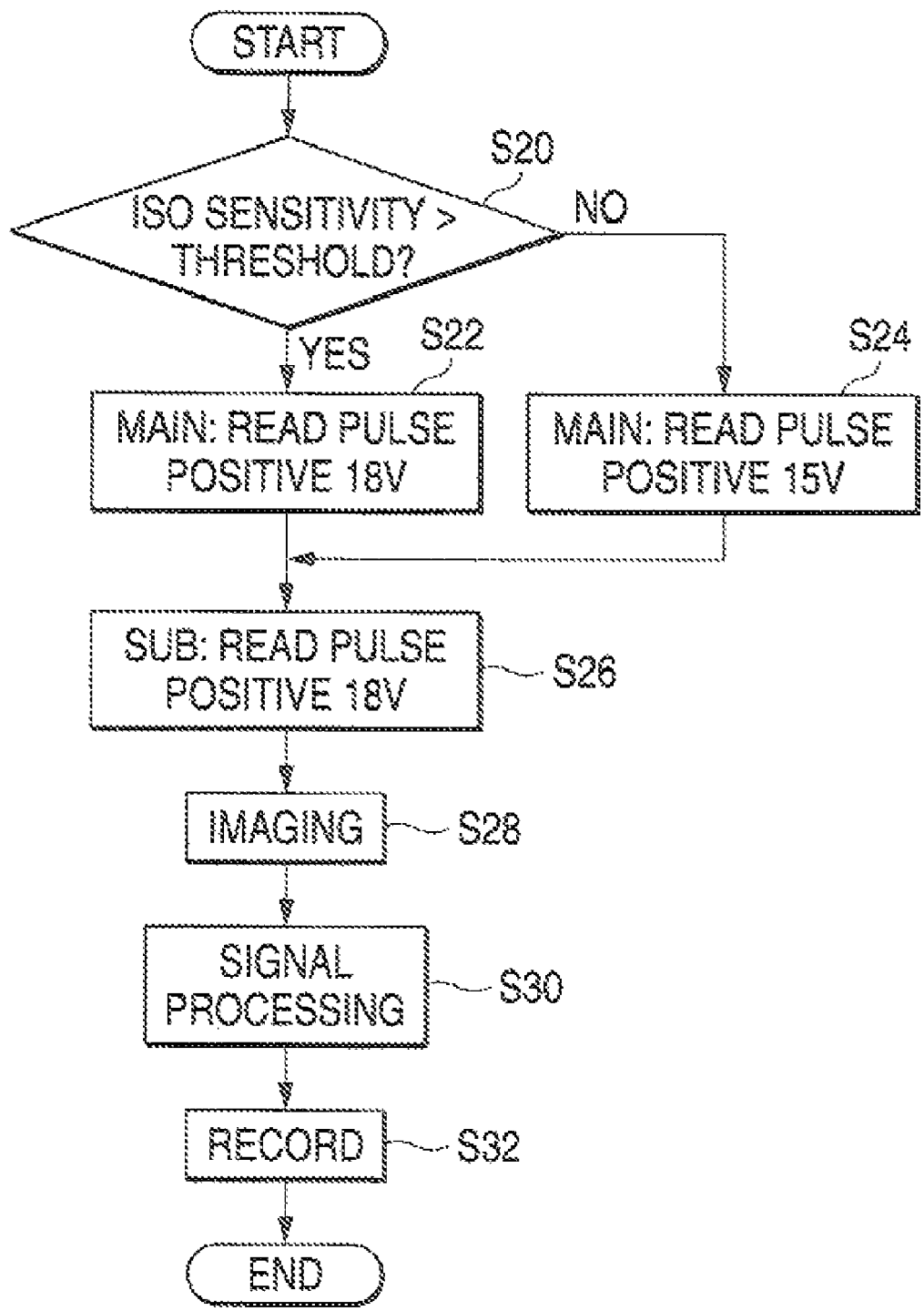
FIG. 46 is a flowchart describing a procedure of setting a voltage of a read pulse of the solid imaging element of FIG. 41 in accordance with a user setting.

Next, a description will be given of an imaging procedure in the digital camera 110 in reference to FIG. 46. The threshold of generating the impact ionization by user setting is set to the system control portion 122 previously by way of the operating portion 120 based on the ISO sensitivity. The threshold is set to, for example, ISO 400. An ISO sensitivity when an image is taken actually is set to the system control portion 122 by user setting separately from the threshold.

The digital camera 110 determines whether the ISO sensitivity when an image is taken actually by the system control portion is higher than the threshold sot by the user (step S20). When the ISO sensitivity is higher than the threshold (YES), the digital camera 10 proceeds to a processing of changing to set the read pulse of the high sensitivity pixel to a high voltage (to step 322). Further, when the ISO sensitivity is equal to or lower than the threshold (NO), the digital camera 10 proceeds to a processing of setting the read pulse of the high sensitivity pixel to the normal voltage (to step S24).

The read pulse of the high sensitivity pixel by the ISO sensitivity higher than the threshold is changed to set to the positive voltage 18V as high voltage (step 322). The read pulse of the high sensitivity pixel by the ISO sensitivity equal to or lower than the threshold is set to the normal positive voltage 15V (stop S24).

After setting the voltage of the read pulse of the high sensitivity pixel in this way, the system control portion 122 sets the voltage of the read pulse of the low sensitivity pixel to the positive voltage 18V (step S26).

Further, the read pulse of the low sensitivity pixel may be constituted by a voltage in accordance with a prior setting in delivery from a factory.

The voltages of the read pulses of the high sensitivity and low sensitivity pixels are set in this way, the release shutter button of the operating portion 120 is depressed by a desired timing to take an image (step S28). In taking the image, the solid imaging element 136 outputs signal charges by the read pulses of the high sensitivity and low sensitivity pixels in accordance with the setting. When S/N of the signal from the high sensitivity pixel is also low by setting the high ISO sensitivity, the impact ionization is generated even in reading the high sensitivity pixel. Thereby, the digital camera 110 can constitute signals read from the high sensitivity and low sensitivity pixels by high S/N.

The digital camera 110 digitalizes the image signal read from the solid imaging element 136 to transmit to the signal processing portion 18. The signal processing portion 118 carries out a signal processing based on the supplied image data (step S30). The image data subjected to the signal processing is recorded to the media 130 by way of the media IF circuit 20 (step S32). After the recording, static picture recording is finished.

By operating in this way, both of the signals provided from the high sensitivity and low sensitivity pixels can be constituted by high S/N.

Figure 47:
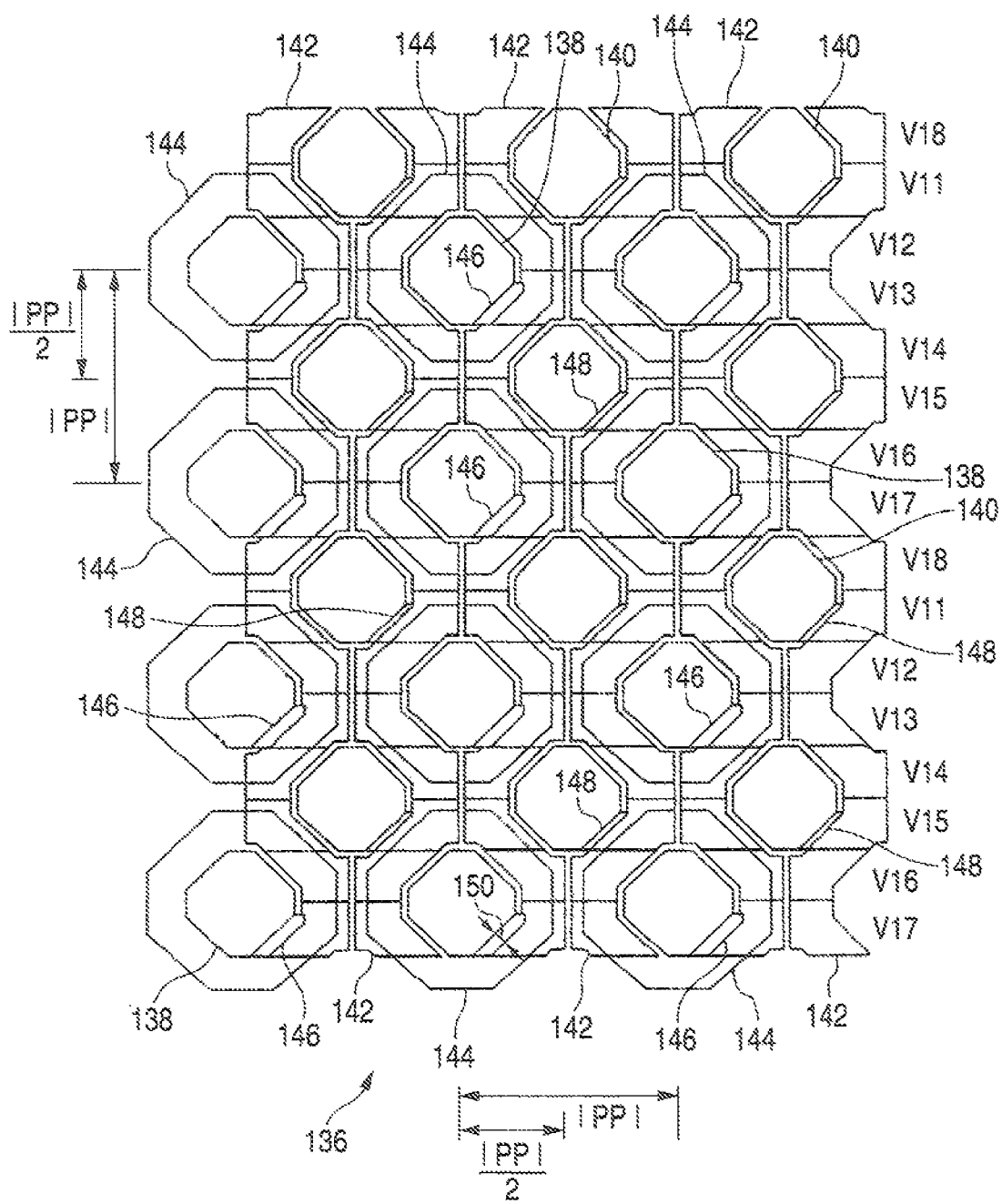
FIG. 47 is a plane view showing an outline constitution of other embodiment of the solid imaging element of a digital camera to which the solid imaging apparatus according to the invention is applied.

Next, FIG. 47 shows other embodiment of the solid imaging element 136 of the digital camera 110 to which the solid imaging apparatus according to the invention is applied. The solid imaging element 136 shown in FIG. 47 is attached with the same reference notations to constituent elements common to constituent elements of the preceding embodiment, and a description thereof will be omitted by avoiding repetition of a complicated description.

Even when the other embodiment of the solid imaging element 136 of the embodiment is applied, similar to the preceding embodiment, the signals provided from the high sensitivity and low sensitivity pixels can naturally be constituted by high S/N.

According to the first invention, a semiconductor element and a method of driving a semiconductor element capable of restraining a signal charge from being accompanied by a noise as less as possible and capable of being driven by an amplification factor suitable for an imaging environment can be provided.

According to the second invention, both of signals provided from the high sensitivity and low sensitivity pixels can be constituted by high S/N by generating impact ionization only in reading the signal charge from the low sensitivity pixel.

The entire disclosure of each and every foreign patent application from which the benefit of foreign priority has been claimed in the present application is incorporated herein by reference, as if fully set forth.

What is claimed is:

1. A semiconductor element comprising:
    two-dimensionally aligned pixels with a plurality of photoelectric conversion portions that photoelectrically convert incident light into a signal charge;
    a plurality of vertical transfer paths to which the signal charges are transferred from said plurality of photoelectric conversion portions;
    read gates that amplify signal charges read from the photoelectric conversion portions to transfer to said plurality of vertical transfer paths; and
    color filters that divide light into a plurality of color components, wherein pieces of the light divided by the color filters are respectively received by said plurality of photoelectric conversion portions, and wherein positions of the read gates differ from each other in accordance with colors corresponding to the photoelectric conversion portions;
    wherein:
    two or more of the read gates are formed for each of said plurality of photoelectric conversion portions,
    amplification factors of the two or more read gates differ from each other,
    the two or more read gates of each of said plurality of photoelectric conversion portions are configured to transfer signal charges having the same color components, and
    the two or more read gates are provided at positions of transferring signal charges to different vertical transfer paths among the plurality of vertical transfer paths relative to the corresponding photoelectric conversion portion among the plurality of photoelectric conversion portions.

2. The semiconductor element according to claim 1,
    wherein said plurality of vertical transfer paths differ from each other in saturated amounts of signal charges.

3. The semiconductor element according to claim 1,
    wherein the two or more of the read gates are a pair of read gates provided in a horizontal direction of the corresponding one of the photoelectric conversion portion, the pair of read gates differing from each other in the amplification factors, and
    a large or small relationship of the amplification factors of the pair of read gates is reversed with respect to adjacent ones of the photoelectric conversion portions.

4. The semiconductor element according to claim 1,
    wherein the semiconductor element is a solid imaging element.

5. A method of driving a semiconductor element, the semiconductor element comprising two-dimensionally aligned pixels with a plurality of photoelectric conversion portions that photoelectrically convert incident light into a signal charge, and further comprising color filters that divide light into a plurality of color components,
    the method comprising, when signal charges are transferred from said plurality of photoelectric conversion portions to a plurality of vertical transfer paths, amplifying signal charges of the same color component by two or more read gates formed for each of said plurality of photoelectric conversion portions having different amplification factors to transfer to the vertical transfer paths,
    wherein:
    pieces of the light divided by the color filters are respectively received by said plurality of photoelectric conversion portions;
    positions of the read gates differ from each other in accordance with colors corresponding to the photoelectric conversion portions; and
    the two or more read gates are provided at positions of transferring signal charges to different vertical transfer paths among the plurality of vertical transfer paths relative to the corresponding photoelectric conversion portion among the plurality of photoelectric conversion portions.

6. The method of driving a semiconductor element according to claim 5,
    wherein said plurality of vertical transfer paths differ from each other in saturated amounts of signal charges.

7. The method of driving a semiconductor element according to claim 5,
    wherein the two or more of the read gates are a pair of read gates provided in a horizontal direction of the corresponding one of the photoelectric conversion portion, the pair of read gates differing from each other in the amplification factors, and
    a large or small relationship of the amplification factors of the pair of read gates is reversed with respect to adjacent ones of the photoelectric conversion portions.

8. The method of driving a semiconductor element according to claim 5, wherein the semiconductor element is a solid imaging element.

* * * * *